(12) United States Patent
Hashimoto

(10) Patent No.: US 8,043,714 B2
(45) Date of Patent: Oct. 25, 2011

(54) TRANSPARENT THERMOPLASTIC FILM AND A METHOD OF PRODUCING THE SAME

(75) Inventor: Kiyokazu Hashimoto, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1222 days.

(21) Appl. No.: 11/783,864

(22) Filed: Apr. 12, 2007

(65) Prior Publication Data

US 2007/0275183 A1    Nov. 29, 2007

(30) Foreign Application Priority Data

Apr. 13, 2006 (JP) ................................. 2006/110479

(51) Int. Cl.
*B32B 5/66* (2006.01)

(52) U.S. Cl. ...................... 428/532; 428/141; 264/288.4; 264/290.2

(58) Field of Classification Search .................. 428/141, 428/532; 264/288.4, 290.2
See application file for complete search history.

(56) References Cited

FOREIGN PATENT DOCUMENTS

WO    WO02/101447 A1 * 12/2002

* cited by examiner

*Primary Examiner* — Leszek Kiliman
(74) *Attorney, Agent, or Firm* — Buchanan Ingersoll & Rooney PC

(57) ABSTRACT

A method of producing a transparent thermoplastic film comprising transversely stretching a film by 1% to 200%, wherein a ratio (Lc/Wc) of a clutch length (Lc) of a chuck to a clutch depth (Wc) of the chuck in the transverse stretching zone is in the range of 3 to 50.

17 Claims, 5 Drawing Sheets

(a)

(b)

TRANSPARENT THERMOPLASTIC FILM AND A METHOD OF PRODUCING THE SAME

BACKGROUND OF THE INVENTION

1. Field of the Invention

The present invention relates to a transparent thermoplastic film and a method of producing the transparent thermoplastic film capable of reducing the irregularity generated at the time of displaying black even when a liquid crystal display panel to which the transparent thermoplastic film is mounted is used at high temperature.

2. Description of the Related Art

In the past, there was carried out a method in which a transparent thermoplastic resin such as a cellulose acylate is formed to a film, stretched, and used as a retardation film of a liquid crystal display device in order to widen the viewing angle. In particular, recently, a retardation film is being developed by stretching a film which is formed by the use of a film melt-forming method which allows controlling equipment investment to be lowered. A method of forming such retardation film is described in Japanese Patent Laid-open Publication (herein after, abbreviated as "JP-A") No. 2005-300978. The method is to give the retardation film specific values of retardation and haze, and to achieve widening of the viewing angle by building the film into a liquid crystal display device having a big screen. However, these liquid crystal display devices are easily affected by the environment and unevenness are appeared on the screen thereof when the setting environment is varied from the high temperature (for example, 50° C.), therefore, there is a demand of being improved. The unevenness on the screen is not ably shown when the screen is displaying black. That is, since an optical property of the retardation film used in the liquid crystal display device is varied due to a variation in the environment, a leakage of light occurs and is shown as image unevenness.

SUMMARY OF THE INVENTION

An object of the invention is to solve the problems and to provide an optical film of which optical properties are not changed when the film is built into a liquid crystal display device and used at high temperature.

Such problems have solved the problems by the following methods.

(1) A method of producing a transparent thermoplastic film comprising transversely stretching a film by 1% to 200%, wherein a ratio (Lc/Wc) of a clutch length (Lc) of a chuck to a clutch depth (Wc) of the chuck in the transverse stretching zone is in the range of 3 to 50.

(2) The method of producing a transparent thermoplastic film according to (1), wherein a temperature of the chuck at the time of clutching is in the range of from 60° C. to 200° C.

(3) The method of producing a transparent thermoplastic film according to (1) or (2), wherein a ratio ($V^1/V^2$) of a chuck transporting speed ($V^1$) in the transverse stretching zone to a taking-up speed ($V^2$) after the transverse stretching is in the range of from 1.001 to 1.1.

(4) The method of producing a transparent thermoplastic film according to any of (1) to (3), comprising heat-treating the firm after the transverse stretching at a temperature in the range of ($T^1$−50)° C. to ($T^1$−2)° C., in which $T^1$ represents the transverse stretching temperature.

(5) The method of producing a transparent thermoplastic film according to any of (1) to (4), wherein the film is heat-treated at a temperature in the range of from ($T^1$+2)° C. to ($T^1$+50)° C. before the transverse stretching, in which $T^1$ represents the transverse stretching temperature.

(6) The method of producing a transparent thermoplastic film according to any of (1) to (5), comprising longitudinally stretching the film by 1 to 100%, in which the ratio of length/width (L/W) is in the range of above 0.01 to below 0.3 or above 2 to 50 or less.

(7) The method of producing a transparent thermoplastic film according to any of (1) to (6), wherein the film at least one of after the transverse stretching and after other stretching is relaxed to give the total measure of relaxation in a length direction and a width direction of 1 to 20%, within the temperature range of (Tg−30)° C. to (Tg+30)° C., in which Tg is a glass translation temperature of the transparent thermoplastic film.

(8) The method of producing a transparent thermoplastic film according to any of (1) to (7), wherein the film is melt-formed by using a touch roll.

(9) A transparent thermoplastic film having a thermal expansion distribution of 10% or less and an optical elasticity modulus distribution of 10% or less in a square having one side of 30 cm.

(10) The transparent thermoplastic film according to (9), wherein the film is transversely stretched by 1% to 200% within a ratio (Lc/Wc) of a clutch length (Lc) of a chuck to a clutch depth (Wc) of the chuck in a transverse stretching zone of the range of from 3 to 50.

(11) The transparent thermoplastic film according to (9) or (10), in which an orientation angle distribution over the entire film-forming width area is in the range of from 0°±5° or 90°±5°.

(12) The transparent thermoplastic film according to any of (9) to (11), in which in-plane retardation (Re) is in the range of from 20 to 400 nm and retardation (Rth) in the thickness direction is in the range of from 50 to 400 nm.

(13) The transparent thermoplastic film according to any of (9) to (12), comprising cellulose acylate satisfying the following formulae $$2.0 \leq A+B < 3.0$$

$$0.1 \leq B < 3$$

wherein A is a substitution degree of an acetate group and B is a total substitution degree of a propionate group, a butyrate group and a pentanoyl group.

(14) The transparent thermoplastic film according to any of (9) to (13), which contains cellulose acylate satisfying the following formulae (T-1) and (T-2):

$$2.5 \leq A+C \leq 3.0 \text{ and} \qquad\qquad \text{Formula (T-1)}$$

$$0.1 \leq C < 2. \qquad\qquad \text{Formula (T-2)}$$

wherein, A indicates a substitution degree of an acetate group and C indicates a substituted or unsubstituted aromatic acyl group.

BEST MODE FOR CARRYING OUT THE INVENTION

Figure 1:
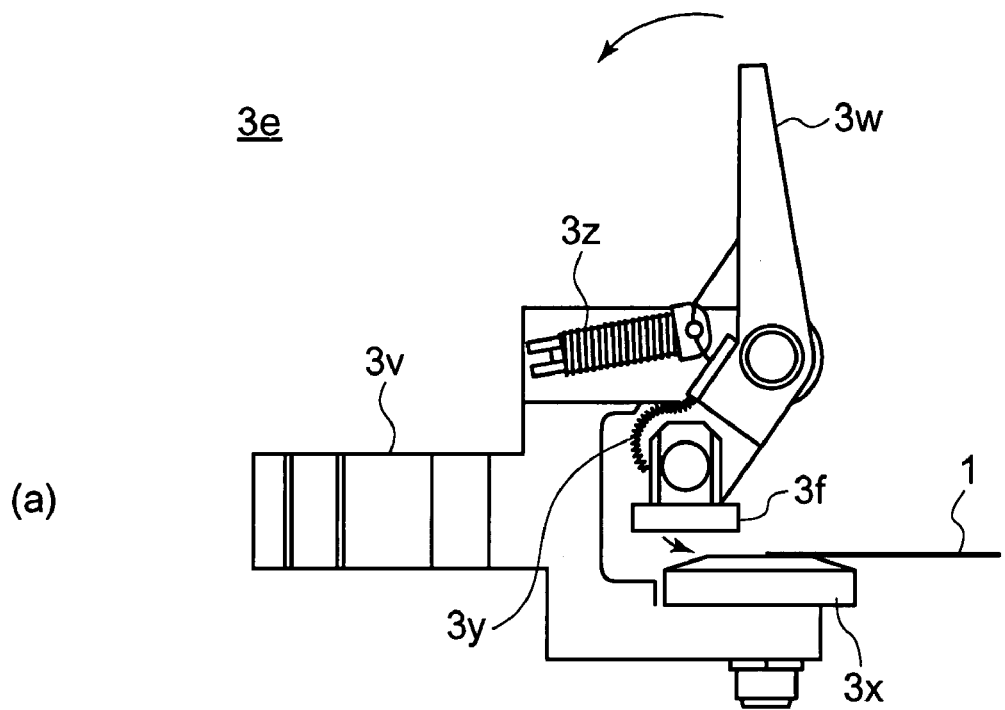
FIG. 1 is a diagrammic illustrating an operation in which a thermoplastic film is held by a chuck.
Figure 1:
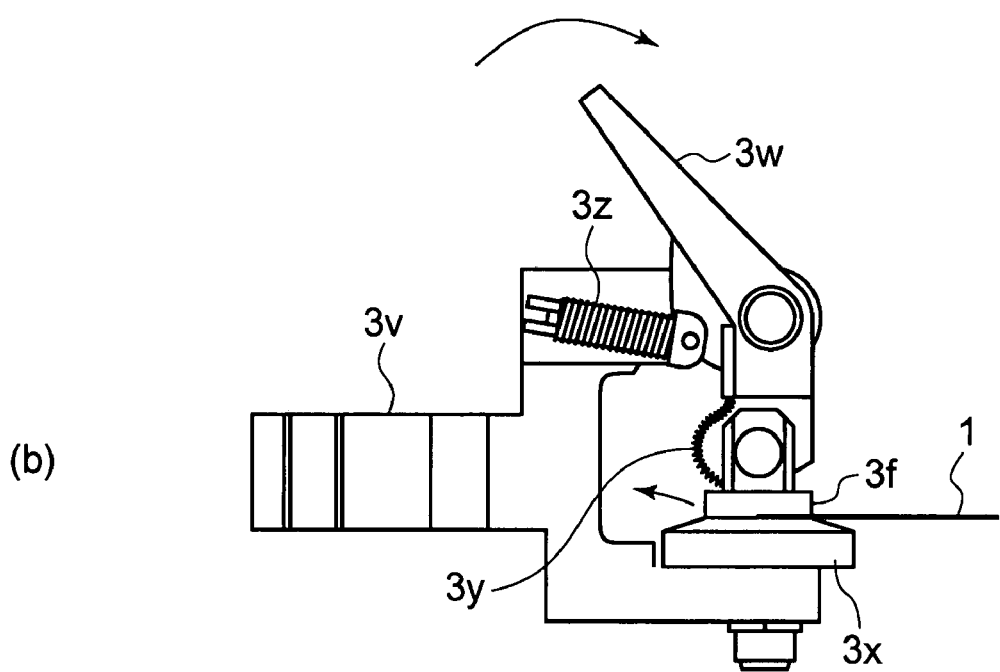

Hereinafter, an embodiment of the invention will be described in detail. In this application, "to" refers to a numeric value including the lowest value and the highest value described before and after it.

According to the invention, when a transparent thermoplastic film is mounted to a liquid crystal display apparatus, a screen irregularity which occurs during the use of the transparent thermoplastic film at high temperature, a change in an optical property of a phase difference film in the liquid crystal display apparatus is revealed to be made due to the following reason. The phase difference film is bonded with a polarizer to be used, but thermal expansions of the both are different each other. Since the bonding process is performed at the room temperature, the change in a temperature results in the size difference of the both at the state of the high temperature.

As a result, when any one of the both increases the other, a stress occurs. Consequently, the optical property (in-plane retardation (Re) and retardation (Rth) in the width direction are varied) is varied. When the property of the phase difference film is uniformed on the entire surface, the irregularity occurs at the time of being mounted to the liquid crystal display apparatus, and thus it is difficult to recognize the irregularity.

However, when the property is not uniformed, Re and/or Rth are varied locally, and thus it is easy to recognize the irregularity with the naked eye.

Accordingly, in order to improve the optical irregularity, it is desirable that there are no irregularity in the thermal expansion and optical elasticity modulus. Specifically, the distribution in the transparent thermoplastic film with a square shape of which one side is 30 cm is preferably less 10%, more preferably less 5%, and further more preferably less 3%.

As an easily influencing factor, an orientation angle in the surface of the transparent thermoplastic film is exemplified. Since a polymer molecular (for example, cellulose acylate or saturated norbornene) is arranged in a direction of the orientation angle or perpendicular to the orientation angle, the thermal expansion along the orientation angle or in the direction perpendicular to the orientation angle become maximum. That is, it is difficult that the molecular is expanded in a direction of the main chain orientation due to the heat, and thus the thermal expansion becomes small. Consequently, when the orientation angle is inclined, the stress resulting from the heat expansion occurs in an inclined way, thereby accelerating the irregularity of the optical property in the surface. As a result, the orientation angle is preferably in the range of from 0°±5° or 90°±5°, more preferably in the range of from 0°±4° or 90°±4°, and further more preferably in the range of from 0°±3° or 90°±3° over the entire film-forming width area.

According to the invention, Re of the transparent thermoplastic film is preferably in the range of from 20 nm to 400 nm, more preferably in the range of from 30 nm to 250 nm, and further more preferably in the range of from 40 nm to 150 nm. In addition, Rth of the transparent thermoplastic film according to the invention is preferably in the range of from 50 nm to 400 nm, more preferably in the range of from 70 nm to 350 nm, and further more preferably in the range of from 100 nm to 300 nm. Furthermore, Re of the transparent thermoplastic film according to the invention is preferably in the range of from 20 nm to 400 nm and Rth thereof is in the range of from 50 nm to 400 nm; Re is more preferably in the range of from 30 nm to 250 nm and Rth is more preferably in the range of from 70 nm to 350 nm; and Re is further more preferably in the range of from 40 nm to 150 nm and Rth is further more preferably in the range of from 100 nm to 300 nm.

The phase difference film made of the transparent thermoplastic resin having such characteristics, for example, can be obtained using the following stretch method. That is, distributions of the thermal expansion and the elasticity modulus are made uniformed and the orientation angle distribution (shift of the orientation angle from 0° or 90°) is made small. In this manner, in order to perform a more uniformed stretch, the following method can be used.

(1) The stretching is performed on the condition that a ratio (Lc/Wc) of the chuck clutch length (Lc) to chuck clutch depth (Wc) in a transverse stretching zone is in the range of from 3 to 50, preferably in the range of from 4 to 40, more preferably in the range of from 5 to 30, in the range of from 1% to 200%, preferably in the range 10% to 150%, and more preferably in the range of from 40% to 120%. The clutch length (Lc) and the clutch depth (Wc) refer to a clutched length in the longitudinal direction and a clutched depth (Wc) in the width direction, respectively. In addition, the stretch magnification according to the invention is defined as following Formula (1):

stretch magnification(%)=100×(length after stretching−length before stretching)/length before stretching  Formula (1)

LC/Wc is about 2. By making the clutch length (Lc) large as described above, the number of the chuck per a unit length can be made small. In this manner, a stretch irregularity (a local thermal expansion, the optical elasticity modulus distribution, the orientation angle distribution) can be prevented from occurring by making the gap between the chucks small. The internal distortion after the stretching can be small by making the clutch depth (Wc) small as described above.

The portion clutched by chuck is not stretched since the thermal expansion of the clutched portion is different with that of the stretched portion (the thermal expansion is lowered since the stretching is performed). After the stretching, the chucks are removed and the transparent thermoplastic film is cooled. However, since the thermal expansion of the non-stretched portion clutched by the chuck is large and that of the stretched portion is small, the cooling process results in the occurrence of a contraction stress due to the size difference. In this case, when the stretch is deep, the contraction stress due to the non-stretched portion becomes large, and thus accompanying internal distortion becomes severe. Consequently, the uniformity in the surface is degraded, the local thermal expansion distribution and the optical elasticity modulus distribution are increased, and the orientation angle distribution is likely to be increased also.

Figure 3:
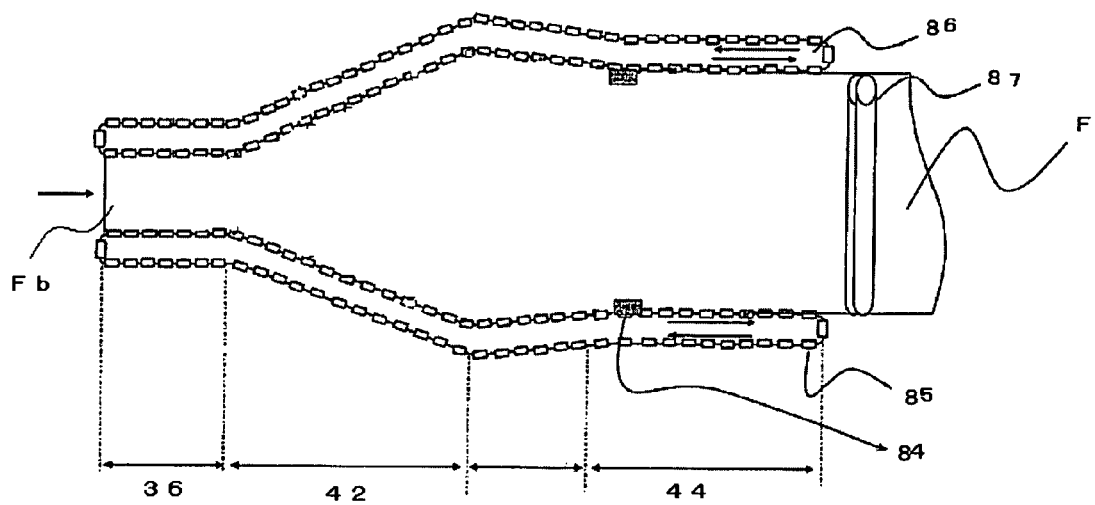
FIG. 3 is a diagrammic illustration of tenter preferably used in the present invention.

Here, a tenter used in the transverse stretching of the present invention is described. FIG. 3 is a diagrammic illustration of a tenter.

In FIG. 3, the tenter comprises preheating zone 36, stretching zone 42 and heat-treating zone after the transverse stretching 44. In the tenter, the transparent thermoplastic resin Fb to be stretched, at the both end thereof, is held by chucks 85 running on a tenter crip rail 86 thereby fed in the direction indicated by arrows.

Here, the operation holding the transparent thermoplastic resin film 1 by chucks (sheet crip) 3f is described.

A lever 3w is pivoted on the frame 3v of each sheet clip unit 3e fixed to the clip chain of tenter, and the chuck 3f is pivoted on the lower end part of the lever 3w and hangs therein. The bottom surface of the chuck 3f is kept horizontally by a spring 3y for attitude control. The flame 3v has a broad 3x facing the chuck 3f. A toggle spring 3z is between the frame 3v and the lever 3v, and keeps the above state maintained whichever the lever 3w is pushed down in the direction of. In FIG. 1 (a), if the lever 3w is pushed down leftward, the chuck 3f will move rightward. When the transparent thermoplastic film 1 is on the board 3x, as shown in FIG. 1 (b), the transparent thermoplastic film 1 is held between the under surface of the chuck 3f and the upper surface of the broad 3x. In FIG. 1 (b), when the lever 3w is pushed down rightward, the chuck 3f moves leftward and opens the holding of the thermoplastic film 1.

Figure 2:
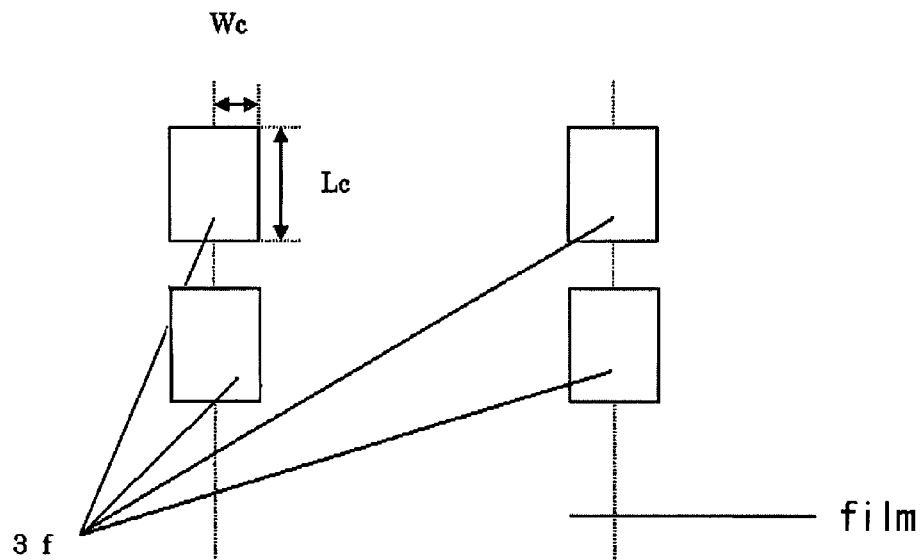
FIG. 2 is a plan view of FIG. 1 (b) seen from the top thereof.

The FIG. 2 is a plan view illustrating a clutch length (Lc) of a chuck and a clutch depth (Wc) of the chuck. In the present invention, the clutch length (Lc) of a chuck means the contact distance between a chuck and the longitudinal direction of a film, and the clutch depth (Wc) of the chuck shows the contact distance between the chuck and the transverse direction of a film.

According to the invention, if a glass transition temperature of the transparent thermoplastic film refers to Tg, the transverse stretching is performed preferably in the range of from Tg−10° C. to Tg+50° C., more preferably in the range of from Tg° C. to Tg+40° C., and further more preferably in the range of from Tg+5° C. to Tg+30° C.

(2) At the time of clutching the film in the transverse stretching, a temperature of the chucks is configured to be preferably in the range of from 60° C. to 200° C., more preferably in the range of from 70° C. to 180° C., and further more preferably in the range of from 50° C. to 160° C. Generally, after the chucks are removed from the stretched portion exit, the chucks return to the stretched portion entrance. However, the temperature in this time is reduced to the room temperature. According to the invention, until the chucks return to the stretched portion entrance, it is desirable that the chucks are heated such that the temperature thereof keeps at the above described temperature.

That is, when the chucks clutch the film at the entrance, it is easy for the residue distortion to occur due the impact of the low temperature of the chucks. The residue distortion is likely to be amplified and the stretch irregularity (where the local thermal expansion and the optical elasticity modulus distribution occur). Consequently, the distribution of the orientation angle is likely to be increased. As a result, before the chucks clutch the film as described above, it is desirable that the chucks are heated in advance. The chucks can be heated by hot wind or radiant heat such as a infrared ray heater.

(3) The ratio ($V^1/V^2$) of a chuck transporting speed ($v^1$) in the transverse zone to a winding speed (V 2) after the transverse stretching is preferably in the range of from 1.001 to 1.1, more preferably in the range of from 1.005 to 1.05, and further more preferably in the range of from 1.008 to 1.03. Generally, after the film comes out of a tenter, the film is wound while the film is sheared using the tensile force. Consequently, $V^1/V^2$ is less than 1. However, according to the invention, it is desirable that the winding speed ($V^2$) after the removal of the chucks is slowed more than the chuck transporting speed ($V^1$) in the tenter as described above.

Since there is the residue distortion in the film immediately after the stretching, the residue distortion is likely to make the non-uniformity in the surface. That is, since there is a portion of the film in which the stretching is strongly undergone, the portion results in the non-uniformity in the surface. The non-uniformity results in the local thermal expansion and the optical elasticity modulus distribution, and thus it is likely to increase the orientation angle distribution also. Consequently, by keeping the $V^1/V^2$ in the foregoing range, it is possible to relax (alleviate) the locally excessive stretching more and lower the non-uniformity more.

(4) When the transverse stretch temperature refers to $T^1$ after the transverse stretch, the heat-treatment is performed at a temperature preferably in the range of from $T^1-50°$ C. to $T^1-2°$ C. (heat-treatment after the transverse stretch), more preferably in the range of from $T^1-40°$ C. to $T^1-4°$ C., and further more preferably in the range of from $T^1-35°$ C. to $T^1-6°$ C. In this manner, it is likely to make the distribution of the orientation angle small, and thus it is desirable to perform the above-described heat-treatment. That is, the variation in the orientation angle results from the neck-in phenomenon accompanied with the transverse stretching and the variation takes place since the central portion between the chucks is easy to be contracted more than the chuck portion (end portions). That is because the end portions are fixed by the chuck, and thus are difficult to be transformed whereas the central portion is easy to be transformed. As a result, the degree of the transformation of the central portion becomes large, and thus the orientation angle is transformed into a bow shape (Boeing phenomenon). Consequently, it is easy for the orientation angle of the end portions to be varied. That is, it is easy for the orientation angle of the end portions to be shifted from 0° or 90° and it is easy for the distribution of the orientation angle (the maximum value and the minimum value of the orientation angle measured over the entire width) to become large. As a result, in order to make variation in the orientation angle after the stretch small, it is necessary for the neck-in phenomenon not to occur after the stretch. By lowering the temperature to less than the stretch temperature and raising the elasticity modulus of the film, the transformation can be made difficult to be caused, thereby preventing the neck-in phenomenon from occurring. As a result, it is possible to prevent the distribution of the orientation angle. In addition, it is possible to prevent the thermal expansion distribution and the optical elasticity modulus distribution as well.

Here, FIG. 1 is a drawing illustrating a preheating zone length, a stretching zone length, and a widening angle in transverse stretching.

Figure 4:
FIG. 4 is a drawing illustrating a preheating zone length, a stretching zone length, and a widening angle in transverse stretching.
Figure 4:
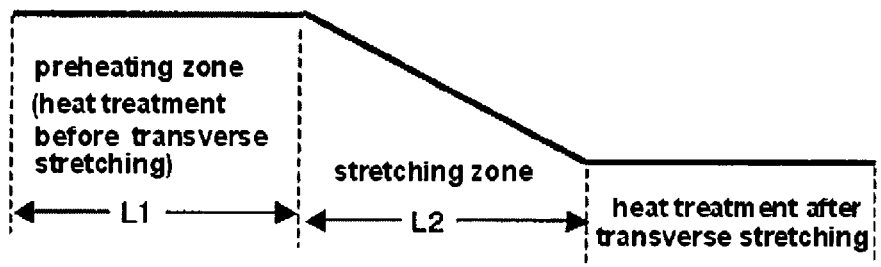

FIG. 4 is a drawing illustrating a preheating zone length, a stretching zone length, and a widening angle.

In the present invention, the uniform stretching is achieved by reducing the ratio (L2/L1) of the preheating length L1 and the stretching zone length L2 by 0.5 to 30. The widening angle shows the angle of the part where the widening (stretching) starts as shown in the drawing, which is preferably a gradual angle ranging from 10 to 40° C. in the present invention. The bowing can be inhibited by providing a heat-treatment zone after the transverse stretching and then carrying out a heat treatment.

Figure 5:
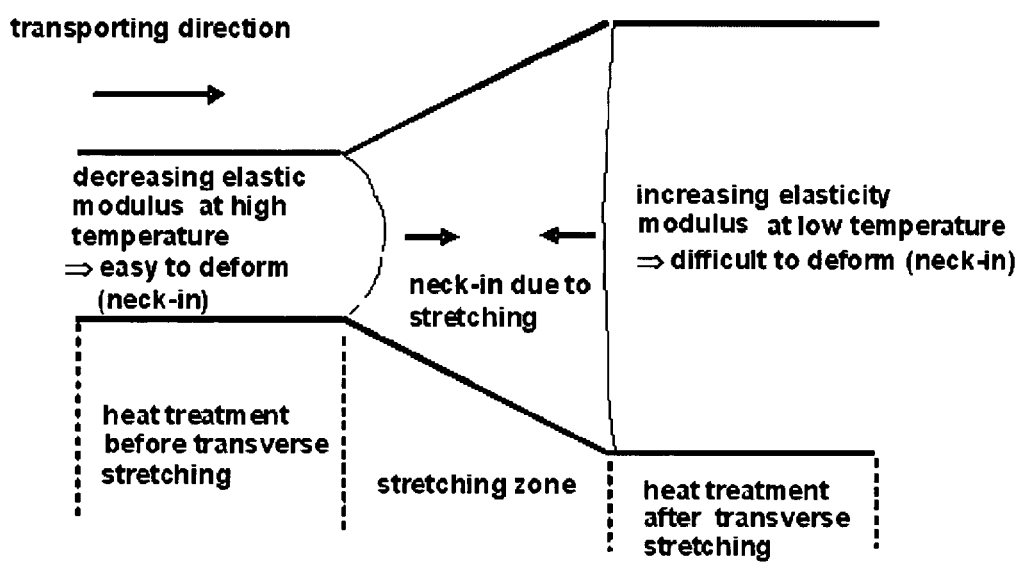
FIG. 5 is a drawing illustrating a mechanism decreasing the orientation angle by the heat-treatment before the transverse stretching and the heat-treatment after the transverse stretching.

FIG. 5 is a drawing illustrating a mechanism decreasing the orientation angle by the heat treatment before the transverse stretching and the heat treatment after the transverse stretching.

In the stretching zone, the stretching is performed in a width direction, thus the neck-in occurs in a perpendicular direction (transport direction), thereby trying to slenderize the film. Accordingly, the force trying to deform in the shape of bow occurs to the both sides of the stretching zone in a transport direction. When the temperature is high in the side of entrance (heat treatment temperature before transverse stretching) and the temperature is low in the side of exit (heat treatment after transverse stretching), the film in the side of entrance becomes softer than the film in the side of exit, thus the film easily deforms. As a result, the deformation in the shape of the bow occurs only in the side of entrance, but the deformation in the side of exit is inhibited, thus the deformation of bow shape (bowing) after the transverse stretching can be minimized, thereby obtaining the (more uniform) film having a small change in the orientation angle of the edge.

(5) When the transverse stretch temperature refers to $T^1$ before the transverse stretching, the heat-treatment is performed at a temperature preferably in the range of from $(T^1+2)°$ C. to $(T^1+50)°$ C. (heat-treatment before the transverse stretching), more preferably in the range of from $(T^1+4)°$ C. to $(T^1+45)°$ C., and further more preferably in the range of from $(T^1+6)°$ C. to $(T^1+40)°$ C. By using such a method, it is likely to make the distribution of the orientation angel small, and thus it is desirable to perform the above-mentioned heat-treatment. Such a heat-treatment, for example, can be performed in the preheating zone before the above-described transverse stretch.

By rising the temperature before the stretch high, the elasticity modulus of the film is made lowered, and then the neck-in phenomenon occurring (at the entrance side of the tenter) before the stretch is easily made occur. In this manner, by balancing the above described method with the (4) method in which it is difficult for the neck-in phenomenon to occur, it is possible to obtain the effect to make the orientation angle distribution smaller.

(6) The longitudinal stretch may be performed such that the aspect ratio (L/W) is preferably more than 0.01 and less than 0.3, more preferably in the range of from 0.05 to 0.25, and further more preferably in the range of from 0.08 to 0.2. According to the invention, the longitudinal stretching is achieved allowing the rim speed of the entrance portion to make faster than that of the exit portion using 2 pairs of nip rolls. In this case, the stretch length (length of the portion in which the film between the nip rolls does not contact to the nip rolls) refers to L, the width of the film before the stretching refers to W, and the ratio refers to L/W. According to the invention, L/W is made small and the stretching is performed so as to become a short span (where the general longitudinal stretch is performed in the ratio L/W>0.7 to 2). In this manner, it is possible to achieve the uniformed and prevent the orientation angle distribution. That is because the necking can easily occur, and thus the stretch irregularity can easily occur when L/W is stretched in the range of from 0.7 to 2 in the longitudinal stretch. Conversely, when the stretching is performed so as to become the short span according to the invention, the necking is difficult to occur, thereby improving the uniformity in the width direction. In addition, it is possible to prevent the thermal expansion distribution and the optical elasticity modulus distribution resulting from the stretch irregularity as well.

The magnification of the longitudinal stretching is preferably in the range of from 1% to 100%, more preferably in the range of from 2% to 50%, and further more preferably in the range of from 3% to 30%. The stretch magnification is defined as Formula (1) described above.

The longitudinal stretching is performed preferably in the temperature range of (Tg−20)° C. to (Tg+50)° C., more preferably in the temperature range of Tg to (Tg+40)° C., further more preferably in the range of from (Tg+5)° C. to (Tg+30)° C.

Figure 6:
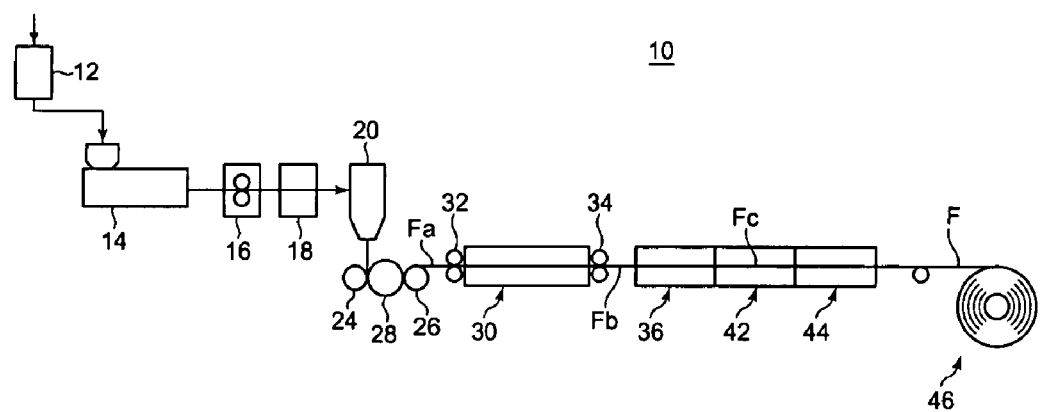
FIG. 6 is a diagrammic illustration of an apparatus for producing a thermoplastic resin film formed by stretching at a short span.

FIG. 6 is a diagram illustration for a short span stretching. In this apparatus for producing a film 10a, the unstretched film Fa is preheated up to the predetermined temperature by preheating rollers 33, 35, and fed between two pairs of nip rollers 37, 39, thereby longitudinally stretched. In this case, the nip roles 37, 39 are arranged in proximity to the transport direction of the unstretched film Fa and also in a top and bottom direction so that only predetermined distance is different in height. Such arrangement of the nip rollers 37, 39 enables a short span stretching by curtailing the transport distance of the unstretched film Fa in the longitudinal stretching part 30a.

Figure 7:
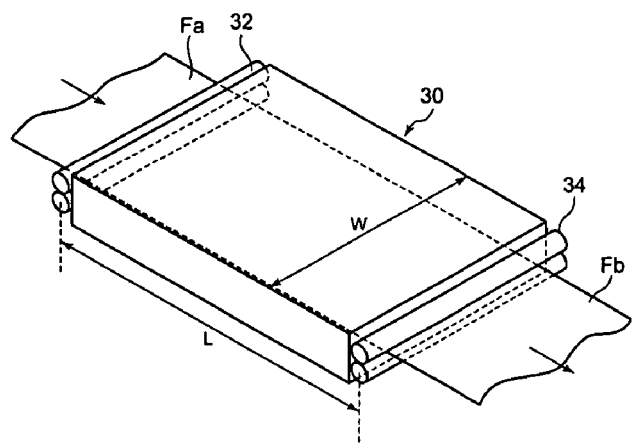
FIG. 7 is a perspective illustration of a longitudinal stretching part in FIG. 6.

In addition, FIG. 7 is a perspective illustration of the longitudinal stretching part 30a, wherein the length/width ratio of longitudinal stretching (L/W) is defined by L, the distance of transport direction of the unstretched film Fa, which is held by the nip rollers 37, 39, and W, the width of the nip rollers 37, 39 in the longitudinal direction.

In the transverse stretching part 42, the longitudinally stretched film Fb is stretched in the width direction perpendicular to the transport direction, thereby a transversely stretched film Fc is formed. Then, the transversely stretched film Fc is fed to a heat-solidifying part 44 and take up by a rolling-up part 46, thereby, as an end article, a thermoplastic film, which is adjusted the orientation angle and the retardation thereof, is produced. The transversely stretched film Fc after passing through the heat-solidifying part 44 may be carried out a heat-relaxing treatment. In addition, as the order of the stretching, the longitudinal stretching may be carried out after the transverse stretching.

(6-2) The longitudinal stretch may be performed in the state that the aspect ratio is preferably more than 2 and 50 or less, more preferably in the range of from 3 to 40, and further more preferably in the range of from 4 to 20.

The stretching leads to expanding the film, but the thickness and width of the film are made decreased in order to allow the change in the volume small. In this case, owing to the friction between the nip roll and film, the contraction in the width direction is limited.

Consequently, when the gap between the nip rolls is enlarged, the contraction in the width direction is easy, thereby preventing the decrease in the thickness. When the decrease in the thickness is large, the same effect as the contraction in the thickness direction can be achieved. Consequently, molecular orientation in the film surface is progressed, and thus the Rth is easy to be increased.

Conversely, when the aspect ratio is large and the thickness decrease is small, the Rth is difficult to be shown, and thus it is possible to achieve the low Rth.

In addition, when the aspect ratio is long, it is possible to improve the uniformity in the width direction. The reason is as follows:

The longitudinal stretching leads to the contraction of the film in the width direction. Since both of the end portions are contracted in the width direction, the central portion is in the state of the tug of war, and thus cannot be contracted freely.

The end portions in the width direction of the film are not in the state of the tug of war, and thus can be contracted freely.

The difference in the contraction behavior accompanied with the stretching of the end portions and central portion become the stretch irregularity in the width direction.

The retardation irregularity and the axis shift (distribution of the orientation angle of the delayed phase axis) occur due to the irregularity of the end portions and the central portion. Conversely, since the long span stretching is slowly performed between the 2 nip rolls, the uniformity (where the molecular orientation becomes uniformed) of the non-uniformity during the stretch is progressed. However, with the conventional longitudinal stretching (the aspect ratio=0.7 to 2), such a uniformity does not occur.

The stretch temperature is preferably in the range of from (Tg−5)° C. to (Tg+100)° C., more preferably Tg to (Tg+50)° C., and further more preferably (Tg+5)° C. to (Tg+30)° C. The stretch magnification is preferably in the range of from 1.05 to 3, more preferably in the range of from 1.05 to 1.7, and further more preferably in the range 1.05 to 1.4. The long span stretching can be performed to 3 pairs or more nip rolls in the multistage manner, and the longest aspect among the multistage is necessary to be in the range.

The stretching of which the aspect ratio is more than 2 and 50 or less is performed heating the film between the 2 pairs of the nip rolls provided to be away as much as a predetermined distance. The heating method may be a heater heating method (heated by radiant heat by installing an infrared heater, a halogen heater, a panel heater, and the like on or below the film) or a zone heating method (heated in a zone irradiated at a predetermined temperature by blowing hot wind). In the invention, the zone heating method is desirable in terms of the uniformity of the stretch temperature. In this case, the nip rolls may be installed in the stretching zone or out the stretching zone. However, in order to prevent the nip rolls from being adhered, it is desirable to install the nip rolls out the zone. It is desirable to preheat the film before the stretch and the preheating temperature is in the range of from (Tg−80)° C. to (Tg+100)° C.

Figure 8:
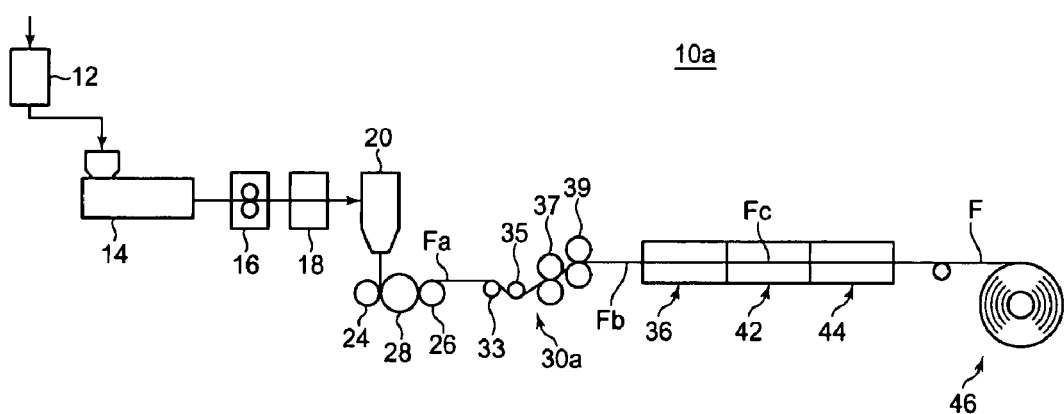
FIG. 8 is a diagrammic illustration of an apparatus for producing a thermoplastic resin film formed by stretching at a long span.

FIG. 8 is a diagram illustrating the mechanism of an apparatus for producing a film 10, in which the stretching is carried out at a long span and the thermoplastic resin film is formed by a melt extrusion process.

Figure 9:
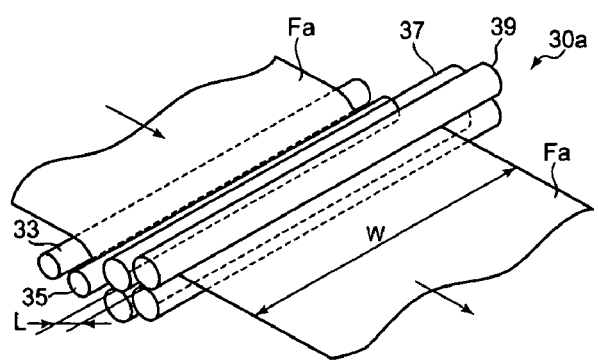
FIG. 9 is a perspective illustration of a longitudinal stretching part in FIG. 8.

The apparatus for producing a film 10 produces a thermoplastic resin film F applicable for a liquid crystal display device and so on. A cellulose acylate resin in the form of pellets as a starting material of the thermoplastic resin film F is placed into a dryer 12 and dried, and then is extruded by a extruder 14 and fed to a filter 16 by the gear pump, and then is filtrated by a filter 18 to filtrate a foreign matter and extruded from a die 20. After that, it is held with a casting drum 28 and touch rolls 24, and solidified during passing between the casting drum 28 and the roles 26, and an unstretched film Fa having a given surface condition is formed. This unstretched film Fa is fed to the longitudinal stretch part 30. In a longitudinal stretching part 30, the unstretched film Fa is stretched in the transport direction between a nip roller on the entrance side 32 and a nip roller on the exit side 34, thereby a longitudinally stretched film Fb is formed. In addition, FIG. 9 is a perspective illustration of a longitudinal stretch part 30, wherein a length/width ratio of the longitudinal stretching (L/W) is defined by the distance L between the nip roller on the entrance side 32 and the nip roller on the exit side 34 and the width W of the longitudinal direction between the nip roller on the entrance side 32 and the nip roller on the exit side 34. Next, the longitudinally stretched film Fb is fed to a transverse stretching part 42 after the longitudinally stretched film Fb is preheated to the predetermined preheating temperature by passing through a preheating part 36. In the transverse stretching part 42, the longitudinally stretched film Fb is stretched in the width direction perpendicular to the transport direction, thereby a transversely stretched film Fc is formed. Then, the transversely stretched film Fc is fed to a heat solidifying part 44 and take up by a rolling-up part 46, thereby, as an end article, a thermoplastic film which is adjusted the orientation angle and the retardation thereof is produced. The transversely stretched film Fc after passing through the heat solidifying part 44 may be carried out a heat-relaxing treatment.

In the FIG. 8, though the longitudinal stretching and transverse stretching is carried out with following the film forming, those stretching may be independently carried out. In addition, as the order of the stretching, the longitudinal stretching may be carried out after the transverse stretching. Any one of the longitudinal stretching and the transverse stretching may be carried out.

(7) At least the stretch temperature after the longitudinal stretching or after the transverse stretching is preferably in the range of from (Tg−30)° C. to (Tg+30)° C., more preferably in the range of from (Tg−20)° C. to (Tg+20)° C., and further more preferably in the range of from (Tg−15)° C. to (Tg+15)° C. In addition, the total relaxation in the longitudinal and the transverse directions is preferable in the range of from 1% to 20%, more preferably in the range of from 2% to 15%, and further more preferably in the range of from 3% to 12%. By using such means, more stretched portion is relaxed. Consequently, it is possible to improve the uniformity in the film surface and it is likely to prevent the stretch irregularity (where local thermal expansion and the optical elasticity modulus distribution occur). Furthermore, it is likely to decrease the orientation angle distribution as well.

The relaxation in the longitudinal direction (longitudinal relaxation) can be achieved by performing the heat-treatment, for example, transporting the film with a low tensile force (for example, 20 Kg/m or less, preferably 10 Kg/m or less). The relaxation can be measured by checking how much the indication in the longitudinal direction of the film at the fixed interval is reduced after the relaxation. The longitudinal relaxation may be performed between the longitudinal stretch and the transverse stretch, after longitudinal stretch, or after transverse stretching.

The relaxation in the width direction (transverse relaxation) can be achieved by narrowing the tenter width as much as 1% to 20%, more preferably 2% to 15% after the stretching. The temperature of the transverse relaxation is in the above described range. Such a transverse relaxation may be performed together with the heat-treatment after the stretching, before the heat-treatment after the stretching, or after the heat-treatment after the stretching.

The effect can be obtained by using any one of the relaxation in the longitudinal direction (longitudinal relaxation) and the relaxation in the transverse direction (transverse relaxation), and it is desirable that the combination thereof is performed.

The number average degree of polymerization of the thermoplastic film used according to the invention is in the range of from 15 to 3000, more preferably in the range of from 30 to 600. The number average degree of the polymerization is preferably in the range of from 110 to 270, more preferably in the range of from 120 to 260, and further more preferably in the range of from 140 to 250 when a thermoplastic resin is the cellulose acylate. Owing to the range, it is possible to prevent the stretch irregularity and decrease the distribution of heat contraction distribution and the distribution of the elasticity modulus.

(Cellulose Acylate Resin)

Cellulose acylate used in the invention preferably has the following characteristics (A indicates a substitution degree of acetate group and B indicates the sum total of substitution degrees of propionate group, butylate group, and pentaoyl group.):

$$2.0 \leq A+B < 3.0 \text{ and}$$

$$0.1 \leq B < 3,$$

more preferably, provided that over ½ of B is formed of the propionate group, $$2.6 \leq A+B \leq 2.95 \text{ and}$$

$$2.0 \leq B \leq 2.95,$$

provided that below ½ of B is formed of the propionate group, $$2.6 \leq A+B \leq 2.95 \text{ and}$$

$$1.3 \leq B \leq 2.5,$$

and further preferably, provided that over ½ of B is formed of the propionate group, $$2.7 \leq A+B \leq 2.95 \text{ and}$$

$$2.4 \leq B \leq 2.9,$$

provided that below ½ of B is formed of the propionate group, $$2.7 \leq A+B \leq 2.95 \text{ and}$$

$$1.3 \leq B \leq 2.0.$$

In the invention, the substitution degree of the acetate group taken in the acyl group is set to have a small value and the sum total of substitution degrees of propionate group, butylate group, and pentaoyl group is set to have a large value. Accordingly, it becomes easier to perform the stretching and a generation of heterogeneity (unevenness) due to the stretching can be reduced. The reason is that, by having more groups which have a size longer than the acetate group, flexibility of the film can be improved, thereby increasing stretching property of the film. When a group which has a size longer than the acyl group is contained, the glass transition temperature or the elasticity modulus tends to be excessively deteriorated. Therefore, it is preferable to contain the propionate group, the butylate group, and the pentaoyl group which are larger than the acetate group, more preferably the propionate group and the butylate group, and further preferably the propionate group.

For the Tg of cellulose acylate used in the invention, 100 to 180° C. is preferred and 120 to 160° C. is more preferred.

Description will now be made in detail of a method of preparing cellulose acylate of the present invention. Raw cotton and a synthesizing method for the cellulose acylate of the present invention are also described in detail in Published Technical Report of the Hatsumei Kyokai (Association of Inventions) (Published Report No. 2001-1745, published on Mar. 15, 2001 by Hatsumei Kyokai), pages 7 to 12.

(Raw Materials and Preliminary Treatment)

The material for cellulose is preferably derived from hardwood or softwood pulp, or cotton linter. The material for cellulose is preferably one of high purity having an α-cellulose content of 92 to 99.9% by mass.

If the material is in the form of a sheet or block, it is preferably crushed prior to use and its crushing is preferably carried out until cellulose becomes fluffy.

(Activation)

The material for cellulose is preferably treated with an activating agent (or activated) prior to acylation. A carboxylic acid or water can be used as the activating agent and when water is used, activation is preferably followed by the step of adding an excess of an acid anhydride for dehydration, washing with a carboxylic acid to replace water, or adjusting the conditions of acylation. The activating agent may be added at any temperature by such a method as spraying, dropping or dipping.

Carboxylic acids preferred as an activating agent are carboxylic acids having 2 to 7 carbon atoms (for example, acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptanoic acid, cyclohexanecarboxylic acid and benzoic acid), more preferably acetic acid, propionic acid or butyric acid, and still more preferably acetic acid.

An acylation catalyst, such as sulfuric acid, may be added at the time of activation, if required. However, as the addition of a strong acid, such as sulfuric acid, can promote depolymerization, its addition is preferably limited to, say, 0.1 to 10% by mass of cellulose. It is also possible to use two or more kinds of activating agents together, or add an acid anhydride of carboxylic acid having 2 to 7 carbon atoms.

The amount of the activating agent to be added is preferably at least 5%, more preferably at least 10% and still more preferably at least 30%, by mass of cellulose. The amount of the activating agent which is equal to or larger than the lower limit stated above is preferable for avoiding any inconvenience, such as a reduction in the activation degree of cellulose. The upper limit of the amount of the activating agent is not specifically set except for avoiding a lowering of productivity, but is preferably at most 100 times, more preferably at most 20 times and still more preferably at most 10 times, by mass as large as cellulose. It is allowable to carry out activation by adding a large excess of activating agent over cellulose and then reduce its amount by operations, such as filtration, air drying, drying under heat, vacuum distillation and solvent substitution.

Time for activation is preferably 20 minutes or more and while its upper limit is not specifically set unless it affects productivity, it is preferably 72 hours or less, more preferably 24 hours or less and still more preferably 12 hours or less. The activation temperature is preferably from 0° C. to 90° C., more preferably from 15° C. to 80° C. and still more preferably from 20° C. to 60° C. The activation of cellulose may also be carried out at an elevated or reduced pressure. Electromagnetic waves, such as microwaves or infrared radiation, may be used as a source of heat.

By performing the above-mentioned methods such as the activation treatment, the obtainable luminescent spots of the film can be allowed to be 25 number/cm$^2$ or less, preferably 22 number/cm$^2$ or less, and more preferably 20 number/cm$^2$ or less. The luminescent spots, for example, results from the unreacted cellulose among the cellulose acylate. That is, since an acylating agent tends to rarely penetrate into the internal cellulose, the unreacted cellulose can remain. Consequently, by fully swelling the internal cellulose by the means of the above-described activation treatment so as to easily penetrate the acylating agent, it is possible to decrease the luminescent spots. The luminescent spots results from the fibrous form of the original cellulose and is in the shape of the long needle. Consequently, since it is not enough to be filtered in the filter material, it is desirable to remove the acylating agent from the reaction step according to the invention. When the cellulose acylate film including 25 number/cm$^2$ or less of the luminescent spots is stretched, the stretching irregularity is likely to occur with a focus on the luminescent spots, that is, thermal expansion coefficient and optical elasticity distribution is likely to occur locally.

(Acylation)

In a method of preparing cellulose acylate according to the present invention, it is preferable to add a carboxylic acid anhydride to cellulose and react them in the presence of a Brönsted or Lewis acid as a catalyst to acylate the hydroxyl groups of cellulose.

Cellulose mixed acylate can be obtained by using, for example, a method in which two kinds of carboxylic acid anhydrides are added in a mixed state or one after the other as an acylating agent to be reacted with cellulose, a method employing a mixed acid anhydride of two kinds of carboxylic acids (for example, a mixed acetic and propionic acid anhydride), a method in which a mixed acid anhydride (for example, a mixed acetic and propionic acid anhydride) is synthesized in a reaction system from a carboxylic acid and the anhydride of another carboxylic acid (for example, acetic acid and propionic acid anhydride) and reacted with cellulose, or a method in which cellulose acylate having a substitution degree of less than 3 is synthesized and has its remaining hydroxyl groups acylated by using an acid anhydride or halide.

(Acid Anhydrides)

Preferred examples of carboxylic acid anhydrides are of carboxylic acids having 2 to 7 carbon atoms and include anhydrous acetic acid, propionic acid anhydride, butyric acid anhydride, 2-methylpropionic acid anhydride, valeric acid anhydride, 3-methylbutyric acid anhydride, 2-methylbutyric acid anhydride, 2,2-dimethylpropionic acid anhydride (pivalic acid anhydride), hexanoic acid anhydride, 2-methylvaleric acid anhydride, 3-methylvaleric acid anhydride, 4-methyl-valeric acid anhydride, 2,2-dimethylbutyric acid anhydride, 2,3-dimethylbutyric acid anhydride, 3,3-dimethylbutyric acid anhydride, cyclopentanecarboxylic acid anhydride, heptanoic acid anhydride, cyclohexanecarboxylic acid anhydride and benzoic acid anhydride.

More preferable are anhydrous acetic acid, propionic acid anhydride, butyric acid anhydride, valeric acid anhydride, hexanoic acid anhydride, heptanoic acid anhydride, and the like and still more preferable are anhydrous acetic acid, propionic acid anhydride and butyric acid anhydride.

The use of a combination of these acid anhydrides is preferably made for preparing a mixed ester. Their mixing ratio is preferably selected in accordance with the substitution ratio of a mixed ester as intended. The acid anhydride is usually added in an excess equivalent to cellulose. More specifically, it is preferable to add from 1.2 to 50 equivalents, more preferably from 1.5 to 30 equivalents and still more preferably from 2 to 10 equivalents to the hydroxyl groups of cellulose.

(Catalyst)

A Brönsted or Lewis acid is preferably used as an acylation catalyst in preparing cellulose acylate according to the present invention. The definitions of the Brönsted and Lewis acids are found in, for example, "Rikagaku Jiten" (Encyclopedia of Physics and Chemistry), 5th Edition (2000). Preferred examples of Brönsted acids are sulfuric acid, perchloric acid, phosphoric acid, methanesulfonic acid, benzenesulfonic acid and p-toluenesulfonic acid. Preferred examples of Lewis acids are zinc chloride, tin chloride, antimony chloride and magnesium chloride.

Sulfuric or perchloric acid is more preferable as a catalyst and sulfuric acid is still more preferable. The catalyst is preferably added in the amount of from 0.1 to 30%, more preferably from 1 to 15% and still more preferably from 3 to 12% by mass of cellulose.

(Solvent)

A solvent may be added at the time of acylation for adjusting viscosity, reaction rate, stirring property, acyl substitution ratio, and the like. While dichloromethane, chloroform, carboxylic acid, acetone, ethyl methyl ketone, toluene, dimethyl sulfoxide or sulfolane can, for example, be used as the solvent, carboxylic acid is preferred, including, for example, carboxylic acid having 2 to 7 carbon atoms (for example, acetic acid, propionic acid, butyric acid, 2-methylpropionic acid, valeric acid, 3-methylbutyric acid, 2-methylbutyric acid, 2,3-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid or cyclopentanecarboxylic acid). Acetic acid, propionic acid, butyric acid, and the like are, among others, preferred. A mixture of solvents can also be used.

(Conditions for Acylation)

Although acylation can be carried out by mixing a mixture of an acid anhydride, a catalyst and a solvent, if required, with cellulose, or by mixing them one after another with cellulose, it is usually preferable to prepare a mixture of an acid anhydride and a catalyst, or a mixture of an acid anhydride, a catalyst and a solvent as an acylating agent and react it with cellulose. It is preferable to cool the acylating agent beforehand to restrain any temperature elevation in the reaction vessel by the heat of the acylation reaction. It is preferably cooled to a temperature of from −50° C. to 20° C., more preferably from −35° C. to 10° C., and still more preferably from −25° C. to 5° C. The acylating agent may be employed in a liquid state, or may be frozen and employed in a solid state in crystal, flake or block form.

The acylating agent may be added to cellulose all at a time, or may be added thereto a plurality of times. Alternatively, cellulose may be added to the acylating agent all at a time, or may be added thereto a plurality of times. When the acylating agent is added a plurality of times, it is possible to use a single kind of acylating agent or a plurality of acylating agents differing from one another in composition. Preferred cases include (1) adding first a mixture of an acid anhydride and a solvent, and then a catalyst, (2) adding first a mixture of an acid anhydride, a solvent and a part of a catalyst, and then a mixture of the remaining catalyst and the solvent, (3) adding first a mixture of an acid anhydride and a solvent, and then a mixture of a catalyst and the solvent, and (4) adding first a solvent, and then a mixture of an acid anhydride and a catalyst, or a mixture of the acid anhydride, catalyst and solvent.

Although the acylation of cellulose is an exothermic reaction, it is preferable that a maximum temperature of 50° C. not be exceeded by acylation in the method of preparing cellulose acylate according to the present invention. The reaction temperature not exceeding that level is preferable for avoiding any inconvenience such as the progress of depolymerization making it difficult to obtain cellulose acylate having a polymerization degree suited for the purpose of the present invention. The maximum temperature not to be exceeded by acylation is preferably 45° C., more preferably 40° C. and still more preferably 35° C. The reaction temperature may be controlled by using a temperature controller, or by controlling the initial temperature of the acylating agent. It is also possible to evacuate the reaction vessel and control the reaction temperature by the heat generated by the evaporation of the liquid component in the reaction system. It is also effective to employ cooling during the initial period of the reaction and heating thereafter, since the generation of heat by acylation is remarkable during the initial period of the reaction. The end point of acylation can be determined by means of light transmittance, solution viscosity, temperature change in the reaction system, solubility of the reaction product in an organic solvent, observation through a polarizing microscope, and the like.

The minimum temperature of the reaction is preferably −50° C., more preferably −30° C. and still more preferably −20° C. Time for acylation is preferably from 0.5 to 24 hours, more preferably from 1 to 12 hours and still more preferably from 1.5 to 6 hours. If it is less than 0.5 hour, the reaction does not proceed satisfactorily under the usual reaction conditions, while no time exceeding 24 hours is desirable for industrial production.

(Reaction Terminator)

According to the method of preparing cellulose acylate for the purpose of the present invention, the acylation reaction is preferably followed by the addition of a reaction terminator.

The reaction terminator may be anything that can decompose an acid anhydride, and preferred examples are water, alcohol (such as ethanol, methanol, propanol or isopropyl alcohol) or a composition containing them. The reaction terminator may also contain a neutralizing agent, as will be stated below. When the neutralizing agent is added, the addition of a mixture of a carboxylic acid, such as acetic, propionic or butyric acid, and water is preferable to the direct addition of water or alcohol for avoiding the generation of a large amount of heat exceeding the cooling capacity of the reaction apparatus and causing inconveniences, such as a reduction in the polymerization degree of cellulose acylate and any undesired sedimentation of cellulose acylate. Acetic acid is preferable to any other carboxylic acid. While any ratio of carboxylic acid and water can be employed, the proportion of water is preferably from 5 to 80%, more preferably from 10 to 60% and still more preferably from 15 to 50% by mass.

The reaction terminator may be added to the reaction vessel for acylation, or alternatively, the reaction mixture may be added to a container for the reaction terminator. The addition of the reaction terminator preferably takes from three minutes to three hours. Its addition taking three minutes or more is preferable for avoiding any inconvenience, such as the generation of so large an amount of heat as to cause a lowering in the polymerization degree of cellulose acylate, insufficient hydrolysis of the acid anhydride or a lowering in stability of cellulose acylate. Its addition not taking more than three hours is preferable for avoiding any problem, such as a reduction in industrial productivity. Its addition more preferably takes from four minutes to two hours, still more preferably from five minutes to one hour and still more preferably from 10 to 45 minutes. While the addition of the reaction terminator does not essentially require any cooling of the reaction vessel, its cooling is preferable for restraining any undesirable temperature elevation and thereby any depolymerization. The reaction terminator is preferably cooled, too.

(Neutralizing Agent)

A neutralizing agent (for example, the carbonate, acetate, hydroxide or oxide of calcium, magnesium, iron, aluminum or zinc) or a solution thereof may be added during the step of terminating the acylation reaction or thereafter to hydrolyze any excessive carboxylic acid anhydride remaining in the system and neutralize a part or all of the carboxylic acid and esterifying catalyst. Preferred examples of solvents for the neutralizing agent are water, alcohols (for example, ethanol, methanol, propanol and isopropyl alcohol), carboxylic acids (for example, acetic acid, propionic acid and butyric acid), ketones (for example, acetone and ethyl methyl ketone), dimethylsulfoxide and other polar solvents, and a mixture thereof.

(Partial Hydrolysis)

As the cellulose acylate obtained as described has a total substitution degree of nearly 3, it is usual practice to hold it at a temperature of 20° C. to 90° C. for several minutes to several days in the presence of a small amount of catalyst (usually an acylation catalyst, such as the remaining sulfuric acid) and water for hydrolyzing the ester bonds partially and lowering the acyl substitution degree of cellulose acylate to a desired level (so-called aging). As the process of the partial hydrolysis causes the hydrolysis of the sulfuric acid ester of cellulose, too, it is possible to reduce the amount of the sulfuric acid ester bonded to cellulose by controlling the conditions of the hydrolysis.

When the desired cellulose acylate has been obtained, it is preferable to neutralize the catalyst remaining in the system completely by using a neutralizing agent as mentioned above or a solution thereof to terminate the partial hydrolysis. The addition of a neutralizing agent (for example, magnesium carbonate or acetate) forming a salt having low solubility in the reacted solution is desirable for the effective removal of the catalyst (for example, sulfuric acid ester) in the solution or bonded to cellulose.

(Filtration)

The reaction mixture (dope) is preferably subjected to filtration for removing or reducing any unreacted matter, sparingly soluble salt and any other foreign matter from the cellulose acylate. Its filtration may be carried out at any stage from the completion of acylation to reprecipitation. Its dilution with a suitable solvent prior to its filtration is preferable for controlling its filtration pressure and its ease of handling.

(Reprecipitation)

The cellulose acylate solution as obtained is mixed in a poor solvent such as water or an aqueous solution of a carboxylic acid (for example, acetic or propionic acid), or a poor solvent is mixed in the cellulose acylate solution, so that cellulose acylate may be reprecipitated, and its washing and stabilization treatment give the intended cellulose acylate. Its reprecipitation may be carried out continuously, or on a batch basis. It is preferable to adjust the concentration of the cellulose acylate solution and the composition of the poor solvent by the mode of substitution of cellulose acylate or its polymerization degree to thereby control the form of the reprecipitated cellulose acylate and its molecular weight distribution.

(Washing)

The cellulose acylate as produced is preferably washed. Any washing solvent may be used if it sparingly dissolves cellulose acylate and yet can remove impurities therefrom, though water or warm water is usually employed. Washing water preferably has a temperature of from 25° C. to 100° C., more preferably from 30° C. to 90° C. and still more preferably from 40° C. to 80° C. Washing treatment may be made on a batch basis by repeating filtration and the change of the washing solution, or by using a continuous washing apparatus. The waste solution resulting from the steps of reprecipitation and washing is preferably reused as a poor solvent for another step of reprecipitation, or distilled or otherwise treated so that a solvent, such as carboxylic acid, may be recovered for reuse.

While any method can be used for checking the progress of washing, preferred examples thereof rely on hydrogen ion concentration, ion chromatography, electrical conductivity, ICP, elemental analysis and atomic absorption spectrum.

Such treatment makes it possible to remove the catalyst (such as sulfuric acid, perchloric acid, trifluoroacetic acid, p-toluenesulfonic acid, methanesulfonic acid or zinc chloride), the neutralizing agent (such as the carbonate, acetate, hydroxide or oxide of calcium, magnesium, iron, aluminum or zinc), the reaction product of the neutralizing agent and the catalyst, the carboxylic acid (such as acetic, propionic or butyric acid), the reaction product of the neutralizing agent and the carboxylic acid, and the like from cellulose acylate, and is, therefore, effective for increasing the stability of cellulose acylate.

(Stabilization)

The cellulose acylate which has been washed by warm water treatment is preferably treated with an aqueous solution of a weak alkali (for example, the carbonate, hydrogen carbonate, hydroxide or oxide of sodium, potassium, calcium, magnesium or aluminum) in order to be further improved in stability, or have any odor of carboxylic acid removed.

The amount of the remaining impurities can be controlled by the amount of the washing solution, washing temperature or time, a method of stirring, the shape of a washing container, and the composition and concentration of the stabilizing agent.

(Drying)

Cellulose acylate is preferably dried to have its water content adjusted to a desired level in accordance with the present invention. While any drying method can be employed if it enables the intended water content to be realized, it is desirable to perform drying efficiently by employing a method such as heating, air blowing, pressure reduction or stirring, or a combination thereof. Drying is preferably performed at a temperature of from 0° C. to 200° C., more preferably from 40° C. to 180° C. and still more preferably from 50° C. to 160° C. The cellulose acylate of the present invention preferably has a water content of 2% by mass or less, more preferably 1% by mass or less, and still more preferably 0.7% by mass or less.

(Form)

The cellulose acylate of the present invention may have any of various forms, such as particulate, powdery, fibrous or block, but since it is preferably particulate or powdery as a material for film manufacture, the cellulose acylate as dried may be crushed or sieved to have a uniform particle size and an improved property of handling. When cellulose acylate is particulate, at least 90% by mass of its particles which are used preferably have a particle size of 0.5 to 5 mm. Moreover, at least 50% by mass of its particles which are used preferably have a particle size of 1 to 4 mm. The cellulose acylate particles are preferably as close to spherical as possible in shape. In addition, the particles of cellulose acylate of the invention preferably have appearant density in the range of 0.5 to 1.3, more preferably in the range of 0.7 to 1.2, and particularly preferably in the range of 0.8 to 1.15. The method of measuring appearant density is in accordance with JIS K-7365.

The particles of cellulose acylate of the invention preferably have a repose angle in the range of 10° to 70°, more preferably in the range of 15° to 60°, and particularly preferably in the range of 200 to 50°.

(Polymerization Degree)

The number average polymerization degree of cellulose acylate preferably used in the invention is in the range of 110 to 270, preferably in the range of 120 to 260, and more preferably in the range of 140 to 250. In the invention, the number average polymerization degree of cellulose acylate is determined by using gel permeation chromatography (GPC) described later.

According to the present invention, the weight average polymerization degree/number average polymerization degree of cellulose acylate as determined by GPC is preferably in the range of 1.6 to 3.6, more preferably in the range of 1.7 to 3.3 and particularly preferably in the range of 1.8 to 3.2.

As for cellulose acylate, one kind of a cellulose acylate or a mixture of two or more kinds of cellulose acylates may be used. In addition, a mixture in which cellulose acylate and other high molecular components are properly mixed may be used. The high molecular components to be mixed preferably have excellent compatibility with cellulose acylate. The permeability, in case of being formed as a film, is preferably of 80% or higher, preferably 90% or higher, and further preferably 92% or higher.

(Aromatic Acylated Cellulose Acylate)

In the invention, it is also preferred to use cellulose acylate of which composition satisfies the following formulae (T-1) and (T-2):

$$2.5 \leq A+C \leq 3.0 \text{ and} \qquad \text{Formula (T-1)}$$

$$0.1 \leq C < 2, \qquad \text{Formula (T-2)}$$

more preferably satisfies the following $$2.6 \leq A+C \leq 2.95 \text{ and} \qquad \text{Formula (T-3)}$$

$$0.1 \leq C < 1.5, \qquad \text{Formula (T-4)}$$

further preferably satisfies the following $$2.7 \leq A+C \leq 2.95 \text{ and} \qquad \text{Formula (T-3)}$$

$$0.1 \leq C < 1.0. \qquad \text{Formula (T-4)}$$

Wherein, A indicates a substitution degree of an acetate group and C indicates a substituted or unsubstituted aromatic acyl group.

Here, as for the substituted or unsubstituted aromatic acyl group, a group represented by the following general formula (I) may be used.

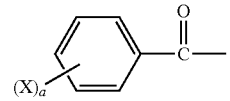

General Formula (I)

First, the general formula (I) will be described. X indicates a substitution group. Examples of the substitution group include a halogen atom, a cyano group, an alkyl group, an alkoxy group, an aryl group, an aryloxy group, an acyl group, a carbonamide group, a sulfonamide group, an ureido group, an aralkyl group, a nitro group, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulfonyl group, an aryloxysulfonyl group, an alkylsulfonyloxy group, an aryloxysulfonyl group, —S—R, —NH—CO—OR, —PH—R, —P(—R)$_2$, —PH—O—R, —P(—R)(—O—R), —P(—O—R)$_2$, —PH(=O)—R—P(=O) (—R)$_2$, —PH(=O)—O—R, —P(=O)(—R)(—O—R), —P(=O)(—O—R)$_2$, —O—PH (=O)—R, —O—P(=O) (—R)$_2$—O—PH(=O)—O—R, —O—P(=O) (—R) (—O—R), —O—P(=O) (—O—R)$_2$, —NH—PH(=O)—R, —NH—P(=O)(—R)(—O—R), —NH—P(=O)(—O—R)$_2$, —SiH$_2$—R, —SiH(—R)$_2$, —Si (—R)$_3$, —O—SiH$_2$—R, —O—SiH(—R)$_2$, and —O—Si(—R)$_3$. Here, R indicates an aliphatic group, an aromatic group, or a heterocyclic group. The number of the substitution group is preferably in the range of 1 to 5, more preferably in the range of 1 to 4, further preferably in the range of 1 to 3, and most preferably 1 or 2. As for the substitution group, a halogen atom, a cyano group, an alkyl group, an alkoxy group, an aryl group, an aryloxy group, an acyl group, a carbonamide group, a sulfonamide group, or an ureido group is preferable; a halogen atom, a cyano group, an alkyl group, an alkoxy group, an aryloxy group, an acyl group, or a carbonamide group is more preferable; a halogen atom, a cyano group, an alkyl group, an alkoxy group, or an aryloxy group is further preferable; and a halogen atom, an alkyl group, or an alkoxy group is most preferable.

The halogen atom includes a fluorine atom, a chlorine atom, a bromine atom, and an iodine atom. The alkyl group may have a cyclic or a branched structure. The number of carbon atom in alkyl group is preferably 1 to 20, more preferably 1 to 12, even more preferably 1 to 6, and most preferably 1 to 4. When alkyl group has a substitution group, it is preferable that the above number of carbon atom includes the number of carbon atom included in the substitution group. Examples of the alkyl group include methyl group, ethyl group, propyl group, isopropyl group, butyl group, tert-butyl group, hexyl group, cyclohexyl group, octyl group and 2-ethylhexyl group. The above-mentioned alkoxy group may have a cyclic or a branched structure. The number of carbon atom in alkoxy group is preferably 1 to 20, more preferably 1 to 12, even more preferably 1 to 6, and most preferably 1 to 4. The alkoxy group may be further substituted with the other alkoxy group. Examples of the alkoxy group include methoxy group, ethoxy group, 2-methoxyethoxy group, 2-methoxy-2-ethoxyethoxy group, butyloxy group, hexyloxy group, and octyloxy group.

The number of carbon atom in aryl group is preferably 6 to 20, and more preferably 6 to 12. Examples of aryl group include phenyl group and naphthyl group.

The number of carbon atom in aryloxy group is preferably 6 to 20, and more preferably 6 to 12. Examples of the aryloxy group include phenoxy and naphthoxy.

The number of carbon atom in acyl group is preferably 1 to 20, and more preferably 1 to 12. Examples of the acyl group include formyl group, acetyl group, and benzoyl group. The number of carbon atom in carbonamide group is preferably 1 to 20, and more preferably 1 to 12. Examples of the carbonamide group include acetamide group, and benzamide group. The number of carbon atom in sulfonamide group is preferably 1 to 20, and more preferably 1 to 12. Examples of the sulfonamide group include methansulfonamide group, benzensulfonamide group, and p-toluenesulfonamide group.

The number of carbon atom in the ureido group is preferably 1 to 20, and more preferably 1 to 12. Examples of the ureido group include (unsubstituted) ureido.

The number of carbon atom in aralkyl group is preferably 7 to 20, and more preferably 7 to 12. Examples of the aralkyl group include benzyl group, phenethyl group, and naphthylmethyl group. The number of carbon atom in alkoxycarbonyl group is preferably 1 to 20, and more preferably 2 to 12. Example of alkoxycarbonyl includes methoxycarbonyl. The number of carbon atom in aryloxycarbonyl group is preferably 7 to 20, and more preferably 7 to 12. Examples of aryloxycarbonyl group include phenoxycarbonyl. The number of carbon atom in aralkyloxy group is preferably 8 to 20, and more preferably 8 to 12. Example of aralkyloxycarbonyl group includes benzoxycarbonyl. The number of carbon atom in carbamoyl group is preferably 1 to 20, and more preferably 1 to 12. Examples of the carbamoyl group include (unsubstituted) carbamoyl and N-methylcarbamoyl. The number of carbon atom in sulfamoyl group is preferably 20 or less, and more preferably 12 or less. Examples of sulfamoyl group include (unsubstituted) sulfamoyl and N-methylsulfamoyl.

The number of carbon atom in acyloxy group is preferably 1 to 20, and more preferably 2 to 12. Examples of acyloxy group include acetoxy and benzoyloxy.

The number of carbon atom in alkenyl group is preferably 2 to 20, and more preferably 2 to 12. Examples of the alkenyl group include vinyl group, allyl group, and isopropenyl group. The number of carbon atom in alkenyl group is preferably 2 to 20, and more preferably 2 to 12. Example of alkenyl group includes thienyl group. The number of carbon atom in alkylsulfonyl group is preferably 1 to 20, and more preferably 1 to 12. The number of carbon atom in arylsulfonyl group is preferably 6 to 20, and more preferably 6 to 12. The number of carbon atom in alkyloxysulfonyl group is preferably 1 to 20, and more preferably 1 to 12. The number of carbon atom in aryloxysulfonyl group is preferably 6 to 20, and more preferably 6 to 12. The number of carbon atom in alkylsulfonyloxy group is preferably 1 to 20, and more preferably 1 to 12. The number of carbon atom in aryloxysulfonyl group is preferably 6 to 20, and more preferably 6 to 12.

Such compounds are obtained by the substitution of an aromatic acyl group to the hydroxyl group of cellulose. Generally, a process using a symmetry acid anhydride and mixed acid anhydride derived from aromatic carboxylic acid chloride or aromatic carboxylic acid, and the like are exemplified. As the specifically preferable process, the process using the acid hydride derived from aromatic caroboxylic acid (described in Journal of Applied Polymer Science, Vol. 29, 3981-3990(1984)) is exemplified. As the process for producing a cellulose-mixed acid esterified compound, (1) a process comprising once producing cellulose aliphatic acid monomer or diester, then introducing an aromatic acyl group represented by the above formula (I), to the other hydroxyl group, (2) a process reacting the mixed acid anhydride of aliphatic caroboxylic acid and aromatic carboxylic acid with cellulose directly, and the like are exemplified. In the above (1), the process for producing a cellulose aliphatic acid ester or diester is a well known process, and a reaction of the subsequent step for further introducing an aromatic acyl group thereto, differs according to the kind of the aromatic acyl group, and performed under the conditions of a reacting temperature of preferably 0 to 100° C., and more preferably 20 to 50° C., and reacting time for preferably 30 minutes or more, and more preferably 30 to 300 minutes. In the above (2) of the process using the mixed acid anhydride, the reacting conditions differs according to the kind of the mixed acid anhydride, preferably is a reacting temperature of 0 to 100° C., more preferably 20 to 50° C., a reacting time is preferably 30 to 300 minutes, more preferably 60 to 200 minutes. In any reactions above, the reaction may be performed without a solvent or in a solvent, but preferably performed in the solvent. As the solvent, dichloromethane, chloroform, dioxane, and the like may be used.

Hereinafter, specific examples of the aromatic acyl group represented by the formula (I) will be shown but the invention is not limited thereto.

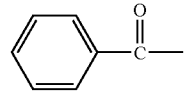

1

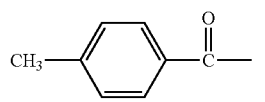
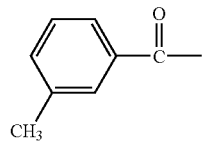
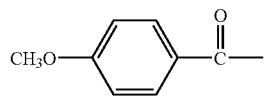
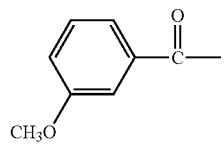
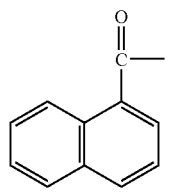
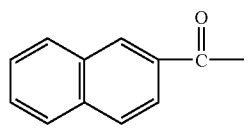
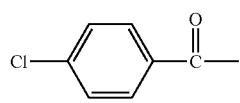
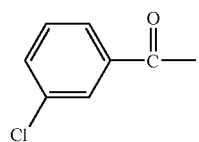
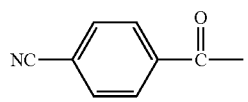
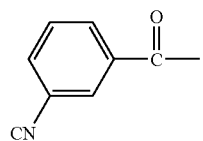
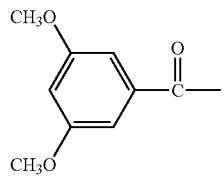
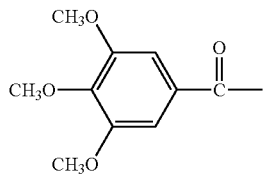
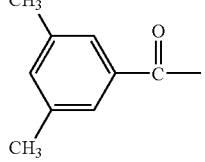
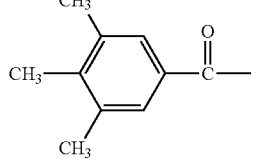
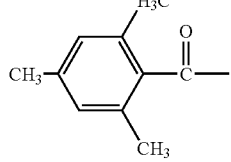
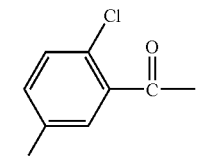
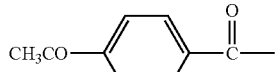
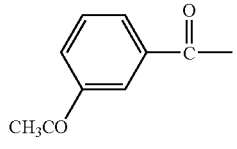
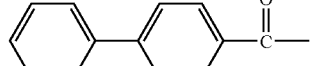
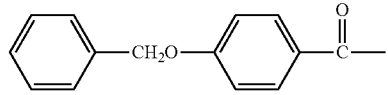
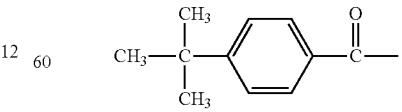
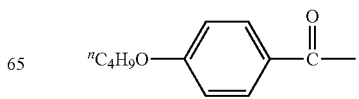

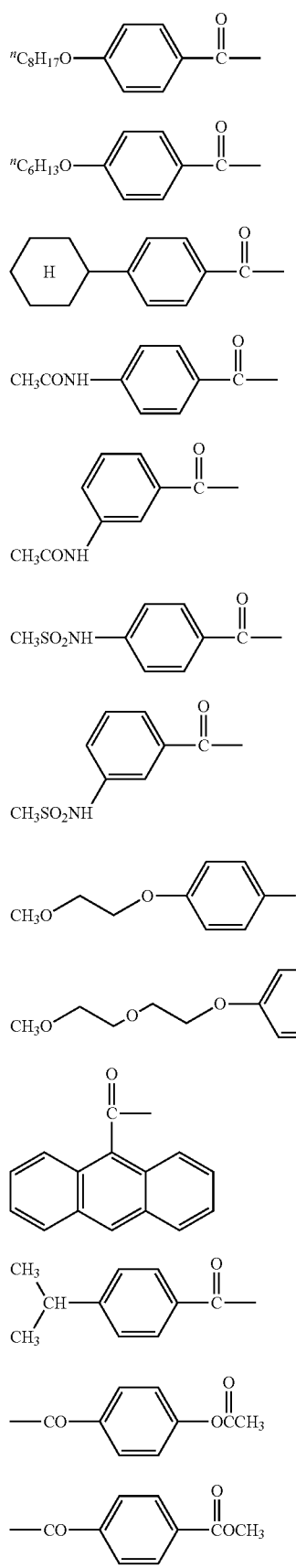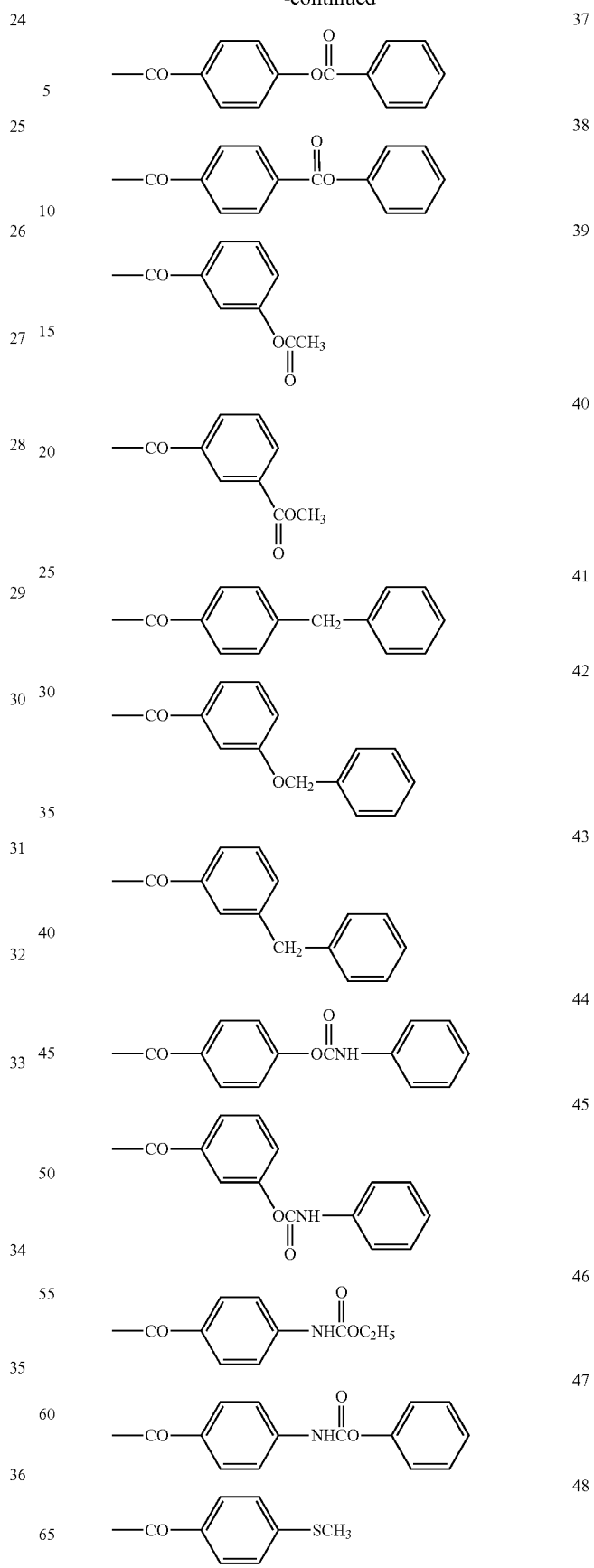

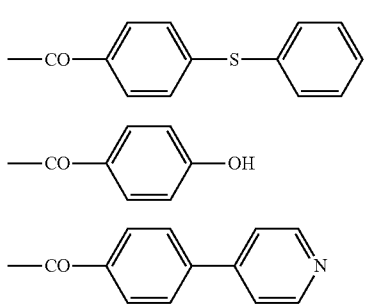

Among these substitution groups, the substitution groups shown as numerals 1 to 9, 18 to 19, and 27 to 28 are preferable, the substitution groups shown as reference numerals 1 to 3 are more preferable, and the substitution group shown as reference numeral 1 is most preferable.

(Additives)
(Plasticizer)

The addition of a plasticizer to the cellulose acylate of the present invention makes it possible to reduce stretching irregularity. As the example of the plasticizer, alkylphthalylalkyl glycolates, phosphoric acid esters, carboxylic acid esters are included.

Specific examples of alkylphthalylalkyl glycolates are methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate and octyl phthalyl ethyl glycolate.

Specific examples of phosphoric acid esters are triphenyl phosphate, trioctyl phosphate, and biphenyldiphenyl phosphate. It is also preferable to use the phosphate plasticizers as set forth in claims 3 to 7 in JP-T-H6-501040.

Examples of carboxylic acid esters are phthalic acid esters such as dimethyl phthalate, diethyl phthalate, dibutyl phthalate, dioctyl phthalate and diethylhexyl phthalate; citric acid esters such as acetyltrimethyl citrate, acetyltriethyl citrate and acetyltributyl citrate; adipic acid esters such as dimethyl adipate, dibutyl adipate, diisobutyl adipate, bis(2-ethylhexyl) adipate, diisodecyl adipate and bis(butyldiglycol adipate). It is also preferable to use butyl oleate, methylacetyl ricinolate, dibutyl sebacate or triacetine, or a combination thereof.

The amount of the plasticizer is preferably from 0 to 20% by mass, more preferably from 1 to 20% by mass and more preferably from 2 to 15% by mass to a cellulose acylate film.

Further, polyhydric alcohol plasticizers may be added. The specific example of the polyhydric alcohol plasticizers used in the present invention include glycerol ester compounds such as glycerol or diglycerol esters; polyalkylene glycols such as polyethylene or polypropylene glycol; and compounds having acyl groups bonded to hydroxyl groups of polyalkylene glycols, which are highly compatible with cellulose fatty acid esters and produce a remarkable thermoplastic effect.

Specific examples of glycerol esters are glycerol diacetate stearate, glycerol diacetate palmitate, glycerol diacetate myristate, glycerol diacetate laurate, glycerol diacetate caprate, glycerol diacetate nonanate, glycerol diacetate octanoate, glycerol diacetate heptanoate, glycerol diacetate hexanoate, glycerol diacetate pentanoate, glycerol diacetate oleate, glycerol acetate dicaprate, glycerol acetate dinonanate, glycerol acetate dioctanoate, glycerol acetate diheptanoate, glycerol acetate dicaproate, glycerol acetate divalerate, glycerol acetate dibutyrate, glycerol dipropionate caprate, glycerol dipropionate laurate, glycerol diproionate myristate, glycerol dipropionate palmitate, glycerol dipropionate stearate, glycerol dipropionate oleate, glycerol tributyrate, glyceol tripentanoate, glycerol mono-palmitate, glycerol monostearate, glycerol distearate, glycerol propionate laurate and glycerol oleate propionate. These esters are merely examples and may be used alone or in combination.

Glycerol diacetate caprilate, glycerol diacetate pelargonate, glycerol diacetate caprate, glycerol diacetate laurate, glycerol diacetate myristate, glycerol diacetate palmitate, glycerol diacetate stearate and glycerol diacetate oleate are, among others, preferred.

Specific examples of diglycerol esters are diglycerol tetraacetate, diglycerol tetrapropionate, diglycerol tetra-butyrate, diglycerol tetravalerate, diglycerol tetrahexanoate, diglycerol tetraheptanoate, diglycerol tetracaprilate, diglycerol tetrapelargonate, diglycerol tetracaprate, diglycerol tetralaurate, diglycerol tetramyristate, diglycerol tetrapalmitate, diglycerol triacetate propionate, diglycerol triacetate butyrate, diglycerol triacetate valerate, diglycerol triacetate hexanoate, diglycerol triacetate heptanoate, diglycerol triacetate caprilate, diglycerol triacetate pelargonate, diglycerol triacetate caprate, diglycerol triacetate laurate, diglycerol triacetate myristate, diglycerol triacetate palmitate, diglycerol triacetate stearate, diglycerol triacetate oleate, diglycerol diacetate dipropionate, diglycerol diacetate dibutyrate, diglycerol diacetate divalerate, diglycerol diacetate dihexanoate, diglycerol diacetate diheptanoate, diglycerol diacetate dicaprilate, diglycerol diacetate pelargonate, diglycerol diacetate dicaprate, diglycerol diacetate dilaurate, diglycerol diacetate dimyristate, diglycerol diacetate dipalmitate, diglycerol diacetate distearate, diglycerol diacetate dioleate, diglycerol acetate tripropionate, diglycerol acetate tributyrate, diglycerol acetate trivalerate, diglycerol acetate trihexanoate, diglycerol acetate triheptanoate, diglycerol acetate tricaprilate, diglycerol acetate tripelargonate, diglycerol acetate tricaprate, diglycerol acetate trilaurate, diglycerol acetate trimyristate, diglycerol acetate tripalmitate, diglycerol acetate tristearate, diglycerol acetate trioleate, diglycerol laurate, diglycerol stearate, diglycerol caprilate, diglycerol myristate, diglycerol oleate and other mixed acid esters of diglycerol. These esters are merely examples and may be used alone or in combination.

Diglycerol tetraacetate, diglycerol tetrapropionate, digkycerol tetrabutyrate, diglycerol tetracaprilate and diglycerol tetralaurate are, among others, preferred.

Specific examples of polyalkylene glycols are polyethylene glycol and polypropylene glycol having an average molecular weight of 200 to 1000. These are merely examples and may be used alone or in combination.

Specific examples of compounds having acyl groups bonded to hydroxyl groups of polyalkylene glycols are polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristate, polyoxypropylene palmitate, polyoxypropylene stearate, polyoxypropylene oleate and polyoxypropylene linoleate. These compounds are merely examples and may be used alone or in combination.

[Stabilizer]

According to the present invention, it is preferable to add any of phosphite compounds, phosphorous ester compounds, or a mixture thereof as a stabilizer. The amount of the stabilizer in the present invention is preferably from 0.005 to 0.5%, more preferably from 0.01 to 0.4% and more preferably from 0.02 to 0.3%.

(1) Phosphite-Based Stabilizer

Concrete phosphite-based color-preventing agents are not particularly limited, but preferred are phosphite-based color-preventing agents represented by the following formulae (2) to (4):

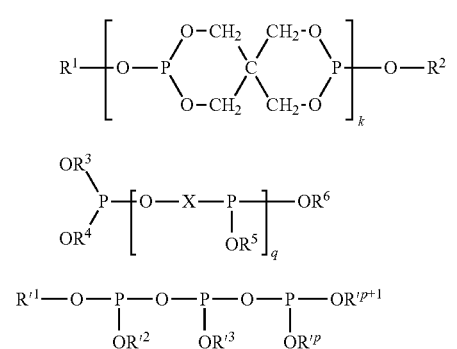

wherein $R^1, R^2, R^3, R^4, R^5, R^6, R'^1, R'^2, R'^3 \ldots R'^p, R'^{p+1}$ each independently represents a hydrogen atom or a group selected from the group consisting of an alkyl group, an aryl group, an alkoxyalkyl group, an aryloxyalkyl group, an alkoxyaryl group, an arylalkyl group, an alkylaryl group, a polyaryloxyalkyl group, a polyalkoxyalkyl group and a polyalkoxyaryl group having 4 to 23 carbon atoms. But, all of the R in respective formulae (2), (3), (4) are not hydrogen atoms. X in the phosphite-based color-preventing agent shown by the formula (3) represents a group selected from aliphatic chains, aliphatic chains having an aromatic nucleus in the side branch thereof, aliphatic chains having an aromatic nucleus in the chain, and chains comprising oxygen atoms that do not continue by two or more in the above-described chain. k, q each represents an integer of 1 or more, and p represents an integer of 3 or more.

The number of k, q in these phosphite-based color-preventing agents is preferably 1-10. By setting the number of k, q to at least 1, the volatility thereof at heating becomes small; and setting them to at most 10, the compatibility with cellulose acetate propionate is improved, which are preferred. p is preferably 3-10. By setting p to at least 3, the volatility thereof at heating becomes small; and setting it to at most 10, the compatibility with cellulose acetate propionate is improved, which are preferred.

For the concrete examples of the phosphite-based color-preventing agent represented by the formula (2), those represented by the following formulae (5) to (8) are preferred:

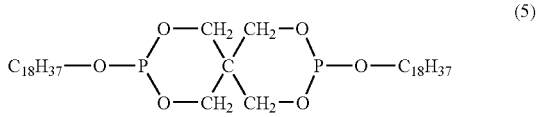

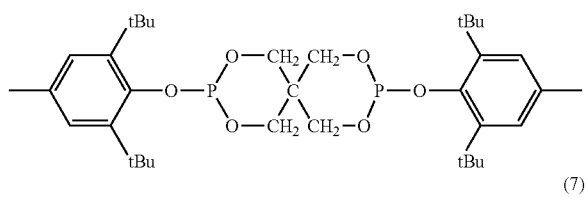

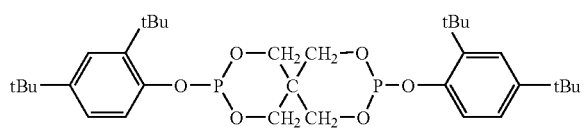

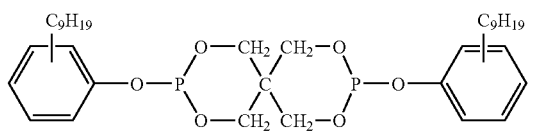

For the concrete examples of the phosphite-based color-preventing agent represented by the formula (3), those represented by the following formulae (9) to (11) are preferred:

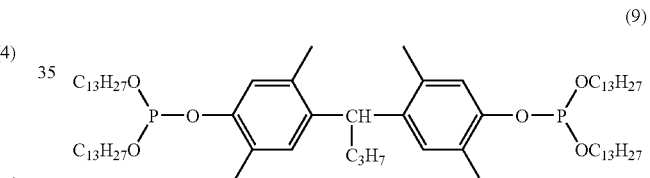

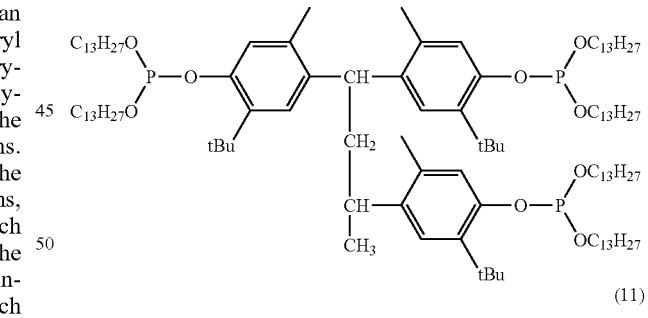

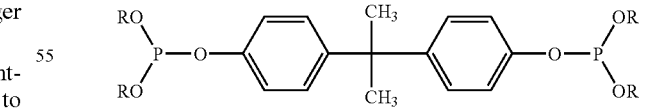

R=an alkyl group having 12 to 15 carbon atoms (2) Phosphorous Ester-Based Stabilizer Phosphorous ester-based stabilizers are, for example, cyclic neopentane tetra-yl bis(octadecyl)phospite, cyclic neopentane tetra-yl bis(2,4-di-t-butylphenyl)phosphite, cyclic neopentane tetra-yl bis(2,6-di-t-butyl-4-methylphenyl)phosphite, 2,2-methylene bis(4,6-di-t-butylphenyl)octylphosphite, and tris(2,4-di-t-butylphenyl)phosphite.

(3) Other Stabilizers

As a stabilizer, a weak organic acid, a thioether-based compound, or an epoxy compound may be blended.

The weak organic acid means acids having pka of at least 1, which are not especially limited provided that it does not interfere the action of the invention and has color-preventing properties and physical deterioration-preventing properties. Examples thereof are tartaric acid, citric acid, malic acid, fumaric acid, oxalic acid, succinic acid, and maleic acid. One or more such acids may be used either singly or as combined.

Examples of the thioether-based compound are dilauryl thiodipropionate, ditridecyl thiodipropionate, dimyristyl thiodipropionate, distearyl thiodipropionate, and palmityl stearyl thiodipropionate. One or more such compounds may be used either singly or as combined.

Example of the epoxy compound are those derived from epichlorohydrin and bisphenol-A, and also usable are derivatives from epichlorohydrin and glycerin, and cyclic compounds such as vinyl cyclohexane dioxide and 3,4-epoxy-6-methylcyclohexylmethyl-3,4-epoxy-6-methylcyclohexane carboxylate. Epoxidized soybean oil, epoxidized caster oil, and long chain-α-olefin oxides can be used too. One or more such compounds may be used either singly or as combined.

(Matting Agent)

It is preferable that the cellulose acylate film according to the invention contains fine particles as a matting agent. Examples of the fine particles usable in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate.

These fine particles form the secondary particles having an average particle size of usually from 0.1 to 3.0 μm. In a film, these fine particles occur as aggregates of the primary particles and provide irregularities of 0.1 to 3.0 μm on the film surface. It is preferred that the average secondary particle size is from 0.2 μm to 1.5 μm, more preferably from 0.4 μm to 1.2 μm and most preferably from 0.6 μm to 1.1 μm. The primary or secondary particle size is determined by observing a particle in the film under a scanning electron microscope and referring the diameter of its circumcircle as the particle size. 200 particles are observed at various sites and the mean is referred to as the average particle size.

The preferred amount of the fine particles is in the range of 1 to 5,000 ppm, more preferably in the range of 5 to 1,000 ppm, and further preferably in the range of 10 to 500 ppm, relative to the amount of cellulose acylate as the weight ratio.

Fine particles containing silicon are preferred because of having a low turbidity. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are more preferable, since the haze of the resultant film can be lowered thereby. The apparent specific gravity is preferably form 90 to 200 g/l or more and more preferably from 100 to 200 g/l or more. A higher apparent specific gravity makes it possible to prepare a dispersion having the higher concentration, thereby improving haze and aggregates.

As the fine particles of silicon dioxide, use can be made of marketed products such as AEROSIL R972, R972V, R974, R812, 200, 200V, 300, R202, OX50 and TT600 (each manufactured by Dehussa Japan Co., Ltd.). As the fine particles of zirconium oxide, use can be made of products marketed under the trade name of, for example, AEROSIL R976 and R811 (each manufactured by Dehussa Japan Co., Ltd.).

Among these products, AEROSIL 200V and AEROSIL R972V are particularly preferable, since they are fine particles of silicon dioxide having an average primary particle size of 20 nm or less and an apparent specific gravity of 70 g/l or more and exert an effect of largely lowering the coefficient of friction while maintaining the turbidity of the optical film at a low level.

(Other Additives)

An optical anisotropy controller, a surfactant, and an odor trapping agent (amine, etc.) can be added. Materials whose details are described in Kokai Gifo of Japan Institute of Invention & Innovation, Kogi No. 2001-1745 (published Mar. 15, 2001, Japan Institute of Invention & Innovation), pages 17 to 22 are preferably used.

An infrared absorbing dye described, for example, in JP-A No. 2001-194522 may be used. An ultraviolet absorber described, for example, in JP-A No. 2001-151901 may be used. Preferably, each is included in cellulose acylate in a proportion of 0.001 to 5% by mass.

Examples of the optical anisotropy controller include retardation adjusters. For example, those described in JP-A Nos. 2001-166144, 2003-344655, 2003-248117 and 2003-66230 may be used. Such an optical anisotropy controller can control in-plane retardation (Re) and retardation (Rth) in the thickness direction. The optical anisotropy controller is added in a proportion of preferably 0 to 10% by mass, more preferably 0 to 8% by mass, and further preferably 0 to 6% by mass.

<<Saturated Norbornene Resin>>

In the invention, it is also preferable to use the saturated norbornene resin. As for the saturated norbornene resin, both a saturated norbornene resin-A and a saturated norbornene resin-B described below can be preferably used.

(Saturated Norbornene Resin-A)

Examples of the saturated norbornene resin useful in the invention include (1) a resin which is obtained, if necessary, after an addition of a maleic acid and cyclopentadiene, by hydrogenation of a ring-opened (co)polymer of norbornene monomer; (2) a resin obtained by addition polymerization of a norbornene monomer; and (3) a resin obtained by addition copolymerization of a norbornene monomer and an olefin monomer such as ethylene or α-olefin. The polymerization and the hydrogenation can be carried out according to the conventional methods.

Examples of the norbornene monomers include norbornene and alkyl and/or alkylidene substituent thereof, for example, 5-methyl-2-norbornene, 5-dimethyl-2-norbornene, 5-ethyl-2-norbornene, 5-butyl-2-norbornene, 5-ethylidene-2-norbornene and the like, and polar substituents of halogens thereof; dicyclopentadiene, 2,3-dihydrodicyclopentadiene, and the like; dimethanooctahydronaphthalene, alkyl and/or alkylidene substituent thereof, and polar substituents such as halogens thereof, for example, 6-methyl-1,4-:5,8-dimethano-1,4,4a,5,6,7,8,8a-octahydronaphthalene, 6-ethyl-1,4-:5,8-dimethano-1,4,4a,5,6,7,8,8a-octahydronaphthalene, 6-ethylidene-1,4-:5,8-dimethano-1,4,4a,5,6,7,8,8a-octahydronaphthalene, 6-chloro-1,4-:5,8-dimethano-1,4,4a,5,6,7,8,8a-octahydronaphthalene, 6-cyano-1,4-:5,8-dimethano-1,4,4a,5,6,7,8,8a-octahydronaphthalene, 6-pyridyl-1,4-:5,8-dimethano-1,4,4a,5,6,7,8,8a-octahydronaphthalene, 6-methoxycarbonyl-1,4-:5,8-dimethano-1,4,4a,5,6,7,8,8a-octahydronaphthalene, and the like; adducts of cyclopentadiene and tetrahydroindene, and the like; di- to tetramer-cyclopentadiene, and the like, 4,9:5,8-dimethano-3a,4,4a,5,8,8a,9,9a-octahydro-1H-benzoindene, 4,11:5,10:6,9-trimethano-3a,4,4a,5,5a,6,9,9a,10,10a,11a-dodecahydro-1H-cyclopentaanthracene; and the like.

(Saturated Norbornene Resin-B)

As for the saturated norbornene resin, the resins represented by the following formulae (12) to (15) may be used. Among these, the resin represented by the following formula (12) is most preferable.

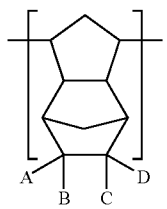

formula (12)

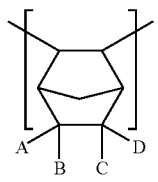

formula (13)

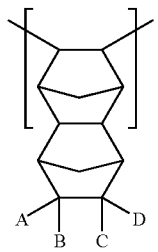

formula (14)

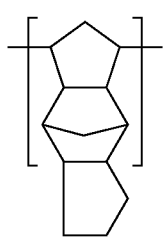

formula (15)

In the formulae (12) to (15), each A, B, C, and D indicates a hydrogen atom or a monovalent organic group, and at least one thereof is a polar group.

A weight average molecular weight of the saturated norbornene resin is preferably in the range of 5,000 to 1,000,000, more preferably in the range of 8,000 to 200,000. In addition, a number average molecular weight of the resin is preferably in the range of 2,000 to 500,000, more preferably in the range of 4,000 to 100,000.

The saturated norbornene resins of the invention may be exemplified by the resins described in JP-A Nos. S60-168708, S62-252406, S62-252407, H2-133413, S63-145324, S63-264626, H1-240517, and S57-8815.

Among these resins, a hydrogenated polymer which can be obtained by adding hydrogen to a ring-opened polymer of the norbornene monomers is particularly preferable.

The glass transition temperature (Tg) of these saturated norbornene resins is preferably 120° C. or above, and more preferably 140° C. or above. In addition, the saturation water absorption of the saturated norbornene resin is preferably 1% by weight or less, and more preferably 0.8% by weight. The glass transition temperature (Tg) and the saturation water absorption of the saturated norbornene resins represented by the above formulae (12) to (15) can be controlled by selecting the kinds of substituents A, B, C, and D.

As the saturated norbornene resin useful in the invention, a tetracyclododecene derivative of at least one kind represented by the following formula (16) alone, or a hydrogenated polymer obtained by a metathesis polymerization of the tetracyclododecene derivative with an unsaturated cyclic compound copolymerizable with the derivative, may be used.

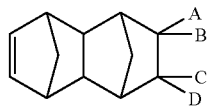

formula (16)

In the formula, each A, B, C, and D indicates a hydrogen atom or a monovalent organic group, and at least one thereof is a polar group.

When at least one substituent of A, B, C, and D is a polar group in the tetracyclododecene derivative represented by the above formula (16), a polarizing film having excellent adhesivity with other materials, heat resistance, and the like, can be obtained. Further, the polar group is preferably a group represented by —$(CH_2)_n$COOR (wherein, R is a hydrocarbon group having 1 to 20 carbon atoms, and n is an integer of 0 to 10) as it gives a final hydrogenated polymer (substrate of polarizing film) having a high glass transition temperature. In particular, the polar substituent represented by —$(CH_2)_n$COOR is preferably included by 1 per one molecule of the tetracyclododecene derivative of formula (16) from the viewpoint of lowering the water absorption. In the polar substituent, a greater number of carbon atoms in the hydrocarbon group represented by R is preferable from the viewpoint of lowering a moisture-absorbing property of the hydrogenated polymer to be obtained, but the hydrocarbon group is preferably a chained alkyl group having 1 to 4 carbon atoms or a (poly) cyclic alkyl group having or more carbon atoms, and particularly preferably a methyl group, an ethyl group, or a cyclohexyl group, considering the point of balance with a glass transition temperature of the hydrogenated polymer to be obtained.

In addition, the tetracyclododecene derivative of formula (16), in which a hydrocarbon group having 1 to 10 carbon atoms is bonded as a substituent to a carbon atom to which the group represented by —$(CH_2)_n$COOR is bonded, is preferable since the hydrogenated polymer to be obtained becomes the polymer having a low moisture-absorbing property. In particular, the tetracyclododecene derivative of formula (16) in which the substituent is either a methyl group or an ethyl group is preferable from the point of its easy synthesis. In specific, 8-methyl-8-methoxycarbonyltetracyclo[4,4,0,12.5, 17.10]-dodec-3-ene is preferred. These tetracyclododecene derivatives with the mixture of unsaturated cyclic compound copolymerizable with the derivatives can be subjected to a metathesis polymerization and a hydrogenation, in accordance with the method disclosed in, for example, JP-A No. H4-77520, line 12 on an upper right column of page 4 to line 6 on a bottom right column of page 6.

For these norbornene resins, the intrinsic viscosity measured in chloroform at 30° C. (η inh) is preferably from 0.1 to 1.5 dl/g, and more preferably from 0.4 to 1.2 dl/g. For the hydrogenation rate of the hydrogenated polymer, the value measured with 60 MHz, $^1$H-NMR is 50% or more, preferably 90% or more, and more preferably 98% or more. As higher the hydrogenation rate, a saturated norbornene film to be obtained tends to have an excellent stability against heat and light. The content of gel to be included in the hydrogenated polymer is preferably 5% by weight or less, and more preferably 1% by weight or less.

Further, the saturated norbornene resin having a following structure can be used for the film of the invention. In the invention, the saturated norbornene resin can be exemplified by

[A-1] a hydrogenated product of random copolymer of α-olefin having 2 to 20 carbon atoms and cyclic olefin represented by the following formula (II),

[A-2] a hydrogenated product of a copolymer or a ring-opened polymer of cyclic olefin represented by the following formula (II)), or the like.

Formula (II)

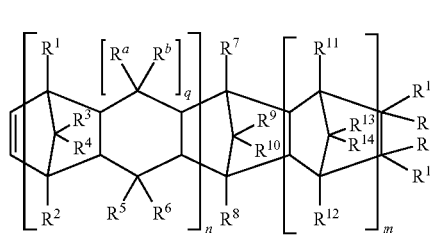

These saturated norbornene resin has preferably the glass transition temperature (Tg) measured by DSC of 70° C. or higher, more preferably in the range of 70 to 250° C., particularly preferably in the range of 120 to 180° C.

These saturated norbornene resin is amorphous or low crystalline and crystallinity of the resin measured by a X-ray diffraction method is generally 20% or below, preferably 10% or below, further preferably 2% or below.

In addition, the saturated norbornene resin of the invention has intrinsic viscosity [η] measured in decalin at 135° C. generally in the range of 0.01 to 20 dl/g, preferably in the range of 0.03 to 10 dl/g, further preferably in the range of 0.05 to 5 dl/g and the melt flow rate (MFR) measured under the load of 2.16 kg at 260° C. in accordance with ASTM D1238 generally in the range of 0.1 to 200 g/10 min, preferably in the range of 1 to 100 g/10 min, further preferably in the range of 5 to 50 g/10 min.

The softening point of the cycloolefin resins is measured by a thermal mechanical analyzer (TMA) and generally 30° C. or higher, preferably 70° C. or higher, and further preferably in the range of 80 to 260° C.

The structure of the saturated norbornene represented by the formula (II) will be described in detail.

In the formula (II), n is 0 or 1; m is 0 or an integer of 1 or higher; and q is 0 or 1. When q is 1, $R^a$ and $R^b$ are independently selected from the atoms represented as below and a hydrocarbon group. When q is 0, each bond is bonded to form a 5-membered ring.

$R^1$ to $R^{18}$, $R^a$, and $R^b$ are independently selected from a hydrogen atom, a halogen atom, and a hydrocarbon group. Here, examples of the halogen atom include a fluorine atom, a chlorine atom, a bromine atom, and an iodine atom.

In general, examples of the hydrocarbon group include alkyl group having 1 to 20 carbon atoms, cycloalkyl group having 3 to 15 carbon atoms, and aromatic hydrocarbon group. More specifically, examples of the alkyl group include a methyl group, an ethyl group, a propyl group, an isopropyl group, an amyl group, a hexyl group, an octyl group, a decyl group, a dodecyl group, an octadecyl group, and the like; example of the cycloalkyl group includes a cyclohexyl group; and examples of the aromatic hydrocarbon group include a phenyl group, a naphthyl group, and the like. These hydrocarbon groups may be substituted by a halogen atom. In the formula (II), $R^{15}$ to $R^{18}$ may be bonded to each other (jointly each other) to form a single ring or multiple rings. In addition, the single ring or multiple rings thus formed may have a double bond.

Cycloolefin represented by the formula (II) will be further specifically exemplified below. For example, bicyclo[2.2.1]-2-heptene (commonly named as norbornene) represented by the following formula:

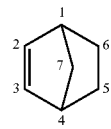

(wherein numerals 1 to 7 indicate position numbers of carbon atoms), and derivatives thereof in which the compound is substituted by a hydrocarbon group can be exemplified.

Examples of the substituted hydrocarbon group include 5-methyl group, 5,6-dimethyl group, 1-methyl group, 5-ethyl group, 5-n-butyl group, 5-isobutyl group, 7-methyl group, 5-phenyl group, 5-methyl-5-phenyl group, 5-benzyl group, 5-tolyl group, 5-(ethylphenyl) group, 5-(isopropylphenyl) group, 5-(biphenyl) group, 5-(β-naphthyl) group, 5-(α-naphthyl) group, 5-(antracenyl) group, 5,6-diphenyl group, and the like.

Examples of the derivatives include bicyclo[2.2.1]-2-heptene derivatives such as an adduct of cyclopentadiene-acenaphthylene, 1,4-methano-1,4,4a,9a-tetrahydrofluorene, 1,4-methano-1,4,4a,5,10,10a-hexahydroanthracene, and the like.

In addition, example of the derivatives include tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene, 5-methyltricyclo[4.3.0.1$^{2,5}$]-3-decene, and the like; tricyclo[4.4.0.1$^{2,5}$]-3-undecene derivatives such as tricyclo[4.4.0.1$^{2,5}$]-3-undecene, 10-methyltricyclo[4.4.0.1$^{2,5}$]-3-undecene, and the like; and tetracyclo[4.4.0.1$^{2,5}$.1$^{7,10}$]-3-dodecene represented by the following formula:

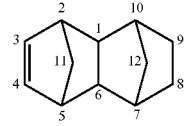

and derivatives thereof in which the compound is substituted by a hydrocarbon group.

Examples of the hydrocarbon group include 8-methyl group, 8-ethyl group, 8-propyl group, 8-butyl group, 8-isobutyl group, 8-hexyl group, 8-cyclohexyl group, 8-stearyl group, 5,10-dimethyl group, 2,10-dimethyl group, 8,9-dimethyl group, 8-ethyl-9-methyl group, 11,12-dimethyl group, 2,7,9-trimethyl group, 2,7-dimethyl-9-ethy group, 9-isobutyl-2,7-dimethyl group, 9,11,12-trimethyl group, 9-ethyl-11,12-dimethyl group, 9-isobutyl-11,12-dimethyl group, 5,8,9,10-tetramethyl group, 8-ethylidene group, 8-ethylidene-9-methyl group, 8-ethylidene-9-ethyl group, 8-ethylidene-9-isopropyl group, 8-ethylidene-9-butyl group, 8-n-propylidene group, 8-n-propylidene-9-methyl group, 8-n-propylidene-9-ethyl group, 8-n-propylidene-9-isopropyl group, 8-n-propylidene-9-butyl group, 8-isopropylidene group, 8-isopropylidene-9-methyl group, 8-isopropylidene-9-ethyl group, 8-isopropylidene-9-isopropy group, 8-isopropylidene-9-butyl, 8-chloro, 8-bromo, 8-fluoro, 8,9-dichloro group, 8-phenyl group, 8-methyl-8-phenyl group, 8-benzyl group, 8-tolyl group, 8-(ethylphenyl) group, 8-(isopropylphenyl) group, 8,9-diphenyl group, 8-(biphenyl) group, 8-(β-naphtyl) group, 8-(α-naphtyl)group, 8-(anthracenyl) group, 5,6-diphenyl group, and the like.

In addition, examples of the hydrocarbon group include tetracyclo[4.4.0.1$^{2,5}$.1$^{7,10}$]-3-dodecene derivates such as an adduct of (cyclopentadiene-acenaphtylene adduct) with cyclopentadiene, pentacyclo[6.5.1.1$^{3,6}$.0$^{2,7}$.0$^{9,13}$]-4-pentadecene and derivates thereof, pentacyclo[7.4.0.1$^{2,5}$.1$^{9,12}$.0$^{8,13}$]-3-pentadecene and derivates thereof, pentacyclo[8.4.0.1$^{2,5}$.1$^{9,12}$.0$^{8,13}$]-3-hexadecene and derivates thereof, pentacyclo[6.6.1.1$^{3,6}$.0$^{2,7}$.0$^{9,14}$]-4-hexadecene and derivates thereof, hexacyclo[6.6.1.1$^{3,6}$.1$^{10,13}$.0$^{2,7}$.0$^{9,14}$]-4-heptadecene and derivates thereof, heptacyclo[8.7.0.1$^{2,9}$.1$^{4,7}$.1$^{11,17}$.0$^{3,8}$.0$^{12,16}$]-5-eicosene and derivates thereof, heptacyclo[8.7.0.1$^{3,6}$.1$^{10,17}$.1$^{12,15}$.0$^{2,7}$.0$^{11,16}$]-4-eicosene and derivates thereof, heptacyclo[8.8.0.1$^{2,9}$.1$^{4,7}$.1$^{11,18}$.0$^{3,8}$.0$^{12,17}$]-5-heneicosen and derivates thereof, octacyclo[8.8.0.1$^{2,9}$.1$^{4,7}$.1$^{11,18}$.1$^{13,16}$.0$^{3,8}$.0$^{12,17}$]-5-docosen and derivates thereof, nonacyclo[10.9.1.1$^{4,7}$.1$^{13,20}$.1$^{15,18}$.0$^{2,10}$.0$^{3,8}$.0$^{12,21}$.0$^{14,19}$]-5-pentacose n and derivates thereof, and the like.

Specific examples of the saturated norbornene resin are as described above and further specific structures of these compounds are shown in paragraph Nos. [0032] to [0054] of JP-A No. H7-145213.

In addition, for a method of synthesizing the saturated norbornene resins, the synthesis can be carried out with reference to the method described in paragraph Nos. [0039] to [0068] of JP-A No. 2001-114836.

In addition, as the saturated norbornene resin of the invention, cycloolefin (co)polymer consisting a polymerized unit from at least one kind of the compounds represented by the following formulae (I) to (VI), or a polymerized unit from at least one kind thereof and a compound represented by the flowing formula (VII) is exemplified. Here, the proportion of the polymerized unit from the compound represented by the formula (VII) is in the range of 0 to 99 mol %.

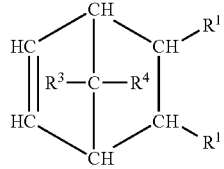
(I)

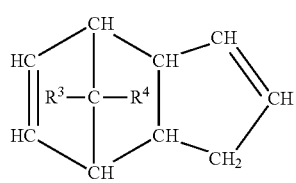
(II)

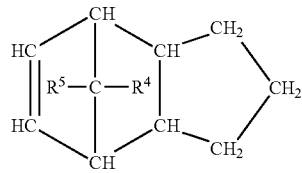
(II')

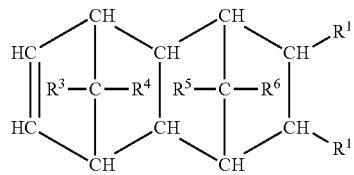
(III)

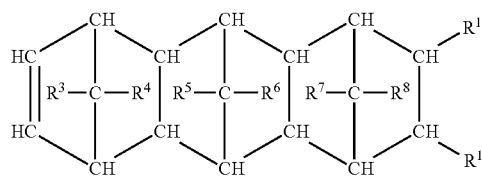
(IV)

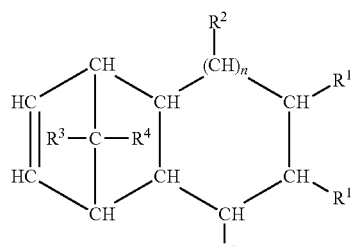
(V)

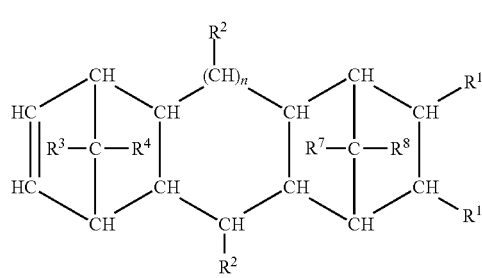
(VI)

where $R^1$, $R^2$, $R^3$, $R^4$, $R^5$, $R^6$, $R^7$ and $R^8$ are each a hydrogen atom and a hydrocarbon group having 1 to 20 carbon atoms, such as an alkyl group having 1 to 8 carbon atoms, an aryl group having carbon atoms 6 to 18, an alkylenearyl group having 7 to 20 carbon atoms, a cyclic or acyclic alkenyl group having 2 to 20 carbon atoms, or form a saturated, unsaturated or aromatic ring. N is an integer of 0 to 5.

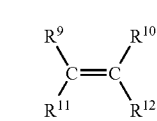
(VII)

where $R^9$, $R^{10}$, $R^{11}$ and $R^{12}$ are each a hydrogen atom, a linear or branched, saturated or unsaturated hydrocarbon group having 1 to 20 carbon atoms, such as an alkyl group having 1 to 8 carbon atoms and an alkyl group having 6 to 18 carbon atoms.

The cycloolefin polymers may also be obtained by ring-opening polymerization of at least one of the monomers having the formulae (I) to (VI), followed by hydrogenation of the resultant products.

The cycloolefin copolymer according to the invention may moreover contain from 0 to 45 mol %, based on the entire structure of the cycloolefin copolymer, of polymerized units derived from one or more monocyclic olefins of the formula (VIII).

(VIII)

wherein n is an integer of 2 to 10.

The proportion of polymerized units derived from cyclic, in particular polycyclic, olefins is preferably from 3 to 75 mol %, based on the entire structure of the cycloolefin copolymer. The proportion of polymerized units derived from acyclic olefins is preferably from 5 to 80 mol %, based on the entire structure of the cycloolefin copolymer.

The cycloolefin (co)polymers preferably consist of polymerized units derived from one or more polycyclic olefins, in particular from polycyclic olefins of the formulae (I) or (III), and of polymerized units derived from one or more acyclic olefins of the formula (VII), in particular α-olefins having from 2 to 20 carbon atoms. Preference is particularly given to cycloolefin (co)polymers which consist of polymerized units derived from a polycyclic olefin of the formula (I) or (III) and from an acyclic olefin of the formula (VII). Preference is furthermore given to terpolymers which consist of polymerized units derived from a polycyclic monoolefin of the formula (I) or (III), from an acyclic monoolefin of the formula (VII) and from a cyclic or acyclic olefin (polyene) which contains at least two double bonds, in particular cyclic, preferably polycyclic, dienes, such as norbornadiene or cyclic, particularly preferably polycyclic, alkenes, such as vinylnorbornene, which carry an alkenyl group having 2 to 20 carbon atoms.

The cycloolefin polymers according to the invention preferably comprise olefins based on a norbornene structure, particularly preferably norbornene, tetracyclododecene and, if desired, vinylnorbornene or norbornadiene. Preference is also given to cycloolefin (co) polymers which comprise polymerized units derived from acyclic olefins having terminal double bonds, such as a α-olefins having 2 to 20 carbon atoms, particularly preferably ethylene or propylene. Particular preference is given to norbornene-ethylene (co)polymers and tetracyclododecene-ethylene (co) polymers.

Among the terpolymers, particular preference is given to norbornene-vinylnorbornene-ethylene terpolymers, norbornene-norbornadiene-ethylene terpolymers, tetracyclododecene-vinylnorbornene-ethylene terpolymers and tetracyclododecene-vinyltetracyclododecene-ethylene terpolymers. The proportion of the polymerized units derived from a polyene, preferably vinylnorbornene or norbornadiene, is from 0.1 to 50 mol %, particularly preferably from 0.1 to 20 mol %, and the proportion of the acyclic monoolefin of the formula (VII) is from 0 to 99 mol %, preferably from 5 to 80 mol %, based on the entire structure of the cycloolefin (co)polymer. In the terpolymers described, the proportion of the polycyclic monoolefin is from 0.1 to 99 mol %, preferably from 3 to 75 mol %, based on the entire structure of the cycloolefin (co) polymer.

The cycloolefin (co)polymer according to the invention preferably comprises at least one cycloolefin copolymer which comprises polymerized units which can be derived from polycyclic olefins of the formula (I) and polymerized units which can be derived from acyclic olefins of the formula (VII).

These cycloolefin copolymers can be synthesized according to the method described in paragraph Nos. [0019] to [0020] of JP-A No. H10-168201.

The saturated norbornene resin of the invention may be stabilized by adding thereto the known antioxidants such as 2,6-di-tert-butyl-4-ethylphenol, 2,2'-dioxy-3,3'-di-tert-butyl-5,5'-dimethylphenylmethane, tetrakis[methylene-3-(3,5-di-tert-butyl-4-hydroxyphenyl)propionate]methane, 1,1,3-tris (2-methyl-4-hydroxy-5-tert-butylphenyl)buthane, 1,3,5-trimethyl-2,4,6-tris(3,5-di-tert-butyl-4-hydroxybenzyl) benzene, stearyl-β-(3,5-di-tert-butyl-4-hydroxyphenyl) propionate, 2,2'-dioxy-3,3'-di-tert-butyl-5,5'-diethylphenylmethane, 3,9-bis[1,1-dimethyl-2-[β-(3-tert-butyl-4-hydroxy-5-methylphenyl)propionyloxy]ethyl], 2,4,8,10-tetraoxaspiro[5,5]undecane, tris(2,4-di-tert-butylphenyl)phosphite, cyclicneopentanetetrailbis(2,4-di-tert-butylphenyl)phosphite, cyclicneopentanetetrailbis(2,6-di-tert-butyl-4-methylphenyl)phosphite, and 2,2-methylenebis(4,6-di-tert-butylphenyl) octylphosphite; and UV absorbents such as 2,4-dihydroxybenzophenone, 2-hydroxy-4-methoxybenzophenone, and the like. In addition, for the purpose of improving processability, additives such as a lubricant and the like may be added thereto.

The amount of the antioxidants to be added is, for example, in the range of 0.1 to 3 parts by weight, preferably in the range of 0.2 to 2 parts by weight relative to 100 parts by weight of the saturated norbornene resin.

To the saturated norbornene resin, various additives such as phenolic or phosphoric antioxidants, antistatic agents, UV absorbents, lubricants may be added, if desired. In particular, since the liquid crystal is generally deteriorated by UV, it is preferred to add the UV absorbents to the resin in case of not using a protection means such as laminating UV protect filters on the liquid crystal. As for the UV absorbents, benzophenone-based UV absorbents, benzotriazole-based UV absorbents, acrylonitrile-based UV absorbents, or the like may be used. Among these, the benzophenone-based UV absorbents are preferable and the amount to be added is, for example, in the range of 10 to 100,000 ppm, preferably in the range of 100 to 10,000 ppm. In case of producing a sheet by a solution casting method, it is preferred to add a labeling agent in order to lower the surface roughness of the sheet. As for the labeling agents, for example, labeling agents for pigments such as fluorine-based nonionic surfactants, particular acrylic resin-based labeling agents, silicone-based labeling agents, and the like may be used. Among these, the agents which have excellent compatibility with solvent is preferable and the amount to be added is, for example, in the range of 5 to 50,000 ppm, preferably in the range of 10 to 20,000 ppm.

In addition, the obtainable luminescent spots of the film by forming film with the saturated norbornene resin is in less 25 number/cm$^2$, preferably less 22 number/cm$^2$, and more preferably less 20 number/cm$^2$. The process can be achieved by filtering at the time of finishing the synthesis. As the filter material, the known materials such as glass fiber, cellulose fiber, filter paper thimble, a fluorine resin such as a tetrafluoroethylene resin are preferably used, but particularly ceramics, metal, and the like are preferably used. The absolute filter accuracy of the materials is preferably 50 μm or less, more preferably 30 μm or less, further more preferably 10 μm or less, and particularly preferably 5 μm or less. The combination thereof is possible. As the filter materials, a surface type or a depth type can be used, but the depth type is preferably used since the holes thereof are difficult to be cloggy.

When the saturated norbornene film having the luminescent spots 25 number/cm$^2$ or more is stretched, the stretch irregularity tends to occur mainly around the luminescent spots. Consequently, the uniformity in the film surface tends to be degraded. That is, the local thermal expansion or the optical elasticity modulus distribution tends to occur easily.

<<Film Forming>>

In the film-forming process of the invention, the amount of a residual solvent is preferably 0.5% by mass or below, more preferably 0.01% by mass, and further preferably 0% by mass. The residual solvent is easy to be partially remained on the film thus heterogeneity is easily generated on the film surface. Since the residual solvent is easily produced in the film melt-forming process, the film melt-forming process is preferable in the invention.

(1) Pelletization

Prior to the melt film formation, the transport thermoplastic resin and the additive are preferably mixed and palletized.

When carrying out the pelletization, preferably the cellulose acylate and the additive are dried previously, but a bent type extruder may be used instead of the drying. In case where the drying is carried out, such drying method can be employed as heating them in a heating furnace at 90° C. for at least 8 hours, but this is not the only one method. The pellet can be formed by melting the cellulose acylate and the additive using a twin screw kneading extruder at 150 to 250° C., and solidifying the extruded product in a noodle state in water and then cutting it. The pellet may also be formed according to an under water cutting method in which the mixture is molten with an extruder and then extruded from a pipe sleeve directly into water to be cut.

For the extruder, any publicly known single screw extruder, non-intermeshing counter-rotating twin screw extruder, intermeshing counter-rotating twin screw extruder, intermeshing corotating twin screw extruder can be used as long as it can give sufficient melt kneading.

The pellet has preferably such size as the cross-sectional area of 1 to 300 mm$^2$ and the length of 1 to 30 mm, more preferably the cross-sectional area of 2 to 100 mm$^2$ and the length of 1.5 to 10 mm.

When the pellet is formed, the additive also may be thrown through the raw material-throwing port or vent port provided in the midstream of an extruder.

The extruder has a rotation number of preferably 10 to 1000 rpm, more preferably 20 to 700 rpm, even more preferably 30 to 500 rpm. The rotation number of at least 10 rpm can realize reasonable staying time, and thus the lowering of molecular weight caused by thermal degradation and yellow hue deterioration hardly occurs. When the rotation number is at most 1000 rpm, the break of the molecule due to shear hardly occurs, and thus the lowering of the molecular weight and the increase in the generation of cross-linked gel hardly occur.

In the pelletization, the staying time in the extruder is preferably 10 seconds to 30 minutes, more preferably 15 seconds to 10 minutes, even more preferably 30 seconds to 3 minutes. When sufficient melting is possible, a shorter staying time is preferred in point that the degradation of resin and the generation of yellow hue can be prevented.

(2) Drying

It is preferable that the moisture in the pellet is reduced prior to the melt film formation. For the drying, a dehumidification air dryer is often used, but the means for the drying is not limited only when an intended water content is attained (efficient drying is preferred by employing such means as heating, air blasting, pressure reduction and stirring either singly or as combined; more preferably a drying hopper is formed into a heat-insulated structure). The drying temperature is preferably 0 to 200° C., more preferably 40 to 180° C., especially preferably 60 to 150° C. Such drying temperature can effectively prevent blocking due to the adhesion of resin with keeping a proper value of water content. The drying air volume is preferably 20 to 400 m$^3$/hr, more preferably 50 to 300 m$^3$/hr, especially preferably 100 to 250 m$^3$/hr. When the drying air volume is at least 20 m$^3$/hr, drying is more effectively performed. On the other hand, when the drying air volume is at most 400 m$^3$/hr, it is preferable for the economical point with the sufficient drying effect. The drying air has a dew point of preferably 0 to −60° C., more preferably −10 to −50° C., especially preferably −20 to −40° C. The necessary drying time is usually at least 15 minutes, preferably at least 1 hour, especially preferably at least 2 hours. On the other hand, when the drying time is at most 2 hours, the heat deterioration of the resin is favorably prevented. The polymer in the invention has the water content of preferably at most 1.0% by mass, more preferably at most 0.1% by mass, especially preferably at most 0.01% by mass.

(3) Melt Extrusion

The aforementioned transparent thermoplastic resin is firstly fed into a cylinder. The cylinder comprises inside thereof a feed section (section A) for transporting quantitatively the transparent thermoplastic resin fed from the feed port, a compression section (section B) for melt-kneading and compressing the transparent thermoplastic resin, and a metering section (section C) for metering the melt-kneaded and compressed polymer in this order from the feed port 40 side. The resin is preferably dried by the aforementioned method in order to reduce the water content, wherein the drying is preferably carried out using an extruder through the inside of which an inert gas (such as nitrogen) flows, or using an extruder provided with a vent and vacuum-discharging air, in order to prevent the oxidation of molten resin by residual oxygen. The extruder has a screw compression ratio set to 2.5 to 4.5, and L/d set to 20 to 70. Here, the screw compression ratio is represented by the ratio of the volumes of the feed section A and the metering section C, that is (volume of feed section A per unit length)÷(volume of metering section C per unit length), which is computed using the outer diameter d1 of the screw shaft of the feed section A, the outer diameter d2 in the screw shaft of the metering section C, the groove portion diameter a1 of the feed section A, and the groove portion diameter a2 of the metering section C. L/D is the ratio of the cylinder length to the cylinder inner diameter. The extruding temperature is set to 190 to 240° C. When the temperature within the extruder exceeds 230° C., desirably a chiller is provided between the extruder and the die.

When the screw compression ratio is at least 2.5, the mixture is sufficiently melt-kneaded to prevent generating unmolten portion and, foreign matter tends to not remain and air bubbles tend to not be formed in the transparent thermoplastic resin. On the contrary, when the screw compression ratio is at most 4.5, the degradation of the resin due to heat generation by an excessive shear stress is favorably prevented, and yellow hue of the transparent thermoplastic resin to be formed tends not to appear. In addition, the application of too much shear stress creates the cut of the molecule to decrease the molecular weight, thereby decreasing the mechanical strength of the film. Accordingly, in order to provide a film that hardly expresses yellow hue after the production thereof, has high film strength and is more resistant to the break on stretching, the screw compression ratio is in the range of preferably 2.5 to 4.5, more preferably 2.8 to 4.2, especially preferably 3.0 to 4.0.

When L/D is at least 20, the melting and kneading become sufficient, foreign matter tends not to remind in the transparent thermoplastic resin film to be formed. On the contrary, when L/D is at most 70, the staying time of the transparent thermoplastic resin in the extruder becomes short, and the degradation of the transparent thermoplastic resin film to be formed tends not to be caused. In addition, a long staying time causes the cut of the molecule or the lowering of the molecular weight to decrease the mechanical strength of the transparent thermoplastic resin film. Accordingly, in order to provide a transparent thermoplastic resin film that hardly expresses yellow hue after the production thereof, has high film strength and is more resistant to the break on stretching, L/D is in the range of preferably 20 to 70, more preferably 22 to 65, especially preferably 24 to 50.

The extrusion temperature is set preferably in the above described temperature range. The transparent thermoplastic resin film obtained in this way has such characteristic values as haze of at most 2.0%, a yellow index (YI value) of at most 10.

Here, haze is an index for whether extrusion temperature is too much low, i.e. the index shows how many unsolved foreign matter remains in the transparent thermoplastic resin film after the production thereof. When the haze is more than 2.0%, the lowered strength of the transparent thermoplastic resin film after the production thereof and the break on stretching tend to appear. The yellow index (YI value) is an index showing for whether extrusion temperature is too much high, when the yellow index (YI value) is less than 10, yellow hue hardly tends to express.

For the type of the extruder, generally a single screw extruder that requires a relatively low facility cost is used frequently, including such screw types as full-flight, Maddock and Dulmage. For the cellulose acylate resin having a comparatively low thermal stability, the full-flight type is preferred. The use of a twin screw extruder, which can practice the extrusion while volatizing unnecessary volatile components through a vent port provided in the midstream by changing the screw segment, is also possible, although the cost of facilities is high. The twin screw extruder is mainly classified into two types, i.e., co-rotation and counter-rotation types, both of which are usable herein. Of these, a co-rotation type, which hardly allows an accumulation portion to occur and has a high self-cleaning performance, is preferred. The twin screw extruder is suitable for the film formation of polymer because it has a high kneading ability and high feeding performance of resin to make extrusion at low temperatures possible, although facilities are expensive. By disposing a vent port properly, the direct use of undried polymer pellets or powder is also possible. Selvage of a film etc. that are formed during the film formation may be reused directly without drying.

The preferred diameter of a screw varies depending on a targeted extrusion volume per unit time, and is preferably 10-300 mm, more preferably 20-250 mm, even more preferably 30-150 mm.

(4) Filtration

In order to filtrate foreign substances in resin or avoid damage of a gear pump caused by foreign substances, a so-called breaker plate type filtration is preferably carried out, wherein a filtering medium is provided for the extruder outlet. In addition, in order to filtrate foreign substances with a higher accuracy, a filtering apparatus built with a so-called leaf type disc filter is preferably disposed after the pass of the gear pump. The filtration can be effected by providing one filtration section, or may be multi-step filtration effected by providing a plurality of filtering sections. The filtering medium preferably may have a higher filtration accuracy, but from the viewpoint of the pressure capacity of the filtering medium or the increase of filtering pressure that is caused by the clogging of the filtering medium, the filtration accuracy is preferably 15-3 μmm, more preferably 10-3 μmm. In particular, in case where an apparatus using a leaf type disc filter that carries out final foreign substance filtration is employed, the use of a filtering medium having a high accuracy is preferred in point of the quality, and the adjustment based on the loading number of the filter sheet is possible for the purpose of securing the fitness for the pressure capacity and the lifetime of the filter. For the type of the filtering medium, since it is used under high temperatures and high pressures, the use of steel materials are preferred, and of these, the use of stainless steel or steel is preferred, and the use of stainless steel is especially desirable in point of corrosion resistance. For the filtering medium, in addition to those having a constitution formed by knitting wire material, a sintered filtering medium formed by sintering, for example, metal long fibers or metal powder can be used, and the sintered filtering medium is preferred from the viewpoint of the filtration accuracy and filter life.

(5) Gear Pump

To improve uniformity in the thickness, reducing fluctuation in the discharge amount is important. Disposing a gear pump between the extruder and the die, and supplying a fixed amount of a cellulose acylate resin through the gear pump is effective. Such a gear pump has a pair of gears, i.e., a drive gear and a driven gear engaged with each other. By driving the drive gear to engage and rotate the two gears, a molten resin is sucked into the cavity through a suction port provided on the housing, and the resin is discharged through a discharge port also provided on the housing in a constant amount. Even if the pressure of the resin at the tip of the extruder slightly fluctuates, such fluctuation is absorbed by the use of the gear pump, and thus the fluctuation in the pressure of the resin in the downstream of the film forming apparatus becomes very small, and this improves thickness fluctuation. By using a gear pump, the fluctuation of the pressure resin at the die can be kept within +/−1%.

To improve the capability of volumetric feeding of gear pumps, an approach of controlling the pressure before a gear pump at a constant value by changing the rotational number of the screw is also applicable. A high accuracy gear pump using 3 or more gears in which fluctuation in the gear is eliminated is also effective.

For other advantages of using a gear pump, since film forming can be performed with a decreased pressure at the screw tip, reduction of energy consumption, prevention of increase in the resin temperature, improvement in transportation efficiency, shortening of the residence time in the extruder and reduction of the L/D in the extruder can be expected. Further, when using a filter for removing contaminants, the amount of the resin supplied through the screw may fluctuate due to increase in the filtration pressure in the absence of a gear pump; this problem, however, can be solved by using a gear pump in combination. On the other hand, such a gear pump has a disadvantage that equipment becomes long depending on which equipment is selected, and the residence time of the resin is extended. In addition, due to the shearing stress in the gear pump, molecular chains may be broken. Accordingly, attention must be paid to these disadvantages.

A preferred residence time for a resin which is introduced into the extruder through a supply port and discharged from the die is from 2 to 60 minutes, more preferably from 3 to 40 minutes, and further preferably from 4 to 30 minutes.

If the flow of polymer for circulation in a bearing of the gear pump becomes poor, sealing with the polymer at the driving part and the bearing part becomes poor, causing problems such as large fluctuation in the pressure of measurement and the pressure of extrusion and feeding of liquid. Therefore, designing of gear pumps (particularly clearance) in accordance with the melt viscosity of cellulose acylate resin is necessary. Further, in some cases, the residence part in the gear pump gives rise to deterioration of transparent thermoplastic resin, and therefore a structure with the smallest possible residence is preferred. A polymer tube and adapters connecting the extruder and the gear pump or the gear pump and the die must also be designed with the smallest possible residence. In addition, for the stabilization of the extrusion pressure of transparent thermoplastic resin whose melt viscosity is highly dependent on the temperature, fluctuation in the temperature is preferably kept as small as possible. In general, a band heater whose equipment cost is low is often used for heating the polymer tube, but an aluminum cast heater with a smaller temperature fluctuation is more preferably used. Further, to stabilize the discharge pressure of the extruder as described above, melting is preferably performed by heating with a heater dividing the barrel of the extruder into 3 to 20 areas.

(6) Die

A transparent thermoplastic resin is melted in an extruder configured as above, and the molten resin is continuously fed to a die, if necessary, through a filtering device and/or a gear pump. Any type of commonly used dies such as a T-die, a fish-tail die, and a hanger coat die may be used as long as the die is designed so that the residence of the molten resin in the die is short. A static mixer may be disposed immediately before the T die in order to improve uniformity of the resin temperature. The clearance of the T die outlet is generally 1.0 to 5.0 times, preferably 1.2 to 3 times, more preferably 1.3 to 2 times the film thickness. When the lip clearance is less than 1.0 times the film thickness, a well-formed sheet is difficult to obtain by film forming. When the lip clearance is larger than 5.0 times the film thickness, the uniformity in the thickness of the sheet is disadvantageously decreased. The die is a very important device for determining the thickness uniformity of the film, and a die capable of precisely controlling the thickness is preferred. The thickness is generally controllable in increments of 40 to 50 mm, but dies capable of controlling the film thickness in increments of preferably 35 mm or less, more preferably 25 mm or less are preferred. In order to improve the uniformity of the formed film, a design in which unevenness in the temperature of the die and unevenness in the flow rate in the width direction are as small as possible is essential. In addition, an automatic thickness control die in which the film thickness in the downstream is measured to calculate thickness deviation and the result is given as a feedback for controlling the thickness in the die is effective for reducing thickness fluctuation in a long-term continuous production.

A single layer film forming apparatus whose equipment cost is low is generally used for producing a film. In some cases, however, a multi-layer film forming apparatus may also be used for forming a functional layer as an outer layer so as to produce a film having two or more structures. Generally, a thin functional layer is preferably stacked on the surface layer, and the ratio of the thickness of the layers is not particularly limited.

(7) Casting

A molten resin extruded in the form of a sheet through a die according to the above method is solidified by cooling on a casting drum to give a film. In this step, contact between the casting drum and the melt-extruded sheet is preferably increased using an electrostatic application method, an air knife method, an air chamber method, a vacuum nozzle method, or a touch roll method. Such a method of improving the contact may be performed on the entire surface of the melt-extruded sheet or on some part.

In the invention, it is particularly preferable to employ the touch roll method when casting. The method includes inserting the melt released from the die with a casting drum and a touch roll to solidify by cooling. As a result, the unevenness when extruded from the die as described above can be improved. Since the touch roll can be kept at a constant temperature by incorporating a heat medium in its inside, the resin can be solidified by cooling at a constant temperature over the entire width by inserting the molten resin. When the cooling temperature is uneven, there rises a partial distortion at the time of solidification by cooling. Thus, the in-plane unevenness can be reduced by reducing the temperature unevenness using a touch roll.

The touch roll generally employs a rigid material, but if the material is too rigid, a residual straining tends to generate easily at the time of inserting the melt released from the die between rolls, and thus further encourages a partial distortion. Accordingly, the touch roll material having an elastic property is preferable. In this manner, excessive contact pressure is absorbed by a transformation of touch rolls, and the distortion can be prevented. In order to provide an elastic property to a roll, it is necessary for the thickness of the roll sheath to be thinner than the conventional rolls, and the wall thickness Z of the sheath is preferably from 0.05 to 7.0 mm, more preferably from 0.2 mm to 5.0 mm, and further preferably from 0.3 to 3.5 mm. The touch roll may be provided on a metal shaft, and a heat medium (fluid) may be provided between the rolls, which can be exemplified by ones provided with an elastic layer between the top of metal shaft and the outer sheath and filled with a heat medium (fluid) between the outer sheaths.

As mentioned, since the touch roll has a low elastic property, when it is contacted with a casting roll, the elastic deformation into a concave form takes place due to the pressing pressure. Accordingly, the pressure from the touch roll and the casting roll is dispersed to be in contact with a cooling roll, and thus the low surface pressure is achieved. Therefore, a uniform cooling can be achieved without remaining residual strains on a film incorporated between. The line pressure of the touch roll is preferably in the range of 1 kg/cm to 100 kg/cm, more preferably in the range of 2 kg/cm to 80 kg/cm, and further preferably in the range of 3 kg/cm to 60 kg/cm. The line pressure mentioned herein refers to the value obtained by dividing the force applying to the touch roll by the width of a discharge port of the die. When the line pressure is 1 kg/cm or more, the in-plane unevenness caused by poor pressing of the touch roll can be effectively revised, and when the line pressure is 100 kg/cm or less, an even line pressure can be applied over the entire width, thus the line pressure gathering at both ends or center of the roll can be effectively prevented, thereby further effectively revising the in-plane unevenness.

The touch roll is set at a temperature of preferably 60 to 160° C., more preferably 70 to 150° C., and further preferably 80 to 140° C. The temperature control can be achieved by passing liquid or gas adjusted to the temperature inside the rolls.

It is preferable that the surface of touch roll and casting roll is a mirror plane, and an arithmetic average height Ra is preferably 100 nm or less, more preferably 50 nm or less, and further preferably 25 nm or less. In specific, ones disclosed in, for example, Japanese Unexamined Patent Application Publication Nos. H11-314263, 2002-36332, H11-235747, 2004-216717, and 2003-145609, WO97/28950, or the like, can be used.

By performing film-forming process using the touch roll, the elasticity modulus of the transparent thermoplastic film, for example, is 2.9 kN/mm$^2$ or less, more preferably in the range of from 1.2 to 2.8 kN/mm$^2$, and further more preferably in the range of from 1.5 to 2.7 kN/mm$^2$. Because of lowering the elasticity modulus by preventing the crystal from growing, it is possible to rapidly cool the melt resin (melt) between the casting rolls by using the touch roll. In addition, since the melt of which free volume is large at a high temperature is cooled and solidified, the melt turns a film with a low density, thereby decreasing the optical elasticity modulus.

In this manner, by decreasing the optical elasticity modulus, the successive stretching can be easily performed (where it is possible to stretch with the low tensile force). Consequently, it is possible to more efficiently prevent the local thermal expansion or the elasticity modulus distribution resulting from the stretch irregularity from occurring. In addition, it is possible to decrease the distribution of the orientation angle. Furthermore, when the film is processed into a polarization plate, it is possible to easily transform (contract) the film using the contraction stress of a polarizer (for example, stretch PVA).

Consequently, by preventing the residue distortion from occurring, it is possible to decrease the local thermal expansion distribution, the elasticity modulus distribution, and the orientation angle distribution.

It is more preferable that the annealing is performed using a number of casting drums (roll) (among these, the one employing the touch roll is placed to be touched to a first casting roll of the highest upstream (near to the die)). While using three cooling rolls is rather common, the number of rolls is not limited thereto. The roll diameter is preferably from 50 to 5,000 mm, more preferably from 100 to 2,000 mm, and further preferably from 150 to 1,000 mm. The face-to-face distance between the plural rolls is preferably from 0.3 to 300 mm, more preferably from 1 to 100 mm, and further preferably from 3 to 30 mm. The casting drum is set to preferably from 60 to 160° C., more preferably from 70 to 150° C., and further preferably from 80 to 140° C.

The resin is then peeled off from the casting drum and taken up through a nip roller. The take up rate is preferably 10 m/minute to 100 m/minute, more preferably 15 m/minute to 80 m/minute, and further preferably 20 m/minute to 70 m/minute.

The filming width is preferably 0.7 m to 5 m, more preferably 1 m to 4 m, and further preferably 1.3 m to 3 m. A non-stretched film thus obtained has a thickness of 30 to 400 μm, more preferably 40 to 300 μm, and further preferably 50 to 200 μm.

Preferably, both ends of the sheet are trimmed before it is taken up. As a trimming cutter, any cutter such as a rotary cutter, a shear blade, and a knife may be used. In general, use of a hard blade or a ceramic blade is preferred because they have a long life and generation of chips upon cutting can be reduced. The cut-off portion by trimming may be crushed and reused as a raw material.

Before the take-up, a process of providing thickness on one side or both sides (knurling treatment) can be preferably performed. The height of rough protrusion due to the thickening process is preferably 1 to 200 μm, more preferably 10 to 150 μm, and further preferably 20 to 100 μm. The thickening process may be performed to give protrusion on both sides or on one side. The width for thickening process is preferably 1 to 50 mm, more preferably 3 to 30 mm, and further preferably 5 to 20 mm. The extrusion process is generally carried out at room temperature (for example, 18° C.) to 300° C.

Before the take-up, a lamination film is preferably applied to at least one surface for preventing scars. The thickness of lamination film is 5 to 200 μm, more preferably 10 to 150 μm, and further preferably 15 to 100 μm. The material may be polyethylene, polyester, polypropylene, or the like, without being particularly limited.

The take up tension is preferably 1 kg/m in width to 50 kg/m in width, more preferably 2 kg/m in width to 40 kg/m in width, and further preferably 3 kg/m in width to 20 kg/m in width. When the take-up tension is 1 kg/m or more in width, uniform take up of the film tends to be easy. On the other hand, when the take-up tension is 50 kg/m or less in width, the tight winding of the film or giving a poor appearance of the wound film tend to improve, and also problems such as raised portions in the film is extended due to creep, resulting in waving of the film, and residual birefringence is produced due to extension of the film, are more likely to improve. The take-up tension is detected by tension control along the line, and the film is preferably taken up being controlled to a constant take-up tension. When the film temperature varies depending on the position in the film forming line, films may have a slightly different length due to thermal expansion. Accordingly, it is necessary that the drawing ratio of nip rollers is adjusted so that a tension higher than a pre-determined tension is not applied to the film in the line.

The film can be taken up at a constant tension by the control in the tension control. More preferably, however, the tension is tapered proportional to the roll diameter to determine an appropriate take-up tension. Generally, the tension is gradually reduced as the roll diameter increases, but in some cases, the tension is preferably increased as the roll diameter increases.

(Solution Film Formation)

Though the melt extrusion process is described above, in the present invention, cellulose acylate resin and polycarbonate resin can be formed by a solution film formation. For solvent in this case, both of (a) chlorine-containing solvents and (b) chlorine-free solvents can be used.

(a) Chlorine-Containing Solvent

The chlorine-containing organic solvent is preferably dichloromethane or chloroform. Dichloromethane is particularly preferred. Any organic solvent other than chlorine-containing organic solvent may be incorporated into the chlorine-containing organic solvent without particular problems. In this case, it is preferable to use dichloromethane in an amount of at least 50 weight %.

Chlorine-free solvents used in combination with the chlorine-containing solvent used in the present invention will be described below. Preferred examples of the chlorine-free solvent include esters, ketones, ethers, alcohols and hydrocarbons each having 3 to 12 carbon atoms. The esters, ketones, ethers and alcohols may have a cyclic structure. Compounds having two or more functional groups of ester, ketone or ether (i.e., —O—, —CO— or —COO—) may also be used as the solvent, and the organic solvents may also have other functional groups such as alcoholic hydroxyl group. Such solvents having two or more functional groups preferably have carbon atoms in a number within the range defined above for the compounds having any one of the functional groups. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methylcyclohexanone. Examples of the ethers having 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvents having two or more functional groups include 2-ethoxyethyl acetate, 2-methoxyethanol and 2-butoxyethanol.

The alcohols used in combination with the chlorine-containing organic solvents may have a straight, branched or cyclic structure. The alcohol is particularly preferably a saturated aliphatic hydrocarbon. The alcohols may be any of primary, secondary and tertiary alcohols. Examples of the alcohols include methanol, ethanol, 1-propanol, 2-propanol, 1-butanol, 2-butanol, tert-butanol, 1-pentanol, 2-methyl-2-butanol and cyclohexanol. As the alcohol, a fluorine-containing alcohol may also be used. Examples include 2-fluoroethanol, 2,2,2-trifluoroethanol, 2,2,3,3-tetrafluoro-1-propanol and so forth. The hydrocarbons may have a straight, branched or cyclic structure. Either aromatic hydrocarbons or aliphatic hydrocarbons may be used. The aliphatic hydrocarbons may be saturated or unsaturated. Examples of the hydrocarbons include cyclohexane, hexane, benzene, toluene and xylene.

Although the chlorine-free organic solvent used together with the chlorine-containing organic solvent is are not particularly limited, it may be selected from methyl acetate, ethyl acetate, methyl formate, ethyl formate, acetone, dioxolane, dioxane, ketones and acetoacetic acid esters having 4 to 7 carbon atoms, and alcohols and hydrocarbons having 1 to 10 carbon atoms. Preferred examples of the chlorine-free organic solvent used together include methyl acetate, acetone, methyl formate, ethyl formate, methyl ethyl ketone, cyclopentanone, cyclohexanone, methyl acetylacetate, methanol, ethanol, 1-propanol, 2-propanol, 1-butanol, 2-butanol, cyclohexanol, cyclohexane and hexane.

Examples of the combination of the chlorine-containing organic solvents used as a preferred main solvent in the present invention include the following combinations. However, the combination is not limited to these examples (the numerals in the parentheses mentioned below means parts by weight).

Dichloromethane/methanol/ethanol/butanol (80/10/5/5)
Dichloromethane/acetone/methanol/propanol (80/10/5/5)
Dichloromethane/methanol/butanol/cyclohexane (80/10/5/5)
Dichloromethane/methyl ethyl ketone/methanol/butanol (80/10/5/5)
Dichloromethane/acetone/methyl ethyl ketone/ethanol/isopropanol (72/9/9/4/6)
Dichloromethane/cyclopentanone/methanol/isopropanol (80/10/5/5)
Dichloromethane/methyl acetate/butanol (80/10/10)
Dichloromethane/cyclohexanone/methanol/hexane (70/20/5/5)
Dichloromethane/methyl ethyl ketone/acetone/methanol/ethanol (50/20/20/5/5),
Dichloromethane/1,3-dioxolane/methanol/ethanol (70/20/5/5)
Dichloromethane/dioxane/acetone/methanol/ethanol (60/20/10/5/5)
Dichloromethane/acetone/cyclopentanone/ethanol/isobutanol/cyclohexane (65/10/10/5/5/5)
Dichloromethane/methyl ethyl ketone/acetone/methanol/ethanol (70/10/10/5/5)
Dichloromethane/acetone/ethyl acetate/ethanol/butanol/hexane (65/10/10/5/5/5)
Dichloromethane/methyl acetoacetate/methanol/ethanol (65/20/10/5)
Dichloromethane/cyclopentanone/ethanol/butanol (65/20/10/5)

(b) Chlorine-Free Solvent

Preferred examples of the chlorine-free solvent include esters, ketones and ethers each having 3 to 12 carbon atoms. The esters, ketones and ethers may have a cyclic structure. Compounds having two or more functional groups of ester, ketone or ether (i.e., —O—, —CO— or —COO—) may also be used as the main solvent, and the organic solvents may have other functional groups such as alcoholic hydroxyl group. Such solvents having two or more functional groups preferably have carbon atoms in a number within the range defined above for the compounds having any one of the functional groups. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methylcyclohexanone. Examples of the ethers having 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvents having two or more functional groups include 2-ethoxyethyl acetate, 2-methoxyethanol and 2-butoxyethanol.

Further examples of the solvent preferred for the cellulose acylate used in the present invention include a mixed solvent composed of three or more kinds of different solvents. The first solvent is one selected from methyl acetate, ethyl acetate, methyl formate, ethyl formate, acetone, dioxolane and dioxane or a mixed solvent of two or more kinds of them. The second solvent is selected from ketones having 4 to 7 carbon atoms and acetoacetic acid esters. The third solvent is selected from alcohols or hydrocarbons having 1 to 10 carbon atoms, preferably alcohols having 1 to 8 carbon atoms. When the first solvent is a mixture of two or more kinds of solvents, the second solvent may not be used. The first solvent is preferably methyl acetate, acetone, methyl formate, ethyl formate or a mixture thereof. The second solvent is preferably methyl ethyl ketone, cyclopentanone, cyclohexanone, methyl acetylacetate or a mixture thereof.

The alcohol as the third solvent may have a straight, branched or cyclic structure. In particular, the third solvent is preferably an alcohol derived from a saturated aliphatic hydrocarbon. The alcohol may be any of primary, secondary and tertiary alcohols. Examples of the alcohol include methanol, ethanol, 1-propanol, 2-propanol, 1-butanol, 2-butanol, tert-butanol, 1-pentanol, 2-methyl-2-butanol and cyclohexanol. As the alcohol, a fluorine-containing alcohol may also be used. Examples thereof include 2-fluoroethanol, 2,2,2-trifluoroethanol and 2,2,3,3-tetrafluoro-1-propanol. The hydrocarbon may have a straight, branched or cyclic structure. Either an aromatic hydrocarbon or an aliphatic hydrocarbon may be used. The aliphatic hydrocarbon may be saturated or unsaturated. Examples of the hydrocarbon include cyclohexane, hexane, benzene, toluene, xylene and so forth. The alcohols and the hydrocarbons as the third solvent may be used independently or as a mixture of two or more kinds of them. Specific examples of compounds as the third solvent include alcohols such as methanol, ethanol, 1-propanol, 2-propanol, 1-butanol, 2-butanol and cyclohexanol, cyclohexane and hexane. Among these, methanol, ethanol, 1-propanol, 2-propanol and 1-butanol are particularly preferred.

The aforementioned mixed solvent of three kinds of solvents preferably contains the first, second and third solvents at proportions of 20 to 95 weight %, 2 to 60 weight % and 2 to 30 weight %, respectively, more preferably 30 to 90 weight %, 3 to 50 weight % and 3 to 25 weight %, respectively. Still more preferably, the mixed solvent contains 30 to 90 weight % of the first solvent, 3 to 30 weight % of the second solvent and 3 to 15 weight % of an alcohol as the third solvent. When the first solvent is a mixture, and the second solvent is not used, the first and third solvent are preferably contained at proportions of 20 to 90 weight % and 5 to 30 weight %, respectively, more preferably 30 to 86 weight % and 7 to 25 weight %, respectively. The aforementioned chlorine-free organic solvents used in the present invention are described in more detail in Kokai Gifo of Japan Institute of Invention & Innovation, Kogi No. 2001-1745, published on Mar. 15, 2001, pp. 12-16.

Preferred examples as main solvent of the combination of the chlorine-free organic solvents used for the present invention are described below. However, the combination is not limited to these examples (the numerals in the parentheses mentioned below means parts by weight).
Methyl acetate/acetone/methanol/ethanol/butanol (75/10/5/5/5)
Methyl acetate/acetone/methanol/ethanol/propanol (75/10/5/5/5)
Methyl acetate/acetone/methanol/butanol/cyclohexane (75/10/5/5/5)
Methyl acetate/acetone/ethanol/butanol (81/8/7/4)
Methyl acetate/acetone/ethanol/butanol (82/10/4/4)
Methyl acetate/acetone/ethanol/butanol (80/10/4/6)
Methyl acetate/methyl ethyl ketone/methanol/butanol (80/10/5/5)
Methyl acetate/acetone/methyl ethyl ketone/ethanol/isopropanol (75/8/8/4/5)
Methyl acetate/cyclopentanone/methanol/isopropanol (80/10/5/5)
Methyl acetate/acetone/butanol (85/10/5)
Methyl acetate/cyclopentanone/acetone/methanol/butanol (60/15/15/5/5)
Methyl acetate/cyclohexanone/methanol/hexane (70/20/5/5)
Methyl acetate/methyl ethyl ketone/acetone/methanol/ethanol (50/20/20/5/5)
Methyl acetate/1,3-dioxolane/methanol/ethanol (70/20/5/5)
Methyl acetate/dioxane/acetone/methanol/ethanol (60/20/10/5/5)
Methyl acetate/acetone/cyclopentanone/ethanol/isobutanol/cyclohexane (65/10/10/5/5/5)
Methyl formate/methyl ethyl ketone/acetone/methanol/ethanol (50/20/20/5/5)
Methyl formate/acetone/ethyl acetate/ethanol/butanol/hexane (65/10/10/5/5/5)
Acetone/methyl acetoacetate/methanol/ethanol (65/20/10/5)
Acetone/cyclopentanone/ethanol/butanol (65/20/10/5)
Acetone/1,3-dioxolane/ethanol/butanol (65/20/10/5)
1,3-Dioxolane/cyclohexanone/methyl ethyl ketone/methanol/butanol (55/20/10/5/5/5)

Further, it is also preferable to dissolve the resin in multiple steps by, after dissolution, further adding a part of the solvents, as summarized below (the numerals in the parentheses mentioned below means parts by weight).
Preparation of a Cellulose Acylate Resin Solution with Methyl acetate/acetone/ethanol/butanol (81/8/7/4), filtration, concentration and subsequent further addition of 2 weight parts of butanol Preparation of a Cellulose Acylate Resin Solution with Methyl acetate/acetone/ethanol/butanol (81/10/4/2), filtration, concentration and subsequent further addition of 4 weight parts of butanol.
Preparation of a Cellulose Acylate Resin Solution with Methyl acetate/acetone/ethanol (84/10/6), filtration, concentration and subsequent further addition of 5 weight parts of butanol In the present invention, whether the chlorine-containing solvent or chlorine-free solvent is used, the cellulose acylate resin is preferably dissolved in the solvent preferably in an amount of 10 to 40% by weight, more preferably 13 to 35% by weight, particularly preferably 15 to 30% by weight.

Prior to the dissolution, the resin is preferably swelled with the solvent at a temperature of 0 to 50° C. for 0.1 to 100 hours.

The various additives may be added before, during or after the swelling step, or during or after cooling or dissolution after the swelling.

In the present invention, a cooling and heating method may also be used in order to dissolve the cellulose acylate resin. As the cooling and heating method, the methods described in Japanese Patent Laid-open Publication Nos. 11-323017, 10-67860, 10-95854, 10-324774 and 11-302388 may be used. That is, the cellulose acylate resin swelled by mixing it with the solvent is dissolved by using a screw type kneader provided with a cooling jacket.

In the present invention, the solution (dope) is preferably subjected to concentration and/or filtration, and techniques for these described in detail in Kokai Gifo of Japan Institute of Invention & Innovation, Kogi No. 2001-1745, published on Mar. 15, 2001, p. 25 can be used.

Next, a solution film forming method will be described. A dope (cellulose acylate solution) prepared from a dissolver (pot) is once stored in a storage pot, and the dope is deaerated for final preparation.

The dope from the storage pot is, for example, transported to a compression mold die via a compression quantitative gear pump which can highly precisely transport fixed quantity of liquid with a revolution speed; homogeneously flow casted on a metal support (band, drum) of flow casting area where the dope runs endlessly from a cap (slit) of compression die; and a half-dried dope film (also may be referred to as web) is peeled off from the metal support at a peel point where the metal support almost has went around. At this occasion, drying is performed under the above-mentioned conditions. Both ends of the peeled web are held by clips, the web is transferred with tentering while retaining the width and dried, subsequently transferred with a group of rolls in a drying device and dried, and then knurling (pattern embossing) process is performed after the trimming and then the resultant is taken-up to a predetermined length with a take-up device. The taken up length is preferably 1,000 to 5,000 m, and more preferably 1,500 to 4,000, the taken up width is 0.5 to 4 µm, and more preferably 1 to 3 µm, and the thickness is 20 to 300 µm, and more preferably 30 to 200 m. The drying temperature is 100 to 200° C., and more preferably 120 to 180° C., the drying time is preferably from 10 to 200 minutes, and more preferably from 15 to 80 minutes.

The process of flow casting may be a monolayer casting of cellulose acylate solution of one kind, or two or more kinds of cellulose acylate solutions may be simultaneously or successively co-casted. For such solution film forming method, the method disclosed in public technique (public number 2001-1745, published in Mar. 15, 2001, association of invention) may also be employed.

<<Stretching>>

In the invention, a transparent thermoplastic film formed as described above is preferably subjected to a longitudinal stretching/transverse stretching, and relaxation according to the method described above. Any one of longitudinal stretching and transverse stretching, or both of them may be carried out. The longitudinal stretching and the transverse stretching each may be performed once or may be performed for number of times, or the longitudinal and transverse stretching may be performed simultaneously. The order of performing longitudinal stretching and transverse stretching is not particularly limited, but the transverse stretching is preferably performed after performing the longitudinal stretching. The longitudinal stretching and the transverse stretching may be carried out by cutting from the film formed (after film forming, taken up piece is resent for stretching) or may be successively performed (after film forming, directly subjected to successive stretching). The relaxation is preferably performed when at least one of the longitudinal stretching and the transverse stretching is done, and more preferably (1) no longitudinal relaxation is performed after the longitudinal stretching and a transverse relaxation is performed after the transverse stretching, or (2) relaxation and a transverse relaxation are performed via longitudinal stretching/transverse stretching.

(1) Longitudinal Stretching

It is preferable to carry out the longitudinal stretching under the above-mentioned conditions (ratio of length to width, temperature, and magnification).

(2) Transverse Stretching

It is preferable to carry out the preheating and the heat treating before the stretching under the above-mentioned conditions (length of the transverse stretching zone/length of the preheating zone and heat-treatment temperature before stretching). After that, the longitudinal stretching is carried out under the above-mentioned conditions (widening angle, temperature, and magnification). Then, the heat-treatment is carried out after the stretching under the above-mentioned conditions.

(3) Relaxation

The longitudinal relaxation and the transverse relaxation are preferably performed according to the above-mentioned method when one or both of the longitudinal stretching and the transverse stretching is/are done. The thickness of the stretching film thus obtained is preferably 30 to 200 µm, more preferably 40 to 150 µm, and further preferably 50 to 120 µm.

The elasticity modulus of the transparent thermoplastic film is preferably in the range of from 2.9 kN/mm$^2$ or less, more preferably in the range of from 1.2 kN/mm$^2$ to 2.8 kN/mm$^2$, and further more preferably in the range of from 1.5 kN/mm$^2$ to 2.7 kN/mm$^2$. In particular, the heat relaxation after the stretching can result in the decrease in elasticity modulus.

The low elasticity modulus results in the decrease in the distortion after performing the polarization plate, thereby alleviating the image irregularity when the film is used as a liquid crystal display plate. That is, the irregularity in the surface of the stretched film becomes the image irregularity. However, the irregularity can be easily shown due to the contraction stress of the polarizer (PVA layer in which iodine is impregnated) among the polarization plate. In particular, when the elasticity modulus of the transparent thermoplastic film is high, the transparent thermoplastic film resists to the contraction stress. Consequently, when there is the irregularity in the film surface, the distribution of the orientation angle can be easily large due to the occurrence of difference in a contraction amount. Conversely, when the elasticity modulus is low, the entire film is contracted in the uniformity manner in accordance with the contraction stress of the polarization layer. Consequently, the image irregularity is difficult to occur.

<<Producing of Transparent Thermoplastic Film>>

The transparent thermoplastic film obtained in the above manner may be used alone; in combination of polarizing plate; or with the provision of a liquid crystalline layer, a layer having a controlled refractive index (low reflecting layer), or a hard coat layer, provided thereon. These may be achieved by the following processes.

1. Surface Treatment (1) Cellulose Acylate Film

The surface treatment of a mixed cellulose acylate film is sometimes effective for providing an improved adhesion between it and any functional layer (for example, an undercoat or backup layer). Examples are glow discharge treatment, ultraviolet irradiation, corona treatment, flame treatment and acid or alkali treatment.

Glow discharge treatment is preferably carried out by treatment with a low-temperature plasma occurring at a low gas pressure of 10$^{-3}$ to 20 torr or by plasma treatment at an atmospheric pressure. Plasma-excitable gas is gas excited into a plasma under such conditions, for example, argon, helium, neon, krypton, xenon, nitrogen, carbon dioxide, tetrafluoromethane or any other Freon, or a mixture thereof. Details thereof are stated in Published Technical Report of The Hatsumei Kyokai (Association of Inventions) (Report No. 2001-1745, published on Mar. 15, 2001 by Hatsumei Kyokai), pages 30 to 32. The atmospheric pressure plasma treatment which has recently been drawing attention employs, for example, from 20 to 500 Kgy of irradiation energy at 10 to 1,000 Kev and preferably from 20 to 300 Kgy of irradiation energy at 30 to 500 Kev.

Of those, Alkali saponification treatment is particularly preferable.

The alkali saponification treatment of a cellulose acylate film may be effected by dipping the film in a saponifying solution or coating it with the solution. The dipping method may be carried out by passing a film for a period of 0.1 to 10 minutes through a tank containing an aqueous solution of e.g. NaOH or KOH having a pH of 10 to 14 and a temperature of 20° C. to 80° C., neutralizing it, washing it with water and drying it.

The coating method may be carried out by dip coating, curtain coating, extrusion coating, bar coating or E type coating. A coating solution for alkali saponification treatment is preferably prepared by selecting a solvent which improves the wetting property of the saponifying solution on the film and maintains its surface in a good condition without forming any unevenness thereon. More specifically, an alcoholic solvent is preferable and isopropyl alcohol is particularly preferable. An aqueous solution of a surface active agent can also be used as a solvent.

The alkali in the coating solution for alkali saponification is preferably one soluble in the solvent and KOH or NaOH is particularly preferable. The coating solution preferable has a pH of 10 or higher and more preferably 12 or higher. The reaction of alkali saponification is preferably carried out for a period of from one second to five minutes, more preferably from five seconds to five minutes and still more preferably from 20 seconds to three minutes, all at room temperature. The reaction of alkali saponification is preferably followed by washing with water the surface coated with the saponifying solution, or by washing it with an acid and thereafter with water. These methods of saponification are specifically described in, for example, JP-A 2002-82226 and WO02/46809.

An undercoat layer is preferably formed for adhesion to a functional layer. The undercoat layer may be formed after the above surface treatment or without any surface treatment. For details of the undercoat layer, reference is made to Published Technical Report of The Hatsumei Kyokai (Association of Inventions) (Report No. 2001-1745, published on Mar. 15, 2001 by Hatsumei Kyokai), page 32.

(2) Other Transport Thermoplastic Resin Without Cellulose Acylate Film

The surface treatment of a transparent thermoplastic resin such film as a saturated norbornene resin film is sometimes effective for providing an improved adhesion between it and any functional layer (for example, an undercoat or backup layer). Examples are glow discharge treatment, ultraviolet irradiation, corona treatment, flame treatment and acid or alkali treatment.

Glow discharge treatment is preferably carried out by treatment with a low-temperature plasma occurring at a low gas pressure of $10^{-3}$ to 20 torr or by plasma treatment at an atmospheric pressure. Plasma-excitable gas is gas excited into a plasma under such conditions, for example, argon, helium, neon, krypton, xenon, nitrogen, carbon dioxide, tetrafluoromethane or any other Freon, or a mixture thereof. Details thereof are stated in Published Technical Report of The Hatsumei Kyokai (Association of Inventions) (Kokai Gifo of Japan Institute of Invention & Innovation, Kogi No. 2001-1745, published on Mar. 15, 2001), pages 30 to 32. The atmospheric pressure plasma treatment which has recently been drawing attention employs, for example, from 20 to 500 Kgy of irradiation energy at 10 to 1,000 Kev and preferably from 20 to 300 Kgy of irradiation energy at 30 to 500. Glow discharge treatment, ultraviolet irradiation, and flame treatment are particularly preferable among those methods of film surface treatment.

2. Combination with a Functional Layer

The transparent thermoplastic resin film of the present invention is preferably combined with functional layers as described in detail in Kokai Gifo of Japan Institute of Invention & Innovation, Kogi No. 2001-1745, published on Mar. 15, 2001, pages 32 to 45. It is particularly preferable to form a polarizing layer to make a polarizing film (polarizing plate), an optical compensation layer (optical compensation sheet) or an antireflection layer (antireflection film).

(1) Polarizing Layer (Formation of Polarizing Plate)
(1-1) Materials Used for a Polarizing Layer A polarizing film which is now commercially available is usually made by dipping a stretched polymer in a solution of iodine or a dichroic dye in a bath so that iodine or a dichroic dye may penetrate through the polymer. A coating type polarizing layer, typically of Optiva Inc., can also be used as a polarizing layer. The iodine or dichroic dye in the polarizing film is aligned in the binder to exhibit a polarizing performance. An azo, stilbene, pyrazolone, triphenylmethane, quinoline, oxazine, thiazine or anthraquinone dye is used as the dichroic dye. The dichroic dye is preferably water-soluble. The dichroic dye preferably has a hydrophilic substituent group (for example, a sulfo, amino or hydroxyl group). Examples of compounds are found in Kokai Gifo of Japan Institute of Invention & Innovation, Kogi No. 2001-1745, published on Mar. 15, 2001, page 58.

The binder of the polarizing film may be a polymer which is itself cross-linkable, or a polymer which is cross-linkable by a cross-linking agent, or any of a plurality of combinations thereof. Examples of suitable binders are methacrylate copolymers, styrene copolymers, polyolefins, polyvinyl alcohols and modified polyvinyl alcohols, poly(N-methylolacrylamide), polyesters, polyimides, vinyl acetate copolymers, carboxymethyl cellulose and polycarbonates as listed in paragraph [0022] of JP-A No. H8-338913. A silane coupling agent can be used as a binder. Water-soluble binders, such as poly(N-methylolacrylamide), carboxymethyl cellulose, gelatin, polyvinyl alcohols or modified polyvinyl alcohols, are preferable, gelatin, polyvinyl alcohols and modified polyvinyl alcohols are more preferable, and polyvinyl alcohols and modified polyvinyl alcohols are most preferable. It is particularly preferable to use together two kinds of polyvinyl alcohols or modified polyvinyl alcohols having different degrees of polymerization.

It is preferable to use polyvinyl alcohols having a saponification degree of from 70 to 100% and more preferably from 80 to 100%. The preferred polymerization degree thereof is from 100 to 5,000. For modified polyvinyl alcohols, reference is made to JP-A No. H8-338913, JP-A No. H9-152509 and JP-A No. H9-316127. Two or more kinds of polyvinyl alcohols or modified polyvinyl alcohols may be used together.

The polarizing film preferably has a thickness of 10 μm or more. As regards the upper limit of its thickness, a smaller thickness is better for avoiding the leakage of light from a liquid crystal display device, and it is preferably equal to or less than the thickness of a commercially available polarizing plate (about 30 μm), more preferably 25 μm or less and still more preferably 20 μm or less. The polymer for forming a polarizing film may be a cross-linked one. A polymer or monomer having a cross-linking functional group may be mixed in the polymer for a polarizing film, or a cross-linking functional group may be given to the polymer itself. Its cross-linking may be effected by applying light or heat, or making a pH change to form a polymer having a cross-linked structure. For the cross-linking agent, reference is made to U.S. Reissue Pat. No. 23,297. A boron compound, such as boric acid or borax, can be used as a cross-linking agent, too. The amount of the cross-linking agent to be added to the polymer is preferably from 0.1 to 20% by mass thereof. This makes it possible to form a polarizing film improved in alignment and wet heat resistance. When a cross-linking reaction has ended, the amount of any unreacted cross-linking agent is preferably 1.0% by mass or less and more preferably 0.5% by mass or less. This makes it possible to form a polarizing film of improved weatherability.

(1-2) Stretching of Polarizing Layer

A polarizer is preferably dyeing with iodine or a dichroic dye after stretching a polarizing film for forming a polarizing film (stretching method) or rubbing it (rubbing method). When the stretching method is employed, its stretching ratio is preferably from 2.5 to 30.0 times and more preferably from 3.0 to 10.0 times. Dry stretching in the air may be employed. It is also possible to employ wet stretching by dipping a film in water. Its dry stretching ratio is preferably from 2.5 to 5.0 times and its wet stretching ratio is preferably from 3.0 to 10.0 times. Its stretching may be effected in parallel to its MD direction (parallel stretching), or in an inclined direction (inclined stretching). Its stretching may be completed at a time, or may be carried out several times progressively. Progressive stretching enables uniform stretching even at a high stretching ratio.

a) Parallel Stretching

A PVA film is swollen before stretching. Its swelling degree is from 1.2 to 2.0 times when a swollen film is compared in weight with the film yet to be swollen. Then, it is stretched in a bath containing an aqueous medium or a solution of a dichroic dye and having a temperature of from 15° C. to 50° C. and preferably from 17° C. to 40° C., while it is continuously transported by guide rolls, etc. Its stretching can be achieved by holding it by two pairs of nip rollers and operating the latter pair of nip rollers at a higher transporting speed than that of the former. Its stretching ratio is the ratio in length of the stretched film to the original film and is preferably from 1.2 to 3.5 times and more preferably from 1.5 to 3.0 times in view of the performance and advantages as stated above. Then, it is dried at a temperature of 50° C. to 90° C. to yield a polarizing film.

b) Inclined Stretching

Inclined stretching may be carried out by employing a method using a tenter extending in an inclined direction as described in JP-A No. 2002-86554. This stretching is carried out in the air and requires a film to contain water so that its stretching may be easier. Its water content is preferably from 5 to 100% and more preferably from 10 to 100%. Its stretching temperature is preferably from 40° C. to 90° C. and more preferably from 50° C. to 80° C. Its stretching relative humidity is preferably from 50 to 100%, more preferably from 70 to 100% and still more preferably from 80 to 100%. Its longitudinal travel speed is preferably 1 m/min. or higher and more preferably 3 m/min or higher. The stretched film is preferably dried for 0.5 to 10 minutes at a temperature of from 50° C. to 100° C. and more preferably from 60° C. to 90° C. Its drying time is more preferably from one to five minutes. The resulting polarizing film preferably has an absorption axis of from 10° to 80°, more preferably from 30° to 60° and still more preferably substantially 45° (40° to 50°).

Inclined stretching at an angle of 10 to 80 degrees is more preferable. The following is a description of the stretching methods:

(1-3) Lamination

A transparent thermoplastic film as saponified above and a polarizing film formed by stretching are bonded together, whereby they are bonded together so that the casting direction of the cellulose acylate film and the stretching direction of the polarizing film preferably have an angle of 45° to each other. Any adhesive can be used for bonding them together, and a PVA resin (including a modified PVA, such as an acetoacetyl group, sulfonate group, carboxyl group or oxyalkylene group) and an aqueous solution of a boron compound are, for example, available, though a PVA resin is preferred. An adhesive layer preferably has a dry thickness of from 0.01 to 10 μm and more preferably from 0.05 to 5 μm.

Such polarizing plate preferably has a high light transmittance and a high polarization degree. It preferably has a transmittance of 30 to 50%, more preferably 35 to 50% and still more preferably 40 to 50% to light having a wavelength of 550 nm. Its polarization degree is preferably from 90 to 100%, more preferably from 95 to 100% and still more preferably from 99 to 100% to light having a wavelength of 550 nm. The polarizing plate may be stacked with a λ/4 plate to form a circular polarization of light. They are so stacked together that the slow axis of the λ/4 and the absorption axis of the polarizing plate may have an angle of 45° therebetween. While the λ/4 is not specifically limited, it preferably has such a wavelength dependence that low retardation may depend on a low wavelength. Moreover, it is preferable to use a polarizing film having an absorption axis inclined at an angle of 20° to 70° to its length and a λ/4 plate composed of an optically anisotropic layer formed from a liquid crystal compound.

(2) Impartation of Optical Compensation Layer (Preparation of Optical Compensation Sheet)

The optically anisotropic layer is for compensating a liquid crystal compound in a liquid crystal cell of a liquid crystal display device displaying a black color, and an optical compensation layer is formed by forming an alignment layer on the cellulose acylate film of the present invention and further imparting an optically anisotropic layer.

(2-1) Alignment Layer

An alignment layer is formed on the aforementioned cellulose acylate film subjected to the surface treatment. This film has a function of determining the orientation direction of liquid crystal molecules. However, if a liquid crystal compound is oriented, and then the oriented state is fixed, the function of the alignment layer is already attained, and it is not necessarily essential as a constituent of the present invention. That is, only the optically anisotropic layer on the alignment layer in which oriented state is fixed can be transferred on a polarizer to produce the polarizing plate of the present invention.

The alignment layer can be provided by rubbing an organic compound (preferably a polymer), oblique vapor deposition of an inorganic compound, formation of a layer having micro grooves, accumulation of an organic compound (for example, ω-tricosanoic acid, dioctadecylmethylammonium chloride, methyl stearate) by the Langmuir-Blodgett method (LB film). Furthermore, alignment layers in which an orienting function is imparted by applying an electrical field, applying a magnetic field or light irradiation are also known.

The alignment layer is preferably formed by subjecting a polymer to a rubbing treatment. In principle, the polymer used for the alignment layer should have has a molecular structure having a function of orienting liquid crystal molecules.

In the present invention, in addition to the impartation of the function of orienting liquid crystal molecules, it is preferable to introduce a side chain having a crosslinkable functional group (for example, double bond) into the main chain of the polymer, or a crosslinkable functional group having a function of orienting liquid crystal molecules into a side chain of the polymer.

As the polymer used for the alignment layer, any of a polymer that can be crosslinked by itself, a polymer that can be crosslinked with a crosslinking agent, and a combination of two or more kinds of such polymers can be used. Examples of the polymers include methacrylate copolymers, styrene copolymers, polyolefins, polyvinyl alcohols and modified polyvinyl alcohols, poly(N-methylolacrylamides), polyesters, polyimides, vinyl acetate copolymers, carboxymethylcelluloses, polycarbonates described in JP-A No. H8-338913, paragraph [0022] and so forth. Silane coupling agents can also be used as the polymer. Among these polymers, water-soluble polymers (for example, poly(N-methylolacrylamides), carboxymethylcelluloses, gelatin, polyvinyl alcohols and modified polyvinyl alcohols are preferred, gelatin, polyvinyl alcohols and modified polyvinyl alcohols) are preferred, gelatin, polyvinyl alcohols and modified polyvinyl alcohols are more preferred, and polyvinyl alcohols and modified polyvinyl alcohols are most preferred. It is particularly preferable to use two kinds of polyvinyl alcohols or modified polyvinyl alcohols having different polymerization degrees in combination. The polyvinyl alcohols preferably have a saponification degree of 70 to 100%, more preferably 80 to 100%. The polymerization degree of the polyvinyl alcohols is preferably 100 to 5,000.

The side chain having a function of orienting liquid crystal molecules generally has a hydrophobic group as a functional group. The specific type of the functional group is decided depending on the type of the liquid crystal molecules and a required oriented state.

For example, modification groups of the modified polyvinyl alcohol can be introduced by copolymerization modification, chain transfer modification or block polymerization modification. Examples of the modification group include a hydrophilic group (for example, carboxylic acid group, sulfonic acid group, phosphonic acid group, amino group, ammonium group, amido group, thiol group etc.), a hydrocarbon group having 10 to 100 carbon atoms, a fluorine-substituted hydrocarbon group, a thioether group, a polymerizable group (unsaturated polymerizable group, epoxy group, aziridinyl group etc.), an alkoxysilyl group (trialkoxysilyl group, dialkoxysilyl group, monoalkoxysilyl group) and so forth. Specific examples of the modified polyvinyl alcohols include those described in JP-A No. 2000-155216, paragraphs [0022] to [0145], JP-A No. 2002-62426, paragraphs [0018] to [0022] and so forth.

If a side chain having a crosslinkable functional group is bonded to the main chain of the alignment layer polymer or a crosslinkable functional group is introduced into a side chain of the polymer having a function of orienting liquid crystal molecules, the alignment layer polymer can be copolymerized with a polyfunctional monomer contained in the optically anisotropic layer. As a result, strong bonding based on covalent bonds is attained not only between the polyfunctional monomers, but also between the alignment layer polymers and between the polyfunctional monomer and the alignment layer polymer. Therefore, the introduction of the crosslinkable functional groups into the alignment layer polymer can markedly improve the strength of the optical compensation sheet.

The crosslinkable functional groups of the alignment layer polymer preferably contain a polymerizable group like the polyfunctional monomer. Specific examples thereof are described in JP-A No. 2000-155216, paragraphs [0080] to [0100]. The alignment layer polymer can be crosslinked with a crosslinking agent, separately from the aforementioned crosslinkable functional group.

Examples of the crosslinking agent include aldehydes, N-methylol compounds, dioxane derivatives, compounds that act when the carboxylic group is activated, active vinyl compounds, active halogen compounds, isooxazoles and dialdehyde starch. Two or more kinds of crosslinking agents may be used in combination. Specific examples include the compounds described in JP-A No. 2002-62426, paragraphs [0023] to [0024]. Highly reactive aldehydes are preferred, and glutaraldehyde is particularly preferred.

The amount of the crosslinking agent is preferably 0.1 to 20 weight %, more preferably 0.5 to 15 weight %, based on the weight of the polymer. The amount of non-reacted crosslinking agent remaining in the alignment layer is preferably 1.0 weight % or less, more preferably 0.5 weight % or less. By adjusting the amount of remaining non-reacted crosslinking agent, sufficient durability of the alignment layer not generating any reticulation can be obtained even if the alignment layer is used in a liquid crystal display device for a long period of time or is left in a high temperature and high humidity atmosphere for a long period of time.

The alignment layer can be basically formed by coating a solution containing the aforementioned polymer as the alignment layer forming material and the crosslinking agent on a transparent support, drying (crosslinking) the coated layer by heating and rubbing the coated surface. The crosslinking reaction may be carried out in an arbitrary stage after applying the solution on the transparent support as described above. When a water-soluble polymer such as polyvinyl alcohol is used as the alignment layer forming material, a mixed solvent of an organic solvent having a defoaming action (for example, methanol) and water is preferably employed as the solvent of the application solution. The suitable ratio of water and the organic solvent is preferably 0:100 to 99:1, more preferably 0:100 to 91:9, in terms of weight ratio. By the use of such a mixed solvent, the generation of foams can be suppressed to markedly decrease defects in the alignment layer, especially the surface of the optically anisotropic layer.

As the application method for the alignment layer, the spin coating method, dip coating method, curtain coating method, extrusion coating method, rod coating method and roller coating method are preferred, and the rod coating method is particularly preferred. The thickness of the alignment layer after drying is preferably 0.1 to 10 µm. The drying by heating can be performed at a temperature of 20 to 110° C. In order to form sufficient crosslinkings, the drying temperature is preferably 60 to 100° C., particularly preferably 80 to 100° C. The drying time is generally 1 minute to 36 hours, preferably 1 to 30 minutes. Further, it is also preferable to adjust pH to an optimum value for the crosslinking agent used. When glutaraldehyde is used as the crosslinking agent, pH is preferably 4.5 to 5.5, particularly preferably 5.

The alignment layer is provided on the transparent supporter the base coat layer. The alignment layer can be obtained by crosslinking the polymer layer as described above and then rubbing the surface of the layer.

As the aforementioned rubbing treatment, the treatment methods widely used for a step of orientating liquid crystals of LCD can be adopted. That is, a method of rubbing a surface of an alignment layer along a certain direction with paper, gauze, felt, rubber, nylon, polyester fibers or the like to obtain orientation can be employed. In general, the rubbing treatment is performed by rubbing the surface several times with cloth to which fibers having the same length and the same diameter are evenly transplanted.

When the rubbing treatment is carries out in an industrial scale, it can be performed by contacting a rotating rubbing roller with a transported film provided with a polarizing film. All of the roundness, cylindricality and deflection (eccentricity) of the roller are preferably 30 µm or less. The wrapping angle of the film with respect to the rubbing roll is preferably 0.1 to 90°. However, as disclosed in JP-A No. H8-160430, a stable rubbing treatment may be performed by winding a film around the roller for 360° or more. The transportation speed of the film is preferably 1 to 100 m/minute. An appropriate rubbing angle is preferably selected from the range of 0 to 60°. When the film is used in a liquid crystal display device, the rubbing angle is preferably 40 to 50°, particularly preferably 45°.

The alignment layer prepared as described above preferably has a thickness of 0.1 to 10 µm.

Then, liquid crystal molecules of the optically anisotropic layer are oriented on the alignment layer. Thereafter, the alignment layer polymer is reacted with the polyfunctional monomers contained in the optically anisotropic layer, or a crosslinking agent is used to crosslink the alignment layer polymer, as required.

The liquid crystal molecules used for the optically anisotropic layer may be rod-like liquid crystal molecules or disk-like liquid crystal molecules. The rod-like liquid crystal molecule and the disk-like liquid crystal molecule each may be high molecular weight liquid crystal or low molecular weight liquid crystal. Furthermore, crosslinked low molecular weight liquid no longer exhibiting liquid crystallinity may also be used.

(2-2) Rod-Like Liquid Crystal Molecule

As the rod-like liquid crystal molecules, azomethines, azoxy compounds, cyanobiphenyls, cyanophenyl esters, benzoic acid esters, cyclohexanecarboxylic acid phenyl esters, cyanophenylcyclohexane compounds, cyano-substituted phenylpyrimidines, alkoxy-substituted phenylpyrimidines, phenyldioxanes, tolans and alkenylcyclohexylbenzonitriles are preferably used.

The rod-like liquid crystal molecules include metal complexes. Liquid crystal polymers containing rod-like liquid crystal molecules in repeating units can also be used as the rod-like liquid crystal molecule. In other words, the rod-like liquid crystal molecule may be bonded to a (liquid crystal) polymer.

The rod-like liquid crystal molecules are described in Kikan Kagaku Sosetsu (Quarterly Chemical Review), vol. 22, "Chemistry of Liquid Crystal", edited by the Chemical Society of Japan (1994), Chapters 4, 7, and 11, and "Liquid Crystal Device Handbook", edited by Japan Society for the Promotion of Science, 142nd Committee, Chapter 3.

The rod-like liquid crystal molecule preferably has a birefringence in the range of 0.001 to 0.7.

The rod-like liquid crystal molecule preferably has a polymerizable group in order to fix the oriented state thereof. The polymerizable group is preferably a radically polymerizable unsaturated group or a cationic polymerizable group. Specific examples include the polymerizable groups and polymerizable liquid crystal compounds described in JP-A No. 2002-62427, paragraphs [0064] to [0086].

(2-3) Disk-Like Liquid Crystal Molecule

Examples of the disk-like (discotic) liquid crystal molecule include benzene derivatives disclosed in the research report of C. Destrade et al., Mol. Cryst., vol. 71, p. 111 (1981); truxene derivatives disclosed in the research report of C. Destrade et al., Mol. Cryst., vol. 122, p. 141 (1985) and Phyics. Lett., A, vol. 78, p. 82 (1990); cyclohexane derivatives disclosed in the research report of B. Kohne et al., Angew. Chem. Soc., vol. 96, p. 70 (1984); and azacrown and phenylacetylene macrocycles disclosed in the research report of J. M. Lehn et al., J. Chem. Commun. p. 1794 (1985), and the research report of J. Zhang et al., J. Am. Chem. Soc. vol. 116, p. 2655 (1994).

The disk-like liquid crystal molecules include those having a structure in which linear alkyl groups, alkoxy groups or substituted benzoyloxy group radially substitute on a base nucleus locating at the center of the molecule and showing liquid crystallinity. Compounds of which molecule or cluster of molecules shows rotational symmetry and can be given a certain orientation are preferred. As for the optically anisotropic layer formed with disk-like liquid crystal molecules, the compound finally contained in the optically anisotropic layer does not need to be consisted of disk-like liquid crystal molecules, and for example, compounds obtained by polymerization or crosslinking of low molecular weight disk-like liquid crystal molecules having a thermo- or photo-reactive group with heat or light to form a polymer and thus no longer exhibiting liquid crystallinity are also included. Preferred examples of the disk-like liquid crystal molecule are described in Japanese Patent Laid-open Publication No. 8-50206. Polymerization of disk-like liquid crystal molecules is disclosed in JP-A No. H8-27284.

In order to fix the disk-like liquid crystal molecules by polymerization, it is necessary to bond a polymerizable group as a substituent to the disk-like core of the disk-like liquid crystal molecule. A compound in which the disk-like core and the polymerizable group are bonded through a bridging group is preferred. By such a structure, the orientation state of the compound can be kept in the polymerization reaction. Examples of such a compound include the compounds described in JP-A No. 2000-155216, paragraphs [0151] to [0168].

In the hybrid orientation, the angle formed by the long axis (disc plane) of disk-like liquid crystal molecule and plane of polarizing plate increases or decreases with increase of distance from the plane of polarizing plate along the depth direction of the optically anisotropic layer. The angle preferably decreases with increase of the distance. Further, variation of the angle may be continuous increase, continuous decrease, intermittent increase, intermittent decrease, variation including continuous increase and decrease or intermittent variation including increase or decrease. The intermittent variation includes a region during which the tilt angle does not change in the middle of the thickness along the thickness direction of the layer. Even if such a region in which the angle does not change is included, it is sufficient that the angle should increase or decrease as a whole. It is more preferred that the angle should continuously change.

The average direction of the long axis of the disk-like liquid crystal molecule on the polarizing plate side can be generally controlled by selecting the disk-like liquid crystal molecule or the material of the alignment layer, or by selecting the method for the rubbing treatment. The direction of the long axis (disc plane) of disk-like liquid crystal molecule on the surface side (air side) can be generally controlled by selecting type of the disk-like liquid crystal molecule or type of additive used together with the disk-like liquid crystal molecule. Examples of the additive used together with the disk-like liquid crystal molecule include plasticizer, surfactant, polymerizable monomer and polymer and so forth. Further, degree of the variation of the orientation angle can also be controlled by selection of the liquid crystal molecule and additive like the aforementioned control.

(2-4) Other Components of Optically Anisotropic Layer

By using a plasticizer, surfactant, polymerizable monomer and so forth together with the aforementioned liquid crystal molecules, uniformity of the coated film, strength of the film, orientation state of the liquid crystal molecules and so forth can be improved. Those components are preferably substances that are compatible with the liquid crystal molecules and can change the tilt angle of the liquid crystal molecules or do not inhibit the orientation.

Examples of the polymerizable monomer include radically polymerizable compounds and cationic polymerizable compounds. The polymerizable monomer is preferably a polyfunctional radically polymerizable monomer, and such a monomer copolymerizable with the aforementioned liquid crystal compound having the polymerizable group is preferred. Examples include those described in JP-A No. 2002-296423, paragraphs [0018] to [0020]. The amount of the compound is generally 1 to 50%, preferably 5 to 30 weight %, of the disk-like liquid crystal molecules.

Although the surfactant may be a conventionally known compound, a fluorine-containing compound is particularly preferred. Specific examples thereof include the compounds described in JP-A No. 2001-330725, paragraphs [0028] to [0056].

It is preferred that the polymer used together with the disk-like liquid crystal molecules can change the tilt angle of the disk-like liquid crystal molecules.

Examples of the polymer include cellulose esters. Preferred examples of the cellulose esters include those described in JP-A No. 2000-155216, paragraph [0178]. In order not to inhibit the orientation of the liquid crystal molecules, the amount of the polymer is preferably in the range of 0.1 to 10%, more preferably in the range of 0.1 to 8 weight %, with respect to the liquid crystal molecules.

The discotic nematic liquid crystal phase/solid phase transition temperature of the disk-like liquid crystal molecule is preferably 70 to 300° C., more preferably 70 to 170° C.

(2-5) Formation of Optically Anisotropic Layer

The optically anisotropic layer can be formed by applying an application solution containing liquid crystal molecules as well as a polymerization initiator described later and arbitrary components as required on the alignment layer.

As the solvent used in the preparation of the application solution, an organic solvent is preferably used. Examples of the organic solvent include amides (for example, N,N-dimethylformamide), sulfoxides (for example, dimethyl sulfoxide), heterocyclic compounds (for example, pyridine), hydrocarbons (for example, benzene, hexane), alkyl halides (for example, chloroform, dichloromethane, tetrachloroethane), esters (for example, methyl acetate, butyl acetate), ketones (for example, acetone, methyl ethyl ketone) and ethers (for example, tetrahydrofuran, 1,2-dimethoxyethane). Alkyl halides and ketones are preferred. It is also possible to use two or more kinds of organic solvents together.

The application solution can be applied by a known method (for example, wire bar coating method, extrusion coating method, direct gravure coating method, reverse gravure coating method, die coating method).

The thickness of the optically anisotropic layer is preferably 0.1 to 20 µm, more preferably 0.5 to 15 µm, most preferably 1 to 10 µm.

(2-6) Fixation of Oriented State of Liquid Crystal Molecules

The oriented liquid crystal molecules can be fixed with maintaining the oriented state. The fixation is preferably carried out by a polymerization reaction. The polymerization reaction includes a thermal polymerization reaction using a thermal polymerization initiator and a photopolymerization reaction using a photopolymerization initiator. The photopolymerization reaction is preferred.

Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted acyloin compounds (described in U.S. Pat. No. 2,722,512), polynuclear quinone compounds (described in U.S. Pat. Nos. 3,046,127 and 2,951,758), combinations of triarylimidazole dimer with p-aminophenyl ketone (described in U.S. Pat. No. 3,549,367), acridine and phenazine compounds (described in JP-A No. S60-105667 and U.S. Pat. No. 4,239,850) and oxadiazol compounds (described in U.S. Pat. No. 4,212,970).

The photopolymerization initiator is preferably used in an amount of 0.01 to 20 weight %, more preferably 0.5 to 5 weight %, based on the solid matter in the application solution.

Light irradiation for polymerizing the liquid crystal molecules is preferably performed by using an ultraviolet ray.

The irradiation energy is preferably in the range of 20 mJ/cm$^2$ to 50 J/cm$^2$, more preferably 20 to 5,000 mJ/cm$^2$, still more preferably 100 to 800 mJ/cm$^2$. For promoting the photopolymerization reaction, the light irradiation may be carried out with heating. Further, a protective layer may be provided on the optically anisotropic layer as required.

It is also preferable to combine this optical compensation film with a polarizing film. Specifically, such an application solution for forming the optically anisotropic layer as described above is applied on a surface of a polarizing plate to form an optically anisotropic layer. As a result, produced is a thin polarizing plate giving only a small stress (strain×sectional area×elasticity modulus) generated in connection with dimensional change of the polarizing film without using any polymer film between the polarizing plate and the optically anisotropic layer. By disposing a polarizing plate according to the present invention in a large-sized liquid crystal display device, images of high display quality can be displayed without causing problems such as light leakage.

The tilt angle between the polarizing film and the optical compensation layer is preferably adjusted by stretching the layers so that the angle should match the angle between the transmission axis of two polarizing plates adhered onto both surfaces of a liquid crystal cell constituting a LCD and the longitudinal or transverse direction of the liquid crystal cell. The tilt angle is generally 45°. However, transmission, reflection and semi-transmission type LCDs in which the angle is not necessarily 45° have recently been developed, and therefore it is preferred that the stretching direction can be arbitrarily adjusted depending on the design of LCD.

(2-7) Liquid Crystal Display Device

Each of liquid crystal modes in which such an optical compensation film is used will be explained hereinafter.

(TN Mode Liquid Crystal Display Device)

Liquid crystal cells of TN mode are most widely used in color TFT liquid crystal displays and described in many references. In a liquid crystal cell of the TN mode displaying a black color, orientation state of the liquid crystal is that rod-like liquid crystal molecules in the central portion of the cell stand up, and the molecules lie down in portions near the substrate of the cell.

(OCB Mode Liquid Crystal Display Device)

A liquid crystal cell of OCB mode is a liquid crystal cell of bend orientation mode in which rod-like liquid crystal molecules in the upper part and lower part of the liquid crystal cell are essentially inversely (symmetrically) oriented. Liquid crystal display devices utilizing liquid crystal cells of the bend orientation mode are disclosed in U.S. Pat. Nos. 4,583,825 and 5,410,422. Because the rod-like liquid crystal molecules in the upper part and lower part of the liquid crystal cell are symmetrically oriented, a liquid crystal cell of bend orientation mode has an optically self-compensating function. Therefore, this mode of liquid crystal is referred to as OCB (optically compensatory bend) mode of liquid crystal.

In a liquid crystal cell of the OCB mode, like that of the TN mode, the orientation state of liquid crystal in the cell displaying a black color is that rod-like liquid crystal molecules in the central portion of the cell stand up, and the molecules lie down in portions near substrate of the cell.

(VA Mode Liquid Crystal Display Device)

A liquid crystal cell of the VA mode is characterized by substantially longitudinally aligning rod-like liquid crystal molecules when voltage is not applied, and liquid crystal cells of the VA mode include, in addition to (1) a liquid crystal cell of VA mode in a narrow sense in which rod-like liquid crystal molecules are substantially longitudinally aligned when voltage is not applied, and the molecules are essentially horizontally aligned while voltage is applied (described in JP-A No. H2-176625), (2) a liquid crystal cell of MVA mode in which the VA mode is modified to be multi-domain type in order to enlarge the viewing angle (described in SID97, Digest of tech. Papers, 28 (1997), 845), (3) a liquid crystal cell of n-ASM mode in which rod-like liquid crystal molecules are substantially longitudinally aligned while voltage is not applied, and the molecules are essentially oriented in twisted multi-domain alignment while voltage is applied (described in the proceedings of Nippon Ekisho Toronkai (Liquid Crystal Forum of Japan), 58-59 (1998)), and (4) a liquid crystal cell of SURVIVAL mode (published in LCD International '98).

(IPS Mode Liquid Crystal Display Device)

IPS-mode liquid crystal display devices are characterized in that the rod-like liquid crystal molecules are oriented substantially horizontally within the plane while voltage is not applied, thereby undergoing change in orientation direction according to the application or non-application of voltage to achieve switching. Specific examples to be used are described in JP-A Nos. 2004-365941, 2004-12731, 2004-215620, 2002-221726, 2002-55341 and 2003-195333.

(Other Liquid Crystal Display Device)

Liquid crystal display devices of the ECB and STN modes can be optically compensated on the basis of the same approach as described above.

Impartation of Antireflection Layer (Antireflection Film)

An antireflection film is generally formed by providing a low refractive index layer, which also serves as an antifouling layer, and at least one layer having a refractive index higher than that of the low refractive index layer (i.e., a high refractive index layer and/or medium refractive index layer) on a transparent thermoplastic resin film.

Examples of the method for forming a multi-layered film comprising laminated transparent thin films of inorganic compounds (metal oxides etc.) having different refractive indexes include the chemical vapor deposition (CVD) method, physical vapor deposition (PVD) method and a method of forming a coated film of colloidal metal oxide particles by a sol-gel method from a metal compound such as metal alkoxides and subjecting the film to a post-treatment (such as ultraviolet radiation described in JP-A No. H9-157855, or plasma treatment described in JP-A No. 2002-327310) to form a thin film.

Further, as antireflection films showing high productivity, various antireflection films prepared by laminating thin films of inorganic particles dispersed in a matrix by coating have been proposed.

Examples of the antireflection film also include antireflection films comprising an antireflection layer prepared by forming fine unevenness on the uppermost surface of such an antireflection film formed by application as described above to impart antiglare property to the surface.

Although any of the aforementioned methods can be used for the cellulose acylate film of the present invention, the application method (applied type) is particularly preferred.

(3-1) Layer Constitution of a Coating Type Antireflection Layer

An antireflective layer at least having a medium refractive index layer, a higher refractive index layer and a lower refractive index layer (the outermost layer) laminated on a protective film in this order is designed so as to give a refractive index fulfilling the following relationship: refractive index of higher refractive index layer>refractive index of medium refractive index layer >refractive index of protective film>refractive index of lower refractive index layer.

Further, a hard coat layer may be provided between the protective film and the medium refractive index layer. It is also possible to employ the constitution of medium refractive index hard coat layer, higher refractive index layer and lower refractive index layer. Use may be made of antireflective layers described in, for example, JP-A Nos. H8-122504, H8-110401, H10-300902, 2002-243906 and 2000-111706.

Each layer may further have additional function (s). Examples thereof include a stainproof lower refractive index layer and an antistatic higher refractive index layer (see, for example, JP-A Nos. H10-206603 and 2002-243906).

The haze of the antireflective layer is preferably 5% or less, still preferably 3% or less. The strength of the film is preferably H or above, still preferably 2H or above and most desirably 3H or above, when determined by the pencil hardness test in accordance with JIS K5400.

(3-2) Higher Refractive Index Layer and Medium Refractive Index Layer

In the antireflective layer, the layer having a higher refractive index is made of a hardening film containing at least fine particles of an inorganic compound with a higher refractive index having an average particle size of 100 nm or less and a matrix binder.

As the fine particles of an inorganic compound with a higher refractive index, use can be preferably made of an inorganic compound having a refractive index of 1.65 or above, still preferably 1.9 or above. Examples thereof include oxides of Ti, Zn, Sb, Sn, Zr, Ce, Ta, La and In and complex oxides containing these metal atoms.

These fine particles having 100 nm or less of the average particle size can be obtained by, for example, treating the particle surface with a surfactant (for example, a silane coupling agent: JP-A Nos. H11-295503, H11-153703 and 2000-9908, an anionic compound or an organic metal coupling agent: JP-A No. 2001-310432), employing a core-shell structure with the use of higher refractive index particles as the core (JP-A No. 2001-166104), or using together a specific dispersant (for example, JP-A No. H11-153703, U.S. Pat. No. 6,210,858 B1 and JP-A No. 2002-2776069).

As examples of the material forming the matrix, publicly known thermoplastic resins and hardening resin films may be cited.

It is also preferable to employ at least one composition selected from among a composition containing a polyfunctional compound having at least two radical polymerizable and/or cationic polymerizable groups and a composition comprising an organic metal compound having a hydrolysable group and a partial condensation product thereof. Examples thereof include compositions reported in JP-A Nos. 2000-47004, 2001-315242, 2001-31871 and 2001-296401.

Also, use may be preferably made of a hardening film obtained from a composition comprising a colloidal metal oxide obtained from a hydrolysis condensation product of a metal alkoxide and a metal alkoxide. Such a film is described in, for example, JP-A No. 2001-293818.

The refractive index of the higher refractive index layer preferably ranges 1.70 to 2.20. The thickness of the higher refractive index layer preferably ranges 5 nm to 10 μm, still preferably 10 nm to 1 μm.

The refractive index of the medium refractive index layer is controlled to an intermediate level between the refractive index of the lower refractive index layer and the refractive index of the higher refractive index layer. The refractive index of the medium refractive index layer preferably ranges 1.50 to 1.70.

(3-3) Lower Refractive Index Layer

The lower refractive index layer is successively laminated on the higher refractive index layer. The refractive index of the lower refractive index layer preferably ranges 1.20 to 1.55, still preferably 1.30 to 1.50.

It is preferable to form the lower refractive index layer as the outermost layer having scuff proofness and stain proofness. As means of largely improving the scuff proofness, it is effective to impart slipperiness to the surface, which can be established by applying a publicly known thin film layer technique such as introduction of silicone or fluorine.

The refractive index of the fluorine-containing compound preferably ranges 1.35 to 1.50, still preferably 1.36 to 1.47. As a fluorine-containing compound, a compound containing crosslinkable or polymerizable functional group containing 35 to 80% by weight of fluorine atom is preferred.

Examples thereof include compounds cited in paragraphs [0018] to [0026] in JP-A No. H9-222503, paragraphs [0019] to [0030] in JP-A No. H11-38202, paragraphs [0027] to [0028] in JP-A Nos. 2001-40284, and 2000-284102.

A silicone compound is a compound having a polysiloxane structure and a compound having a hardening functional group or a polymerizable functional group in its polymer chain and gives a crosslinked structure in the film is preferable. Examples thereof include a reactive silicone (for example, SILAPLANE manufactured by CHISSO CORPORATION), polysiloxane having silanol groups at both ends (for example, JP-A No. H11-258403).

To perform the crosslinking or polymerization reaction of the fluorine and/or siloxane polymer having a crosslinking or polymerizable group, it is preferable to irradiate or heat a coating composition for forming the outermost layer, which contains a polymerization initiator or a sensitizer, simultaneously with the application or after the application, thereby forming the lower refractive index layer.

It is also preferable to employ a sol gel hardening film which hardens via a condensation reaction between an organic metal compound such as a silane coupling agent and a silane coupling agent having a specific fluorinated hydrocarbon group in the coexistence of a catalyst. Examples thereof include polyfluoroalkyl group-containing silane compounds or partly hydrolyzed condensation products thereof (compounds described in, for example, JP-A Nos. S58-142958, S58-147483, S58-147484, H9-157582 and H11-106704), silyl compounds having poly "perfluoroalkyl ether" group (i.e., a fluorine-containing long chain) (compounds described in, for example, JP-A Nos. 2000-117902, 2001-48590 and 2002-53804).

In addition to the components as described above, the lower refractive index layer may contain additives such as a filler (for example, particles of inorganic compounds having a low refractive index and an average primary particle size of 1 to 150 nm such as silicon dioxide (silica) and fluorine-containing particles (magnesium fluoride, calcium fluoride and barium fluoride) and fine organic particles described in paragraphs [0020] to [0038] in JP-A No. H11-3820)), a silane coupling agent, a slip agent and a surfactant.

In the case where the lower refractive index layer is provided below the outermost layer, the lower refractive index layer may be formed by a gas phase method (for example, the vacuum deposition method, the sputtering method, the ion plating method or the plasma CVD method). It is preferable to employ the coating method by which the lower refractive index layer can be formed at low cost.

The film thickness of the lower refractive index layer preferably ranges 30 to 200 nm, still preferably 50 to 150 nm and most desirably 60 to 120 nm.

(3-4) Hard Coat Layer

In order to elevate the physical strength of the protective film having the antireflective layer, it is preferable to form a hard coat layer on the surface of the protective film. It is particularly preferable to provide the hard coat layer between the transparent supporter and the higher refractive index layer as described above. The hard coat layer is formed preferably by a crosslinking reaction or a polymerization reaction of a hardening compound by means of light and/or heat. As a hardening functional group in the hardening compound, a photo polymerizable functional group is preferred. It is also preferable to use an organic metal compound or an organic alkoxysilyl compound having a hydrolysable functional group. Specific examples of these compounds include those cited above with respect to the higher refractive index layer. Specific examples of a composition constituting the hard coat layer include those described in JP-A Nos. 2002-144913 and 2000-9908, and WO00/46617.

The hard coat layer may also serve as the higher refractive index layer. In this case, it is preferable to form the hard coat layer by finely dispersing fine particles by using a technique as described with respect to the higher refractive index layer.

The hard coat layer may contain particles having an average particle size of form 0.2 to 10 μm and also serve as an antiglare layer having an antiglare function.

The film thickness of the hard coat layer can be appropriately designed depending on the purpose. The film thickness of the hard coat layer preferably ranges 0.2 to 10 μm and still preferably 0.5 to 7 μm.

The strength of the hard coat layer is preferably H or above, still preferably 2H or above and most desirably 3H or above, when determined by the pencil hardness test in accordance with JIS K5400. In the Taber abrasion test in accordance with JIS K5400, a less Taber volume loss in a test sample after the test, compared with the volume before the test, is the preferable.

(3-5) Forward Scattering Layer

When the cellulose acylate film of the present invention is used in a liquid crystal display device, a forward scattering layer is provided in order to impart a viewing angle improving effect for the case of tilting the viewing angle up and down or right and left. The hard coat layer can be made to also serve as this layer by dispersing microparticles having different refractive indexes in the hard coat layer.

Examples include the one described in JP-A No. H11-38208, in which the forward scattering coefficient of the forward scattering layer is particularly defined, the one described in JP-A No. 2000-199809, in which the relative refractive index of transparent resin and microparticles is defined to be within a particular range, the one described in JP-A No. 2002-107512, in which the haze value of the forward scattering layer is defined to be 40% or more, and so forth.

(3-6) Other Layers

Besides the aforementioned layers, a primer layer, antistatic layer, undercoat layer, protective layer etc. may also be provided.

(3-7) Coating Method

The layers constituting the antireflection film can be formed by application using any of dip coating, air knife coating, curtain coating, roller coating, wire bar coating, gravure coating, microgravure coating, and extrusion coating (U.S. Pat. No. 2,681,294) methods.

(3-8) Antiglare Function

The antireflection film may have an antiglare function for scattering light from the outside. The antiglare function can be obtained by making unevenness on the surface of the antireflection film. When the antireflection film has the antiglare function, the antireflection film preferably has a haze of 3 to 30%, more preferably 5 to 20%, most preferably 7 to 20%.

As the method for forming unevenness on the surface of the antireflection film, any method capable of sufficiently maintaining such surface shape can be used. Examples of the method include a method of using microparticles in the low refractive index layer to form unevenness on the surface of the film (for example, JP-A No. 2000-271878), a method of adding a small amount (0.1 to 50 weight %) of relatively large particles (particle size: 0.05 to 2 μm) to the layer under the low refractive index layer (high refractive index layer, medium refractive index layer or hard coat layer) to form a film having an uneven surface and then forming the low refractive index layer thereon while keeping the uneven shape (for example, JP-A Nos. 2000-281410, 2000-95893, 2001-100004 and 2001-281407), a method of physically transferring uneven shape onto a surface of a coated uppermost layer (antifouling layer) (for example, those described in JP-A Nos. S63-278839, S11-183710 and 2000-275401 as methods using embossing) and so forth.

In addition, technique disclosed in the following publication can be used with the present invention without departing the scope of the gist of the present invention: JP-U No. H3-110418, JP-A No. H5-119216, JP-A No. H5-162261, JP-A No. H5-182518, JP-A No. H5-19115, JP-A No. H5-196819, JP-A No. H5-264811, JP-A No. H5-281411, JP-A No. H5-281417, JP-A No. H5-281537, JP-A No. H5-288921, JP-A No. H5-288923, JP-A No. H5-311119, JP-A No. H5-339395, JP-A No. H5-40204, JP-A No. H5-45512, JP-A No. H6-109922, JP-A No. H6-123805, JP-A No. H6-160626, JP-A No. H6-214107, JP-A No. H6-214108, JP-A No. H6-214109, JP-A No. H6-222209, JP-A No. H6-222353, JP-A No. H6-234175, JP-A No. H6-235810, JP-A No. H6-258520, JP-A No. H6-264030, JP-A No. H6-305270, JP-A No. H6-331826, JP-A No. H6-347641, JP-A No. H6-75110, JP-A No. H6-75111, JP-A No. H6-82779, JP-A No. H6-93133, JP-A No. H7-104126, JP-A No. H7-134212, JP-A No. H7-181322, JP-A No. H7-188383, JP-A No. H7-230086, JP-A No. H7-290652, JP-A No. H7-294903, JP-A No. H7-294904, JP-A No. H7-294905, JP-A No. H7-325219, JP-A No. H7-56014, JP-A No. H7-56017, JP-A No. H7-92321, JP-A No. H8-122525, JP-A No. H8-146220, JP-A No. H8-171016, JP-A No. H8-188661, JP-A No. H8-21999, JP-A No. H8-240712, JP-A No. H8-25575, JP-A No. H8-286179, JP-A No. H8-292322, JP-A No. H8-297211, JP-A No. H8-304624, JP-A No. H8-313881, JP-A No. H8-43812, JP-A No. H8-62419, JP-A No. H8-62422, JP-A No. H8-76112, JP-A No. H8-94834, JP-A No. H9-137143, JP-A No. H9-197127, JP-A No. H9-251110, JP-A No. H9-258023, JP-A No. H9-269413, JP-A No. H9-269414, JP-A No. H9-281483, JP-A No. H9-288212, JP-A No. H9-288213, JP-A No. H9-292525, JP-A No. H9-292526, JP-A No. H9-294959, JP-A No. H9-318817, JP-A No. H9-80233, JP-A No. H10-10320, JP-A No. H10-104428, JP-A No. H10-111403, JP-A No. H10-111507, JP-A No. H10-123302, JP-A No. H10-123322, JP-A No. H10-123323, JP-A No. H10-176118, JP-A No. H10-186133, JP-A No. H10-264322, JP-A No. H10-268133, JP-A No. H10-268134, JP-A No. H10-319408, JP-A No. H10-332933, JP-A No. H10-39137, JP-A No. H10-39140, JP-A No. H10-68821, JP-A No. H10-68824, JP-A No. H10-90517, JP-A No. H11-116903, JP-A No. H11-181131, JP-A No. H11-211901, JP-A No. H11-211914, JP-A No. H11-242119, JP-A No. H11-246693, JP-A No. H11-246694, JP-A No. H11-256117, JP-A No. H11-258425, JP-A No. H11-263861, JP-A No. H11-287902, JP-A No. H11-295525, JP-A No. H11-295527, JP-A No. H11-302423, JP-A No. H11-309830, JP-A No. H11-323552, JP-A No. H11-335641, JP-A No. H11-344700, JP-A No. H11-349947, JP-A No. H11-95011, JP-A No. H11-95030, JP-A No. H11-95208, JP-A No. 2000-109780, JP-A No. 2000-110070, JP-A No. 2000-119657, JP-A No. 2000-141556, JP-A No. 2000-147208, JP-A No. 2000-17099, JP-A No. 2000-171603, JP-A No. 2000-171618, JP-A No. 2000-180615, JP-A No. 2000-187102, JP-A No. 2000-187106, JP-A No. 2000-191819, JP-A No. 2000-191821, JP-A No. 2000-193804, JP-A No. 2000-204189, JP-A No. 2000-206306, JP-A No. 2000-214323, JP-A No. 2000-214329, JP-A No. 2000-230159, JP-A No. 2000-235107, JP-A No. 2000-241626, JP-A No. 2000-250038, JP-A No. 2000-267095, JP-A No. 2000-284122, JP-A No. 2000-304927, JP-A No. 2000-304928, JP-A No. 2000-304929, JP-A No. 2000-309195, JP-A No. 2000-309196, JP-A No. 2000-309198, JP-A No. 2000-309642, JP-A No. 2000-310704, JP-A No. 2000-310708, JP-A No. 2000-310709, JP-A No. 2000-310710, JP-A No. 2000-310711, JP-A No. 2000-310712, JP-A No. 2000-310713, JP-A No. 2000-310714, JP-A No. 2000-310715, JP-A No. 2000-310716, JP-A No. 2000-310717, JP-A No. 2000-321560, JP-A No. 2000-321567, JP-A No. 2000-338309, JP-A No. 2000-338329, JP-A No. 2000-344905, JP-A No. 2000-347016, JP-A No. 2000-347017, JP-A No. 2000-347026, JP-A No. 2000-347027, JP-A No. 2000-347029, JP-A No. 2000-347030, JP-A No. 2000-347031, JP-A No. 2000-347032, JP-A No. 2000-347033, JP-A No. 2000-347034, JP-A No. 2000-347035, JP-A No. 2000-347037, JP-A No. 2000-347038, JP-A No. 2000-86989, JP-A No. 2000-98392, JP-A No. 2001-100012, JP-A No. 2001-108805, JP-A No. 2001-108806, JP-A No. 2001-133627, JP-A No. 2001-133628, JP-A No. 2001-142062, JP-A No. 2001-142072, JP-A No. 2001-174630, JP-A No. 2001-174634, JP-A No. 2001-174637, JP-A No. 2001-179902, JP-A No. 2001-183526, JP-A No. 2001-188103, JP-A No. 2001-188124, JP-A No. 2001-188125, JP-A No. 2001-188225, JP-A No. 2001-188231, JP-A No. 2001-194505, JP-A No. 2001-228311, JP-A No. 2001-228333, JP-A No. 2001-242461, JP-A No. 2001-242546, JP-A No. 2001-247834, JP-A No. 2001-26061, JP-A No. 2001-264517, JP-A No. 2001-272535, JP-A No. 2001-278924, JP-A No. 2001-2797, JP-A No. 2001-287308, JP-A No. 2001-305345, JP-A No. 2001-311827, JP-A No. 2001-350005, JP-A No. 2001-356207, JP-A No. 2001-356213, JP-A No. 2001-42122, JP-A No. 2001-42323, JP-A No. 2001-42325, JP-A No. 2001-4819, JP-A No. 2001-4829, JP-A No. 2001-4830, JP-A No. 2001-4831, JP-A No. 2001-4832, JP-A No. 2001-4834, JP-A No. 2001-4835, JP-A No. 2001-4836, JP-A No. 2001-4838, JP-A No. 2001-4839, JP-A No. 2001-51118, JP-A No. 2001-51119, JP-A No. 2001-51120, JP-A No. 2001-51273, JP-A No. 2001-51274, JP-A No. 2001-55573, JP-A No. 2001-66431, JP-A No. 2001-66597, JP-A No. 2001-74920, JP-A No. 2001-81469, JP-A No. 2001-83329, JP-A No. 2001-83515, JP-A No. 2002-162628, JP-A No. 2002-169024, JP-A No. 2002-189421, JP-A No. 2002-201367, JP-A No. 2002-20410, JP-A No. 2002-258046, JP-A No. 2002-275391, JP-A No. 2002-294174, JP-A No. 2002-311214, JP-A No. 2002-311246, JP-A No. 2002-328233, JP-A No. 2002-338703, JP-A No. 2002-363266, JP-A No. 2002-365164, JP-A No. 2002-370303, JP-A No. 2002-40209, JP-A No. 2002-48917, JP-A No. 2002-6109, JP-A No. 2002-71950, JP-A No. 2003-105540, JP-A No. 2003-114331, JP-A No. 2003-131036, JP-A No. 2003-139952, JP-A No. 2003-172819, JP-A No. 2003-35819, JP-A No. 2003-43252, JP-A No. 2003-50318, JP-A No. 2003-96066, JP-A No. 2006-45501, JP-A No. 2006-45502, JP-A No. 2006-45499, JP-A No. 2006-45500, JP-A No. 2006-182008, JP-A No. 2006-241433, JP-A No. 2006-348123, JP-A No. 2005-325258, JP-A No. 2006-2026, JP-A No. 2006-2025, JP-A No. 2006-183005, JP-A No. 2006-183004, JP-A No. 2006-143873, JP-A No. 2006-257204, JP-A No. 2006-205472, JP-A No. 2006-241428, JP-A No. 2006-251746, JP-A No. 2007-1198, JP-A No. 2007-1238, WO2005/103122, JP-A No. 2006-176736, JP-A No. 2006-243688, JP-A No. 2006-327105, JP-A No. 2006-124642, JP-A No. 2006-205708, JP-A No. 2006-341443, JP-A No. 2006-199913, JP-A No. 2006-335050, JP-A No. 2007-8154, JP-A No. 2006-334840, JP-A No. 2006-341450, JP-A No. 2006-327162, JP-A No. 2006-341510, JP-A No. 2006-327161, JP-A No. 2006-327107, JP-A No. 2006-327160, JP-A No. 2006-328316, JP-A No. 2006-334839, JP-A No. 2007-8151, JP-A No. 2007-1286, JP-A No. 2006-

327106, JP-A No. 2006-334841, JP-A No. 2006-334842, JP-A No. 2005-330411, JP-A No. 2006-116945, JP-A No. 2005-301225, JP-A No. 2007-1287, JP-A No. 2006-348268, WO2006/132367, WO2006/132367, JP-A No. 2005-178194, JP-A No. 2006-336004, JP-A No. 2006-249418, JP-A No. 2007-2216, JP-A No. 2006-28345, JP-A No. 2006-215535, JP-A No. 2006-28387, JP-A No. 2007-2215, JP-A No. 2006-343479, JP-A No. 2006-263992, JP-A No. 2000-352620, JP-A No. 2005-088578, JP-A No. 2005-300978, JP-A No. 2005-342929, JP-A No. 2006-021459, JP-A No. 2006-030425, JP-A No. 2006-036840, JP-A No. 2006-045306, JP-A No. 2006-045307, JP-A No. 2006-058825, JP-A No. 2006-063169, JP-A No. 2006-77067, JP-A No. 2006-77113, JP-A No. 2006-82261, JP-A No. 2006-91035, JP-A No. 2006-91078, JP-A No. 2006-104374, JP-A No. 2006-106247, JP-A No. 2006-111796, JP-A No. 2006-111797, JP-A No. 2006-113175, JP-A No. 2006-113551, JP-A No. 2006-113567, JP-A No. 2006-116904, JP-A No. 2006-117714, JP-A No. 2006-119182, JP-A No. 2006-119183, JP-A No. 2006-123513, JP-A No. 2006-123177, JP-A No. 2006-124629, JP-A No. 2006-137821, JP-A No. 2006-142800, JP-A No. 2006-163033, JP-A No. 2006-163034, JP-A No. 2006-171404, JP-A No. 2006-178020, JP-A No. 2006-182020, JP-A No. 2006-182865, JP-A No. 2006-188663, JP-A No. 2006-195407, JP-A No. 2006-208934, JP-A No. 2006-219615, JP-A No. 2006-220814, JP-A No. 2006-224589, JP-A No. 2006-249221, JP-A No. 2006-256082, JP-A No. 2006-272616, JP-A No. 2006-290929, JP-A No. 2006-293201, JP-A No. 2006-301500, JP-A No. 2006-301592.

Hereinafter, a measurement method used in the invention will be described.

1. Thermal Expansion Distribution in a Square Film Having One Side of 30 cm

In the invention, a thermal expansion distribution in a square film having one side of 30 cm is a value obtained by performing the following measurement method to the square film having an optional one side of 30 cm among the following films.

(1) Sampling

The square film having one side of 30 cm is cut into 16 square films having one side of 7.5 cm. The following A samples of 8 and B samples of 8 having a size of 3 mm×35 mm for TMA (Thermal Mechanical Analysis) are prepared by alternately cutting the central portions of 16 square films.

A sample: The length of A sample is 35 mm and to be parallel to one side (A side) of the square film having one side of 30 cm.

B sample: The length of B sample is 35 mm and to be parallel to the other side (B side) perpendicular to the A side.

(2) Measuring of Thermal Expansion

The TMA measurement is performed to the samples under conditions to be described later. Thermal Analyst 2200 (manufactured by TA Instrument) is used as the measurement device.

The samples dried for 3 hours under the condition of a temperature of 25° C. and a RH of 10% are set between the chucks spaced apart from each other with a distance of 25 mm. Subsequently, dried nitrogen flows into a measurement tube and is held for 30 minutes, and then the measurement is performed to the samples by applying a tension of 0.04N and increasing the temperature from 30° C. to 100° C. at a rate of temperature increase of 3° C. per a minute. The thermal expansion (ppm/° C.) of the samples are obtained from the inclination of straight lines of 50° C. and 80° C.

(3) Thermal Expansion Distribution

A difference (δ) between the maximum value and the minimum value of the thermal expansions of the 16 samples measured by the above-mentioned method is divided by an average value (A value) of the thermal expansions of the 16 samples and expressed in percentage so as to obtain the thermal expansion distribution.

2. A Optical Elasticity Modulus Distribution in a Square Film Having One Side of 30 cm In the invention, a optical elasticity modulus distribution in a square film having one side of 30 cm is a value obtained by performing the following measurement method to the square film having an optional one side of 30 cm among the following films.

(1) Sampling

The square film having one side of 30 cm is cut into 4 square films having one side of 15 cm. Two square films which are not adjacent to each other are took out and cut into 10 rectangular films having a size of 3 cm×15 cm such that the long sides of the rectangular films are to be the one side (A side) of the original square film having one side of 30 cm. The other two square films having one side of 15 cm are cut into 10 rectangular films having a size of 3 cm×15 cm such that the long sides of the rectangular films are to be the other side (B side) of the original square film having one side of 30 cm.

Samples, having a size of 1 cm×15 cm, for measuring the optical elasticity modulusity are prepared by cutting the central portions of the rectangular samples having a size of 3 cm×15 cm.

(2) Measuring of Optical Elasticity

Humidity conditioning is carried out to the samples for 2 hours under the condition of a temperature of 25° C. and a RH of 60% and then the samples are set to an ellipsometer (manufactured by JASCO Corporation, M-150). Subsequently, in-plane retardations of the samples are sequentially measured with light of 632.8 nm under the condition of a temperature of 25° C. and a RH of 60% while applying loads of 100 g, 200 g, 300 g, 400 g and 500 g to the samples in a longitudinal direction (the length of 15 cm).

Stress (a value (kgf/cm$^2$) obtained by dividing the load by the cross-section of the film is plotted on a transverse axis and a variation (nm) of the in-plane retardation is plotted on a longitudinal axis such that the optical elasticity modulus (cm$^2$/kgf) of the samples are obtained from the inclination.

(3) Optical Elasticity Distribution

A difference (δ) between the maximum value and the minimum value of the optical elasticity modulus of the 20 samples measured by the above-mentioned method is divided by an average value (A value) of the optical elasticity modulus of the 20 samples and expressed in percentage so as to obtain the optical elasticity modulus distribution.

3. Orientation Angle Distribution

The sample film (both end portions of the sample film to which the stretching had been performed were trimmed by 5% since the portions of the sample film clutched by the chucks were excluded) was cut into 50 pieces, which were parallel to each other in the film-forming direction, at the same intervals over the entire width thereof, and then set so as to parallel the side perpendicular to the film-forming direction to the sample holder. Using automatic double refraction meters of the samples (KOBRA-21 ADH, Oji Scientific Instruments), delayed phase axis were measured under the condition of a temperature of 25° C. and a RH of 60% and the orientation angles were measured.

The orientation angles of the 10 pieces of the central portion in the width direction were averaged and then obtained as described below, by dividing in a case where the orientation angles of the central portion was 0°±5° and in a case where the orientation angles of the central portion was 90°±5°.

In the case where the orientation angles of the central portion were 0°±5°, an absolute value of the difference between the orientation angles of the 50 pieces and the average value of the orientation angles of the 50 pieces was obtained such that the maximum value thereof (X) was set to 0°±X°.

In the case where the orientation angles of the central portion were 90°±5°, an absolute value of the difference between the orientation angles of the 50 pieces and the average value of the orientation angles of the 50 pieces was obtained such that the maximum value thereof (Y) was set to 90°±Y°.

4. Re and Rth

After subjecting a sample film to wetting under the conditions of 25° C. and 60% of RH for 5 hours or more, the retardation values were calculated under the conditions of 25° C., 60% of RH, and 550 nm of wavelength from a direction perpendicular to the sample film surface and a direction slanted in ±40° from the film normal line by using an automatic birefringence analyzer (KOBRA-21ADH manufactured by Oji Scientific Instruments). On the basis of the in-plane retardation values (Re) from the perpendicular direction and the direction slanted in ±40°, the retardation value (Rth) in the thickness direction was calculated. These values are represented as Re and Rth.

5. Substitution Degree of Cellulose Acylate

The substitution degree of acyl of cellulose acylate was determined by the use of $^{13}$C-NMR according to the method described in *Carbohydr. Res.* 273 (1995), pp. 83 to 91 (by Tezuka, et al).

6. Residual Solvent

A solution was prepared in which 300 mg of a sample film was dissolved in 30 ml of methyl acetate (Sample A). Another solution was prepared in which 300 mg of a sample film was dissolved in 30 ml of dichloromethane (Sample B).

After that, these samples were measured by gas chromatography (GC) under the following conditions.

Column: DB-WAX (0.25 mmØ×30 m, 0.25 μm of thickness)
Column temperature: 50° C.
Carrier gas: nitrogen
Analysis time: 15 minutes
Sample injection amount: 1 μml The solvent amount was determined in the following manner.

Content ratios were determined using the calibration curve for each of the peaks in Sample A, except for that of the solvent (methyl acetate), and the aggregate was taken as Sa. In Sample B, the content ratio for each of the peaks in the region hidden by the solvent peak in Sample A was determined using calibration curves, and the aggregate was taken as Sb. The sum of Sa and Sb was taken as the residual solvent amount.

7. Elasticity Modulus (1) Sampling

The sample film was cut from the central portion and the both end portions thereof (portions occupying the entire width by 40% from the center) in MD and TD directions and cut into each three samples (9 samples cut in the MD direction, 9 samples cut in the TD direction, total 18 samples) having a size of 1 cm×15 cm.

(2) Measuring of Elasticity Modulus

The humidity conditioning is carried out to the samples for 5 hours under the condition of a temperature of 25° C. and a RH of 60% and then a tensile test is performed to the samples clutched by the chucks spaced apart from each other with a distance of 10 cm at a tensile speed of 10 mm per a minute. The elasticity modulus was set to the average value of the elasticity modulus of the 18 samples.

8. Luminescent Spot

Light is projected from one of the polarization plates to an optical film disposed between the two polarization plates disposed in a crossed Nicol state such that luminescent spots having a diameter of 0.01 mm or more are observed from the other of the polarization plates. Specifically, the luminescent spot according to the invention is a value measured by the following method.

(1) Sampling 20 pieces sampled over the entire width of the film were prepared at the same intervals.

(2) Measuring of Luminescent Spot

Using a polarization microscope (manufactured by Nikon, product number: Eclipse ME600) in which the two polarization plates are disposed in a crossed (crossed Nicol) state, the number of luminescent spots having at least one side of 10 μm or more were counted at 50-fold magnification and were converted to the number per 1 cm$^2$. The measurement is performed to the respective samples and the average value (A value) of the number per 1 cm$^2$ was obtained by measuring each one sample at 10 microscopic fields.

By performing the measurement to the 20 sample pieces, the average of the respective A values was obtained as the number of the luminescent spots.

EXAMPLES

Hereinafter, the invention will be further specifically described with reference to Examples. In the following Examples, materials, the amount and the ratio thereof, details of the treatment, and the treatment process may be suitably modified within the range of not impairing the purpose of the invention. Accordingly, the invention should not be limitatively interpreted by the Examples mentioned below.

Example A

Cellulose Acylate-Based Film

1. Cellulose Acylate Resin
(1) Synthesis of Cellulose Acetate Propionate (CAP)

150 parts by weight of cellulose (hardwood pulp) and 75 parts by weight of acetic acid were added to a reaction vessel equipped with a reflux device and the mixture was fiercely stirred for 2 hours while the vessel was heated at 60° C. Samples, which differ in the number of luminescent spots as derived from un-reacted cellulose, were prepared by varying such time of pretreatment. Then, the reaction vessel was left and cooled in an iced water bath at 2° C. for 30 min.

Separately, a mixture of 1,410 parts by weight of a propionic anhydride and 10.5 parts by weight of sulphuric acid was prepared as an acylating agent, and cooled at −30° C. After that, the mixture was added at once to the reaction vessel in which the cellulose subjected to the pre-treatment was placed. After 30 minutes, exterior temperature was gradually increased in such a manner that interior temperature is adjusted to be 25° C. when 2 hours have passed after adding the acylating agent. The reaction vessel was cooled in the iced water bath at 5° C. in such a manner that the interior temperature is adjusted to be 10° C. when 0.5 hours have passed after adding the acylating agent, and adjusted to be 23° C. when 2 hours have passed after adding the acylating agent. Then, the mixture was stirred again for 3 hours while the interior temperature of the vessel was kept at 23° C. The reaction vessel was cooled in the iced water bath at 5° C., and 120 parts by weight of acetic acid having a water content of 25% by mass cooled at 5° C. was added to the vessel for 1 hour. The interior temperature was increased to 40° C. and the mixture was stirred for 2 hours (ripening). After that, a solution in which magnesium acetate tetrahydrate is dissolved by twice as much as sulphuric acid in mol in acetic acid having water content of 50% by mass is added to the reaction vessel, and then the mixture was stirred for 30 min. To the mixture, 1,000 parts by weight of acetic acid having a water content of 25% by mass, 500 parts by weight of acetic acid having a water content of 33% by mass, 1,000 parts by weight of acetic acid having a water content of 50% by mass, and 1,000 parts by weight of water were added in such an order, thereby precipitating cellulose acetate propionate. The obtained precipitate of cellulose acetate propionate washed with warm water. After washing, the precipitate of cellulose acetate propionate was stirred in 0.005% by mass of calcium hydroxide aqueous solution at 20° C. for 0.5 hours. Subsequently, the precipitate of cellulose acetate propionate washed again with water till the pH of a washing solution became 7 and vacuum dried at 70° C.

According to NMR and GPC measurement, the obtained cellulose acetate propionate had the acetylation (Ac) degree of 0.45, the propionylation (Pr) degree of 2.45, and the polymerization degree of 160. The compositions of the cellulose acetate propionate were measured according to the NMR method and the polymerization degree thereof was measured according to the GPC method as follows.

The number average molecular weight (Mn) was obtained by using THF as an eluent and in terms of monodisperse polystyrene as a standard molecular weight. A molecular weight (m) per one segment was determined from the composition obtained with NMR. The Mn was divided by m to determine the degree of polymerization (number-average degree of polymerization: DPn).

(2) Synthesis of Cellulose Acetate Butylate (CAB)

100 parts by weight of cellulose (cotton linter) and 135 parts by weight of acetic acid were added to a reaction vessel equipped with a reflux device and the flask was heated at 60° C. and left for 1 hour. Samples, which differ in the number of luminescent spots as derived from un-reacted cellulose, were prepared by varying such time of pretreatment. After that, the mixture was fiercely stirred for 1 hour while the flask was heated at 60° C. The cellulose subjected to the pre-treatment as above was swollen and dissolved to have a fluffy shape. The reaction vessel was lest in an iced water bath at 5° C. for 1 hour to sufficiently cool the cellulose.

Separately, a mixture of 1,080 parts by weight of a butyric acid anhydride and 10.0 parts by weight of sulphuric acid was prepared as an acylating agent, and cooled at −20° C. After that, the mixture was added at once to the reaction vessel in which the cellulose subjected to the pre-treatment was placed. After 30 minutes, exterior temperature was gradually increased to 20° C., and the mixture was reacted for 5 hours. The reaction vessel was cooled in the iced water bath at 5° C., and 2,400 parts by weight of acetic acid having a water content of 12.5% by mass cooled at 5° C. was added to the vessel for 1 hour. The interior temperature was increased to 30° C. and the mixture was stirred for 1.5 hours (ripening). After that, to the reaction vessel, 100 parts by weight of magnesium acetate tetrahydrate aqueous solution (50% by mass) was added and the mixture was stirred for 30 min. To the mixture, 1,000 parts by weight of acetic acid and 2,500 parts by weight of acetic acid having a water content of 50% by mass were gradually added, thereby precipitating cellulose acetate butylate. The obtained precipitate of cellulose acetate butylate washed with warm water. After washing, the precipitate of cellulose acetate butylate was stirred in 0.005% by mass of calcium hydroxide aqueous solution for 0.5 hours. Subsequently, the precipitate of cellulose acetate butylate washed again with water till the pH of a washing solution became 7 and dried at 70° C. The obtained cellulose acetate butylate had the acetylation (Ac) degree of 0.84, the butyrylation (Bu) degree of 2.12, and the polymerization degree of 180.

(3) Synthesis of Other Cellulose Acylates

By varying the kinds and amounts of the acylating agent, the substitution degree was varied, by varying the pretreatment time, the number of luminescent spots was varied, and by varying the ripening time, the polymerization degree was varied, thereby synthesizing cellulose acylate other than CAP and CAB represented in Table 1.

In addition, as the cellulose acylate in which a substituted or unsubstituted aromatic acyl group is bonded, cellulose acylate was synthesized by esterifying benzoic acid and acetic acid in accordance with the Example 1 mentioned in JP-A No. 2002-32201. Here, 2.0 substitution, 2.45 substitution cellulose acetates were used as a starting material for the cellulose acylate. As a result, aromatic acyl group-substituted cellulose acylates having a degree of acetate substitution=2.0 and a degree of benzoate substitution =1.0, and a degree of acetate substitution=2.45 and a degree of benzoate substitution=0.55 were obtained.

In addition to the above, cellulose acylates in which aromatic acyl groups of Examples 2 to 7 mentioned in JP-A No. 2002-32201 are bonded were synthesized, subjected to film forming and stretching, and all of them gave satisfactory results as in the above benzoic acid-substituted cellulose acylate.

2. Film Melt Forming (1) Pelletization of Cellulose Acylate 100 parts by weight of the cellulose acylate, 0.3 parts by weight of stabilizer (Sumirizer-GP manufactured by Sumitomo Chemical Co., Ltd.), 0.05 parts by weight of silicon dioxide particle (Aerosil R972V), and UV absorbents (0.05 parts by weight of 2-(2'-hydroxy-3',5-di-tert-butylphenyl)-benzotriazole and 0.1 parts by weight of 2,4-hydroxy-4-methoxybenzophenone) were mixed.

The mixture was dried at 100° C. for 3 hours to have a water content of 0.1% by mass or less. Then, the mixture was melted at 180° C. by the use of a twin screw kneader, extruded as a strand shape into warm water of 60° C., and cut to mold a cylinder shaped pellet having 3 mm of diameter and 5 mm of length.

(2) Melt Film Forming

The cellulose acylate pellets prepared by the above method were dried for 5 hours at 100° C. with a dehumidifying airstream with −40° C. dew-point temperature, so that the moisture content is no more than 0.01% by mass. The dried pellets were charged into an 80° C. hopper, and melted by the melt-extruder adjusted to the temperature of 180° C. (inlet temperature) and 230° C. (outlet temperature). The diameter of the screw employed at this stage was 60 mm, L/D was 50, and the compression ratio was 4. The resin extruded from the melt-extruder was transported at a fixed quantitative amount using a gear pump, although at this stage the extruder revolution speed was varied in order to control the resin pressure upstream of the gear pump at a fixed pressure of 10 MPa. The molten resin transported from the gear pump was filtered using a 5 μm filtration accuracy leaf disc filter, and then passed through a static mixer and extruded from a coat hanger die having 0.8 mm slit intervals and 230° C. temperature onto three cast rolls each set to the Tg−5° C., Tg° C., and Tg−10°

C. The touch roll was brought in contact with the cast roll on uppermost flow side under conditions shown in Table 1, and formed a non-stretched film. As the touch roll, rolls described in Example 1 of JP-A No. H11-235747 (double controlled rolls and rolls disclosed) was used, and adjusted to Tg−5° C. (provided that the thickness of a thin metal sheath was set to 3 mm).

The solidified molten mixture was stripped off from the casting drum, and immediately before taking up, trimmed on both sides (5% on each side over the entire width) and knurled on both sides with a width of 10 mm and a height of 50 μm. Then a non-stretched film having a width of 1.5 m and a length of 3,000 m was obtained at a rate of 30 m/min. The Tg was measured as follows using DSC.

(Tg Measurement)

A 20 mg sample (cellulose acylate pellet) was placed on the measuring pan of a DSC. The temperature of this sample was raised from 30° C. to 250° C. at 10° C./minute in a nitrogen atmosphere (first run), and then cooled to 30° C. at −10° C./minute. The temperature was then again raised from 30° C. to 250° C. (second run). The glass transition temperature (Tg) was taken as the temperature at which the base line in the second run began to inflect from the low temperature side.

TABLE 1

| | cellulose acylate | | | | | | | | | | |
|---|---|---|---|---|---|---|---|---|---|---|---|
| | substitution degree | | | | | | | | | | line |
| | acetyl group (A) | prophonyl group (B1) | butyryl group (B2) | pentanoyl group (B3) | B (sum of B1-B3) | A + B | aromatic acyl group (benzoyl group) C | A + C | time of pretreatment (Hr) | polymerization | Tg (° C.) | pressure of touch roller (kg/cm) |
| Example 1 | 0.45 | 2.4 | | | 2.4 | 2.65 | | | 2 | 100 | 135 | 3 |
| Comparative Example 1 | 0.45 | 2.4 | | | 2.4 | 2.65 | | | 2 | 100 | 135 | 3 |
| Example 2 | 0.45 | 2.4 | | | 2.4 | 2.65 | | | 2 | 100 | 135 | 3 |
| Example 3 | 0.45 | 2.4 | | | 2.4 | 2.65 | | | 2 | 100 | 135 | 3 |
| Comparative Example 2 | 0.45 | 2.4 | | | 2.4 | 2.65 | | | 2 | 100 | 135 | 3 |
| Example 4 | 0.45 | 2.4 | | | 2.4 | 2.65 | | | 3 | 100 | 135 | 5 |
| Example 5 | 0.45 | 2.4 | | | 2.4 | 2.65 | | | 3 | 100 | 135 | 5 |
| Example 6 | 0.45 | 2.4 | | | 2.4 | 2.65 | | | 3 | 100 | 135 | 5 |
| Example 7 | 0.45 | 2.4 | | | 2.4 | 2.65 | | | 4 | 100 | 135 | 5 |
| Example 8 | 0.45 | 2.4 | | | 2.4 | 2.65 | | | 4 | 100 | 135 | 8 |
| Example 9 | 0.45 | 2.4 | | | 2.4 | 2.65 | | | 4 | 100 | 135 | 8 |
| Example 10 | 0.45 | 2.4 | | | 2.4 | 2.65 | | | 4 | 100 | 135 | 8 |
| Example 11 | 0.45 | 2.4 | | | 2.4 | 2.65 | | | 0.0 | 100 | 135 | 8 |
| Example 12 | 0.45 | 2.4 | | | 2.4 | 2.65 | | | 0.4 | 100 | 135 | 10 |
| Example 13 | 0.45 | 2.4 | | | 2.4 | 2.65 | | | 12 | 100 | 135 | 10 |
| Example 14 | 0.45 | 2.4 | | | 2.4 | 2.65 | | | 72 | 100 | 135 | 10 |
| Example 15 | 0.45 | 2.4 | | | 2.4 | 2.65 | | | 5 | 200 | 125 | 10 |
| Example 16 | 0.1 | 2.0 | | | 2.0 | 2.0 | | | 5 | 200 | 125 | 5 |
| Example 17 | 0.1 | 2.5 | | | 2.0 | 2.0 | | | 5 | 200 | 125 | 5 |
| Example 18 | 0.1 | 2.5 | | | 2.0 | 2.0 | | | 5 | 200 | 125 | 5 |
| Example 19 | 0.1 | 2.0 | | | 2.0 | 2.0 | | | 6 | 100 | 145 | 5 |
| Example 20 | 0.0 | 2.0 | | | 2.0 | 2.0 | | | 6 | 100 | 145 | 10 |
| Example 21 | 0.0 | 2.0 | | | 2.0 | 2.0 | | | 6 | 160 | 145 | 10 |
| Example 22 | 0.0 | 2.0 | | | 2.0 | 2.0 | | | 6 | 160 | 145 | 10 |
| Example 23 | 0.0 | 2.0 | | | 2.0 | 2.0 | | | 1 | 160 | 130 | 10 |
| Example 24 | 0.04 | | 2.12 | | 2.12 | 2.96 | | | 1 | 160 | 130 | 15 |
| Example 25 | 0.04 | | 2.12 | | 2.12 | 2.96 | | | 1 | 160 | 130 | 15 |
| Example 26 | 0.04 | | 2.12 | | 2.12 | 2.96 | | | 1 | 160 | 130 | 15 |
| Example 27 | 0.04 | | 2.12 | | 2.12 | 2.96 | | | 1 | 160 | 145 | 15 |
| Example 28 | 1.5 | | 1.4 | | 1.4 | 2.0 | | | 6 | 170 | 145 | 20 |
| Example 29 | 1.5 | | 1.4 | | 1.4 | 2.0 | | | 5 | 170 | 145 | 20 |
| Example 30 | 1.5 | | 1.4 | | 1.4 | 2.0 | | | 6 | 170 | 145 | 20 |
| Example 31 | 1.5 | | 1.4 | | 1.4 | 2.0 | | | 5 | 170 | 145 | 20 |
| Example 32 | 0.2 | | 2.4 | | 2.4 | 2.4 | | | 3 | 150 | 125 | 6 |
| Example 33 | 0.2 | | 2.4 | | 2.4 | 2.4 | | | 3 | 150 | 125 | 6 |
| Example 34 | 0.2 | | 2.4 | | 2.4 | 2.0 | | | 3 | 150 | 125 | 6 |
| Example 35 | 0.3 | 2.0 | | | 2.0 | 2.0 | | | 2 | 160 | 130 | — |
| Example 36 | 0.3 | 2.0 | | | 2.0 | 2.0 | | | 2 | 160 | 130 | 1 |
| Example 37 | 0.3 | 2.0 | | | 2.0 | 2.0 | | | 2 | 160 | 130 | 90 |
| Example 38 | 0.3 | 2.0 | | | 2.0 | 2.0 | | | 2 | 160 | 130 | 110 |
| Example 39 | 1.1 | 1.7 | | | 1.7 | 2.4 | | | 6 | 200 | 135 | 30 |
| Example 40 | 0.0 | 2 | | | 2 | 2.4 | | | 6 | 200 | 130 | 30 |
| Example 41 | 0.2 | 2.0 | | | 2.0 | 2.4 | | | 6 | 100 | 120 | 30 |
| Example 42 | 0.2 | 2.0 | | | 2.0 | 2.4 | | | 6 | 110 | 125 | 30 |
| Example 43 | 0.2 | 2.0 | | | 2.0 | 2.4 | | | 6 | 200 | 125 | 20 |
| Example 44 | 0.2 | 2.0 | | | 2.0 | 2.0 | | | 6 | 200 | 125 | 20 |
| Example 45 | 0.3 | 2.0 | | | 2.0 | 2.0 | | | 3 | 230 | 125 | 80 |
| Example 46 | 0.3 | | 2.5 | | 2.0 | 2.0 | | | 3 | 230 | 125 | 80 |
| Example 47 | 0.3 | | | 2.0 | 2.0 | 2.0 | | | 3 | 230 | 105 | 80 |
| Example 48 | 1.05 | 0.7 | | | | 2.65 | | | 2 | 250 | 140 | 3 |
| Comparative Example 3* | 1.05 | 0.7 | | | | 2.65 | | | 0 | 200 | 140 | — |
| Example 49 | 0.2 | | 2.4 | | 2.4 | 2.4 | | | 3 | 150 | 125 | 6 |

TABLE 1-continued

| | | | | | | | | | | |
|---|---|---|---|---|---|---|---|---|---|---|
| Example 50 | 0.2 | | 2.4 | 2.4 | 2.4 | | | 3 | 150 | 125 | 6 |
| Example 51 | 0.2 | | 2.4 | 2.4 | 2.4 | | | 3 | 150 | 125 | 6 |
| Example 52 | 0.2 | | 2.4 | 2.4 | 2.4 | | | 3 | 150 | 125 | 6 |
| Example 53 | 0.11 | 2.5 | | 2.5 | 2.01 | | | 2.0 | 145 | 135 | 6 |
| Example 54 | 1.5 | 0.0 | | 0.4 | 2.4 | | | 2.0 | 170 | 175 | 6 |
| Example 55 | 1.0 | 0.2 | | 0.2 | 2.1 | | | 2.0 | 170 | 130 | 6 |
| Example 56 | 2 | | | | | 1 | 3 | 3.0 | 230 | 100 | 6 |
| Example 57 | 2.45 | | | | | 0.55 | 5 | 3.0 | 170 | 150 | 6 |

| | LD | | TD | | | | | | relaxing | |
|---|---|---|---|---|---|---|---|---|---|---|
| | | | temperature of best treatment before TD stretching (°C.) | chuck condition | | stretching ratio (%) | temperature $T^2$ (°C.) | temperature of best treatment before TD stretching (°C.) | ratio of transporting speed $V^1/V^2$ | sum of relaxing rate (%) | relaxing temperature (°C.) |
| | LD/TD (L/W) | stretching ratio (%) | | Lo/We | chuck temperature (°C.) | | | | | | |
| Example 1 | 0.05 | 10 | $T^1 + 15$ | 8 | 80 | 80 | $Tg + 15$ | $T^1 - 15$ | 1.01 | 5 | $Tg + 5$ |
| Comparative Example 1 | 0.05 | 10 | $T^1 + 15$ | 2 | 80 | 80 | $Tg + 15$ | $T^1 - 15$ | 1.01 | 5 | $Tg + 5$ |
| Example 2 | 0.05 | 10 | $T^1 + 15$ | 4 | 80 | 80 | $Tg + 15$ | $T^1 - 15$ | 1.01 | 5 | $Tg + 5$ |
| Example 3 | 0.05 | 10 | $T^1 + 15$ | 43 | 80 | 80 | $Tg + 15$ | $T^1 - 15$ | 1.01 | 5 | $Tg + 5$ |
| Comparative Example 2 | 0.05 | 10 | $T^1 + 15$ | 52 | 80 | 80 | $Tg + 15$ | $T^1 - 15$ | 1.01 | 5 | $Tg + 5$ |
| Example 4 | 0.1 | 5 | $T^1 + 20$ | 15 | 65 | 90 | $Tg + 10$ | $T^1 - 20$ | 1.03 | 6 | $Tg$ |
| Example 5 | 0.1 | 5 | $T^1 + 20$ | 15 | 65 | 90 | $Tg + 10$ | $T^1 - 20$ | 1.03 | 6 | $Tg$ |
| Example 6 | 0.1 | 5 | $T^1 + 20$ | 15 | 100 | 90 | $Tg + 10$ | $T^1 - 20$ | 1.03 | 6 | $Tg$ |
| Example 7 | 0.1 | 5 | $T^1 + 20$ | 15 | 210 | 90 | $Tg + 10$ | $T^1 - 20$ | 1.03 | 6 | $Tg$ |
| Example 8 | 0.15 | 15 | $T^1 + 10$ | 25 | 120 | 100 | $Tg + 20$ | $T^1 - 25$ | 0.01 | 10 | $Tg + 10$ |
| Example 9 | 0.15 | 15 | $T^1 + 10$ | 25 | 120 | 100 | $Tg + 20$ | $T^1 - 25$ | 1.002 | 10 | $Tg + 10$ |
| Example 10 | 0.15 | 15 | $T^1 + 10$ | 25 | 120 | 100 | $Tg + 20$ | $T^1 - 25$ | 1.008 | 10 | $Tg + 10$ |
| Example 11 | 0.15 | 15 | $T^1 + 10$ | 25 | 120 | 100 | $Tg + 20$ | $T^1 - 25$ | 1.112 | 10 | $Tg + 10$ |
| Example 12 | 0.2 | 6 | $T^1 + 25$ | 10 | 150 | 150 | $Tg + 25$ | $T^1 - 10$ | 1.000 | 12 | $Tg + 15$ |
| Example 13 | 0.2 | 6 | $T^1 + 25$ | 10 | 150 | 150 | $Tg + 25$ | $T^1 - 10$ | 1.000 | 12 | $Tg + 15$ |
| Example 14 | 0.2 | 6 | $T^1 + 25$ | 10 | 150 | 150 | $Tg + 25$ | $T^1 - 10$ | 1.000 | 12 | $Tg + 15$ |
| Example 15 | 0.2 | 6 | $T^1 + 25$ | 10 | 150 | 150 | $Tg + 25$ | $T^1 - 10$ | 1.000 | 12 | $Tg + 15$ |
| Example 16 | 0.1 | 5 | $T^1$ | 20 | 100 | 160 | $Tg - 25$ | $T^1 - 25$ | 1.00 | 6 | $Tg - 10$ |
| Example 17 | 0.1 | 5 | $T^1 + 5$ | 20 | 100 | 160 | $Tg - 25$ | $T^1 - 25$ | 1.00 | 6 | $Tg - 10$ |
| Example 18 | 0.1 | 5 | $T^1 + 45$ | 20 | 100 | 160 | $Tg - 10$ | $T^1 - 25$ | 1.00 | 6 | $Tg - 10$ |
| Example 19 | 0.1 | 5 | $T^1 + 55$ | 20 | 100 | 160 | $Tg - 10$ | $T^1 - 25$ | 1.00 | 6 | $Tg - 10$ |
| Example 20 | 0.2 | 90 | $T^1 + 25$ | 10 | 90 | 10 | $Tg + 10$ | $T^1 - 55$ | 1.03 | 10 | $Tg + 10$ |
| Example 21 | 0.2 | 90 | $T^1 + 25$ | 10 | 90 | 10 | $Tg + 10$ | $T^1 - 45$ | 1.03 | 10 | $Tg + 10$ |
| Example 22 | 0.2 | 90 | $T^1 + 25$ | 10 | 90 | 10 | $Tg + 10$ | $T^1 - 5$ | 1.03 | 10 | $Tg + 10$ |
| Example 23 | 0.2 | 90 | $T^1 + 25$ | 10 | 90 | 10 | $Tg + 10$ | $T^1$ | 1.03 | 10 | $Tg + 10$ |
| Example 24 | 0.04 | 5 | $T^1 + 30$ | 15 | 110 | 15 | $Tg + 10$ | $T^1 - 30$ | 1.015 | 0 | — |
| Example 25 | 0.04 | 5 | $T^1 + 30$ | 15 | 110 | 15 | $Tg + 10$ | $T^1 - 30$ | 1.015 | 2 | $Tg + 5$ |
| Example 26 | 0.04 | 5 | $T^1 + 30$ | 15 | 110 | 15 | $Tg + 10$ | $T^1 - 30$ | 1.015 | 10 | $Tg + 5$ |
| Example 27 | 0.04 | 5 | $T^1 + 30$ | 15 | 110 | 15 | $Tg + 10$ | $T^1 - 30$ | 1.015 | 22 | $Tg + 5$ |
| Example 28 | 0.05 | 10 | $T^1 + 25$ | 20 | 130 | 90 | $Tg + 20$ | $T^1 - 5$ | 1.01 | 10 | $Tg + 35$ |
| Example 29 | 0.05 | 10 | $T^1 + 25$ | 20 | 130 | 90 | $Tg + 20$ | $T^1 - 5$ | 1.01 | 10 | $Tg + 25$ |
| Example 30 | 0.05 | 10 | $T^1 + 25$ | 20 | 130 | 90 | $Tg + 20$ | $T^1 - 5$ | 1.01 | 10 | $Tg + 25$ |
| Example 31 | 0.05 | 10 | $T^1 + 25$ | 20 | 130 | 90 | $Tg + 20$ | $T^1 - 5$ | 1.01 | 10 | $Tg + 35$ |
| Example 32 | 0.02 | 8 | $T^1 + 5$ | 25 | 100 | 100 | $Tg + 30$ | $T^1 - 25$ | 1.05 | 15 | $Tg - 5$ |
| Example 33 | 0.26 | 8 | $T^1 + 5$ | 25 | 100 | 100 | $Tg + 30$ | $T^1 - 25$ | 1.05 | 15 | $Tg - 5$ |
| Example 34 | 0.32 | 8 | $T^1 + 5$ | 25 | 100 | 100 | $Tg + 30$ | $T^1 - 25$ | 1.05 | 15 | $Tg - 5$ |
| Example 35 | 0.06 | 10 | $T^1 + 10$ | 20 | 80 | 100 | $Tg + 5$ | $T^1 - 25$ | 1.04 | 3 | $Tg$ |
| Example 36 | 0.06 | 10 | $T^1 + 10$ | 20 | 80 | 100 | $Tg + 5$ | $T^1 - 25$ | 1.04 | 3 | $Tg$ |
| Example 37 | 0.06 | 10 | $T^1 + 10$ | 20 | 80 | 100 | $Tg + 5$ | $T^1 - 25$ | 1.04 | 3 | $Tg$ |
| Example 38 | 0.06 | 10 | $T^1 + 10$ | 20 | 80 | 100 | $Tg + 5$ | $T^1 - 25$ | 1.04 | 3 | $Tg$ |
| Example 39 | 0.15 | 5 | $T^1 + 10$ | 30 | 140 | 100 | $Tg + 20$ | $T^1 - 20$ | 1.06 | 6 | $Tg + 5$ |
| Example 40 | 0.15 | 5 | $T^1 + 10$ | 30 | 140 | 100 | $Tg + 20$ | $T^1 - 20$ | 1.06 | 6 | $Tg + 5$ |
| Example 41 | 0.15 | 5 | $T^1 + 10$ | 30 | 140 | 100 | $Tg + 20$ | $T^1 - 20$ | 1.06 | 6 | $Tg + 5$ |
| Example 42 | 0.15 | 5 | $T^1 + 10$ | 30 | 140 | 100 | $Tg + 20$ | $T^1 - 20$ | 1.06 | 6 | $Tg + 5$ |
| Example 43 | 0.15 | 5 | $T^1 + 10$ | 30 | 140 | 100 | $Tg + 20$ | $T^1 - 20$ | 1.06 | 6 | $Tg + 5$ |
| Example 44 | 0.15 | 5 | $T^1 + 10$ | 30 | 140 | 100 | $Tg + 20$ | $T^1 - 20$ | 1.06 | 6 | $Tg + 5$ |
| Example 45 | 0.1 | 10 | $T^1 + 20$ | 20 | 100 | 100 | $Tg + 10$ | $T^1 - 10$ | 1.02 | 6 | $Tg + 10$ |
| Example 46 | 0.1 | 10 | $T^1 + 20$ | 20 | 100 | 100 | $Tg + 10$ | $T^1 - 10$ | 1.02 | 6 | $Tg + 10$ |
| Example 47 | 0.1 | 10 | $T^1 + 20$ | 20 | 100 | 100 | $Tg + 10$ | $T^1 - 10$ | 1.02 | 6 | $Tg + 10$ |
| Example 48 | — | 0 | $T^1 + 20$ | 8 | 60 | 50 | $Tg + 20$ | $T^1 - 20$ | 1.02 | 6 | $Tg + 5$ |
| Comparative Example 3* | — | 0 | $T^1$ | 2 | 30 | 50 | $Tg + 20$ | $T^1$ | 0.05 | 0 | — |
| Example 49 | 1.9 | 80 | $T^1 + 5$ | 25 | 100 | 10 | $Tg + 30$ | $T^1 - 25$ | 1.05 | 15 | $Tg - 5$ |
| Example 50 | 2.1 | 80 | $T^1 + 5$ | 25 | 100 | 10 | $Tg + 30$ | $T^1 - 25$ | 1.05 | 15 | $Tg - 5$ |
| Example 51 | 48 | 80 | $T^1 + 5$ | 25 | 100 | 10 | $Tg + 30$ | $T^1 - 25$ | 1.05 | 15 | $Tg - 5$ |
| Example 52 | 52 | 80 | $T^1 + 5$ | 25 | 100 | 10 | $Tg + 30$ | $T^1 - 25$ | 1.05 | 15 | $Tg - 5$ |

TABLE 1-continued

| | | | | | | | | | | | |
|---|---|---|---|---|---|---|---|---|---|---|---|
| Example 53 | 20 | 80 | T¹ + 5 | 25 | 100 | 10 | Tg + 30 | T¹ − 25 | 1.05 | 15 | Tg − 5 |
| Example 54 | 20 | 60 | T¹ + 5 | 25 | 100 | 10 | Tg + 30 | T¹ − 25 | 1.05 | 15 | Tg − 5 |
| Example 55 | 20 | 50 | T¹ + 5 | 25 | 100 | 10 | Tg + 30 | T¹ − 25 | 1.05 | 15 | Tg − 5 |
| Example 56 | 20 | 50 | T¹ + 5 | 25 | 100 | 10 | Tg + 30 | T¹ − 25 | 1.05 | 15 | Tg − 5 |
| Example 57 | 20 | 50 | T¹ + 5 | 25 | 100 | 10 | Tg + 30 | T¹ − 25 | 1.05 | 15 | Tg − 5 |

| | evaluation of stretched film | | | | | | | display unevenness | |
|---|---|---|---|---|---|---|---|---|---|
| | thermal expension distribution (%) | optical elasticity (%) | Orientation angle distribution (°) | Re (nm) | Rth (nm) | elasticity modulus (kN/mm²) | luminescent spot (kN/cm²) | thickness (μm) | polarzing plats A (%) | polarzing plats B (%) |
| Example 1 | 0 | 0 | 0 ± 0 | 50 | 210 | 2.1 | 0 | 90 | 0 | 0 |
| Comparative Example 1 | 13 | 15 | 0 ± 7 | 50 | 210 | 2.1 | 0 | 90 | 40 | 41 |
| Example 2 | 6 | 0 | 0 ± 3 | 50 | 210 | 2.1 | 0 | 90 | 5 | 5 |
| Example 3 | 6 | 6 | 0 ± 3 | 50 | 210 | 2.1 | 0 | 90 | 3 | 4 |
| Comparative Example 2 | 14 | 10 | 0 ± 7 | 50 | 215 | 2.1 | 0 | 90 | 25 | 36 |
| Example 4 | 5 | 0 | 0 ± 4 | 45 | 230 | 2.2 | 0 | 80 | 5 | 5 |
| Example 5 | 2 | 1 | 0 ± 2 | 45 | 230 | 2.2 | 0 | 80 | 1 | 1 |
| Example 6 | 2 | 1 | 0 ± 2 | 45 | 230 | 2.2 | 0 | 80 | 1 | 1 |
| Example 7 | 6 | 5 | 0 ± 4 | 45 | 230 | 2.3 | 0 | 80 | 4 | 4 |
| Example 8 | 4 | 6 | 0 ± 4 | 65 | 220 | 2.3 | 0 | 100 | 6 | 9 |
| Example 9 | 2 | 3 | 0 ± 2 | 60 | 210 | 2.2 | 0 | 100 | 2 | 2 |
| Example 10 | 3 | 2 | 0 ± 2 | 60 | 210 | 2.2 | 0 | 100 | 2 | 2 |
| Example 11 | 4 | 5 | 0 ± 4 | 55 | 210 | 2.1 | 0 | 100 | 6 | 7 |
| Example 12 | 3 | 3 | 0 ± 3 | 90 | 280 | 2.2 | 33 | 120 | 6 | 6 |
| Example 13 | 1 | 1 | 0 ± 1 | 90 | 280 | 2.2 | 20 | 120 | 2 | 2 |
| Example 14 | 0 | 0 | 0 ± 1 | 90 | 280 | 2.2 | 0 | 120 | 0 | 0 |
| Example 15 | 0 | 0 | 0 ± 3 | 90 | 280 | 2.2 | 0 | 120 | 0 | 0 |
| Example 16 | 6 | 5 | 0 ± 5 | 140 | 150 | 1.7 | 0 | 60 | 7 | 6 |
| Example 17 | 2 | 2 | 0 ± 3 | 140 | 145 | 1.7 | 0 | 60 | 2 | 2 |
| Example 18 | 2 | 2 | 0 ± 3 | 140 | 145 | 1.7 | 0 | 60 | 1 | 1 |
| Example 19 | 6 | 5 | 0 ± 5 | 140 | 140 | 1.6 | 0 | 60 | 4 | 5 |
| Example 20 | 6 | 0 | 0 ± 5 | 30 | 380 | 2.5 | 0 | 180 | 4 | 5 |
| Example 21 | 2 | 2 | 0 ± 3 | 35 | 385 | 2.5 | 0 | 180 | 1 | 1 |
| Example 22 | 2 | 2 | 0 ± 3 | 35 | 385 | 2.5 | 0 | 180 | 1 | 1 |
| Example 23 | 5 | 0 | 0 ± 5 | 40 | 390 | 2.4 | 0 | 180 | 6 | 6 |
| Example 24 | 5 | 5 | 0 ± 3 | 50 | 60 | 1.5 | 2 | 120 | 6 | 6 |
| Example 25 | 1 | 2 | 0 ± 1 | 45 | 55 | 1.4 | 2 | 120 | 2 | 2 |
| Example 26 | 0 | 1 | 0 ± 1 | 40 | 55 | 1.4 | 2 | 120 | 1 | 1 |
| Example 27 | 3 | 4 | 0 ± 3 | 40 | 60 | 1.2 | 2 | 120 | 6 | 5 |
| Example 28 | 5 | 5 | 0 ± 3 | 50 | 230 | 1.0 | 0 | 60 | 5 | 6 |
| Example 29 | 2 | 1 | 0 ± 1 | 50 | 225 | 1.0 | 0 | 60 | 1 | 1 |
| Example 30 | 2 | 2 | 0 ± 1 | 45 | 220 | 1.6 | 0 | 60 | 1 | 1 |
| Example 31 | 5 | 5 | 0 ± 3 | 35 | 205 | 1.7 | 0 | 60 | 6 | 5 |
| Example 32 | 0 | 0 | 0 ± 0 | 60 | 250 | 1.5 | 0 | 100 | 0 | 0 |
| Example 33 | 2 | 2 | 0 ± 0 | 60 | 245 | 1.4 | 0 | 100 | 1 | 1 |
| Example 34 | 6 | 6 | 0 ± 3 | 70 | 225 | 1.4 | 0 | 100 | 5 | 4 |
| Example 35 | 6 | 7 | 0 ± 2 | 70 | 200 | 3.3 | 0 | 80 | 6 | 6 |
| Example 36 | 1 | 1 | 0 ± 1 | 70 | 200 | 2.6 | 0 | 80 | 2 | 2 |
| Example 37 | 2 | 2 | 0 ± 1 | 75 | 210 | 2.3 | 0 | 80 | 2 | 1 |
| Example 38 | 7 | 7 | 0 ± 3 | 85 | 240 | 2.3 | 0 | 80 | 6 | 6 |
| Example 39 | 6 | 7 | 0 ± 3 | 100 | 280 | 2.6 | 0 | 40 | 6 | 6 |
| Example 40 | 1 | 2 | 0 ± 1 | 50 | 250 | 2.4 | 0 | 40 | 1 | 1 |
| Example 41 | 6 | 6 | 0 ± 3 | 50 | 230 | 1.6 | 0 | 40 | 4 | 6 |
| Example 42 | 2 | 2 | 0 ± 1 | 50 | 200 | 1.6 | 0 | 40 | 2 | 1 |
| Example 43 | 2 | 2 | 0 ± 1 | 60 | 230 | 1.6 | 0 | 40 | 2 | 2 |
| Example 44 | 7 | 7 | 0 ± 3 | 60 | 230 | 2 | 0 | 40 | 6 | 7 |
| Example 45 | 0 | 0 | 0 ± 0 | 30 | 100 | 2.2 | 0 | 100 | 0 | 0 |
| Example 46 | 2 | 2 | 0 ± 1 | 40 | 210 | 2 | 0 | 100 | 2 | 2 |
| Example 47 | 6 | 7 | 0 ± 3 | 40 | 230 | 1.5 | 5 | 100 | 4 | 3 |
| Example 48 | 0 | 1 | 0 ± 0 | 50 | 90 | 2.6 | 0 | 100 | 0 | 0 |
| Comparative Example 3* | 22 | 20 | 0 ± 15 | 50 | 90 | 3.4 | 30 | 100 | 50 | 55 |
| Example 49 | 5 | 6 | 0 ± 3 | 200 | 100 | 1.4 | 0 | 100 | 4 | 5 |
| Example 50 | 2 | 2 | 0 ± 0 | 250 | 100 | 1.5 | 0 | # | 1 | 1 |
| Example 51 | 2 | 2 | 0 ± 0 | 300 | 100 | 1.5 | 0 | # | 1 | 1 |
| Example 52 | 5 | 6 | 0 ± 3 | 310 | 100 | 1.4 | 0 | # | 5 | 4 |
| Example 53 | 0 | 0 | 0 ± 0 | 150 | 60 | 2.3 | 0 | 40 | 0 | 0 |
| Example 54 | 0 | 0 | 0 ± 0 | 180 | 60 | 2.4 | 0 | 40 | 0 | 0 |
| Example 55 | 2 | 2 | 0 ± 1 | 170 | 100 | 2.5 | 0 | 40 | 1 | 2 |
| Example 56 | 0 | 0 | 0 ± 0 | 300 | 100 | 1.5 | 0 | 60 | 0 | 0 |
| Example 57 | 0 | 0 | 0 ± 0 | 240 | 120 | 2.2 | 0 | # | 0 | 0 |

In the Table 1, Example 35 and Comparative Example 3 are not used the touch roller, Example 48 and Comparative Example 3 are not stretched in the longitudinal direction, and Example 24 and Comparative Example 3 are not relaxed.

2-2. Solution Film Forming

To a mixed solvent of 90% by mass of dichloromethane and 5% by mass of methanol and 5% by mass of ethanol, a mixture obtained by mixing a plasticizer 12% by mass (to resin) of (triphenylphosphite/biphenyl-diphenyl-phosphate=weight ratio 3/1) with the cellulose acylate resin in all level described in Table 1 was dissolved, then the mixture was subjected to a flow casting in the form of band, which was then peeled off and dried, to obtain cellulose acylate films having a residue solvent of 0.1 to 0.3% by mass, a thickness of 80 μm and 40 μm. For these, a stretching was performed under the same conditions as in the melt-film forming film described in Table 1, as for one in which the present invention is carried out, and excellent results were similarly obtained. On the other hand, as for one in which the comparative example is carried out, excellent result such as that of the present invention was not obtained.

3. Stretching (1) Longitudinal (MD) Stretching

Using the two pairs of nip rolls, the longitudinal stretching was performed at an aspect ratio (L/W) mentioned in Table 1, at a stretch temperature of Tg+15° C. and at the magnification mentioned in Table 1. Longitudinal relaxation was performed after the longitudinal stretching. The longitudinal relaxation after the longitudinal stretching was performed by lowering the speed of a transporting roll disposed immediately after the longitudinal stretched nip rolls.

(2) Transverse (TD) Stretching

After the longitudinal stretching and relaxation, transverse stretching was performed to a tender. The ratio (Lc/Wc) of the clutch length (Lc) of the chuck to the clutch depth (Wc) of the chuck in the tender and the temperature of the chuck at the time of clutch was shown in Table 1. Then, the tender is introduced into a preheating zone and a heating process is performed to the tender at a temperature mentioned in Table 1 before the transverse stretching. Subsequently, the transverse stretching is performed at a stretch temperature of Tg+10° C. and at the magnification mentioned in Table 1 and then the heat treatment is performed at the temperature mentioned in Table 1 after the transverse stretching. After the heat-treatment performed after the transverse stretching, the transverse relaxation is performed by reducing the tender width. Subsequently, the chucks were removed and the tender was transported at the ratio $V^1/V^2$ (the ratio of a chuck transporting speed ($V^1$) to a winding speed ($V^2$) after the transverse stretching) mentioned in Table 1. Subsequently, the tender was transported at a low-tension (3 kg/m) and the longitudinal relaxation was performed. The relaxations were performed at the temperature mentioned in Table 1 and the total relaxation was disclosed in Table 1.

The thermal expansion distribution, the elasticity modulus distribution, the Re, the Rth, the orientation angle distribution, elasticity modulus and the number of the luminescent spots of the film according to the invention were measured by the above-mentioned method and were mentioned in Table 1. A remaining solvent of the film before or after the stretching was 0%.

4. Production of Polarizing Plate (4-1) Surface Treatment

The stretched cellulose acylate film was saponified by the following dipping method. The film was also saponified by coating method. However, the result was the same as that from saponification by dipping.

(1) Dip Saponification

A 1.5 aqueous solution of NaOH was used as a saponifying solution. This solution was adjusted to a temperature of 60° C., and the cellulose acylate film was dipped therein for 2 minutes. Thereafter, the film was dipped in 0.1N aqueous solution of sulfuric acid for 30 seconds, and passed through a water-washing bath.

(2) Coat Saponification 20 parts by mass of water was added to 80 parts by mass of isopropyl alcohol, and KOH was dissolved therein so that its concentration became 1.5 normality. This solution was adjusted to a temperature of 60° C. to use as a saponifying solution. This solution was coated on a cellulose acylate film of 60° C. in an amount of 10 g/m², and saponification was conducted for one minute. Then, warm water of 50° C. was sprayed thereover for 1 minute in an amount of 10 l/m² per minute to conduct washing.

(4-2) Production of Polarizing Layer

The film was stretched in a lengthwise direction by applying a difference in peripheral speed between two pairs of nip rollers according to Example 1 in JP-A No. 2001-141926, thereby preparing a polarizing layer having thickness of 20 μm.

(4-3) Lamination

The polarizing layer thus obtained and the cellulose acylate films formed, stretched, and saponification-treated by the above-mentioned method were laminated so that they were formed in the below combinations by using a 3% aqueous solution of PVA (PVA-117H; manufactured by Kuraray CO., LTD.) as an adhesive. The Fuji TAC (TD80; manufactured by Fuji Photo Film Co., Ltd.) listed below was subjected to a saponification treatment by the above-mentioned method.

Polarizing Plate A: Stretched cellulose acylate film/polarizing layer/FUJI TAC

Polarizing Plate B: Stretched cellulose acylate film/polarizing layer/non-stretched cellulose acylate film (In polarizing plate B, stretched and non-stretched cellulose acylate films were the same cellulose acylate films.)

(4-4) Evaluation

The polarizing plate thus obtained was attached to a VA type liquid crystal display device having size of 20 inches shown in FIGS. 2 to 9 of JP-A No. 2000-154261 so that the stretched cellulose acylate film faces the liquid crystal side. The device was installed under the environment of high temperature (50° C.) in a state where the entire surface of the device displays black color. The region of unevenness (light leakage) in the black display was measured with eyes and the ratio of the region of unevenness relative to the entire area of the display unit was represented in Table 1. The polarizing plate obtained according to the invention can achieve excellent performances.

On the other hand, optical characteristics of the polarizing plates not in the scope of the invention were deteriorated. In particular, in the invention, generation of the unevenness on the liquid crystal display was largely improved as compared to Example 1 of JP-A No. 2005-300978 (Comparative Example 48 in Table 1).

5. Producing of Optical Compensation Film

The manufactured film to which the stretching had been performed according to the invention was used instead of a cellulose acetate film coated by a liquid crystal layer disclosed in a first example described in JP-A-11-316378. The irregularities (light leakage) at the time of reducing a temperature from 30° C. to 10° C. were measured by the above-mentioned method (an irregularity generating area with respect to the entire area was expressed in percentage). It was possible to obtain the excellent performance of the optical compensation film by the use of the film to which the stretching had been performed according to the invention.

As in the case of producing an optical compensation filter film, it was possible to manufacture the excellent optical compensation film by the use of the film to which the stretching had been performed according to the invention, instead of a cellulose acetate film coated by a liquid crystal layer disclosed in a first example described in JP-A-7-333433.

6. Producing of Low-Reflection Film

In accordance with a 47th example described in Kokai Gifo of Japan Institute of Invention & Innovation, Kogi No. 2001-1745, a low-reflection film is manufactured using the film to which the stretching had been performed according to the invention, thus the low-reflection film having an excellent optical performance can be obtained.

7. Producing of Liquid Crystal Display Element

The polarization plates according to the invention was used in a liquid crystal display apparatus disclosed in a first example described in JP-A No. H10-48420, in an optically anisotropic layer including a discotic liquid crystal molecules and an oriented film coated by polyvinyl alcohol disclosed in a first example described in JP-A No. H9-26572, in a 20-inch VA-type liquid crystal display apparatus disclosed in FIGS. 2 to 9 described in JP-A No. 2000-154261, in a 20-inch OCB-type liquid crystal display apparatus disclosed in FIGS. 10 to 15 described in JP-A No. 2000-154261, and in an IPS-type liquid crystal display apparatus disclosed in FIG. 11 described in JP-A No. 2004-12731. The low-reflection film according to the invention was attached to a top surface layer of the liquid crystal display apparatuses and an evaluation process was performed so that the excellent liquid crystal display element was obtained.

Example B

1. Saturated Norbornene Resin
(1) Saturated norbornene resin-A

To 6-methyl-1,4,5,8-dimethano-1,4,4a,5,6,7,8,8a-octahydronaphthalene, 10 parts of a 15% cyclohexane solution of triethylaluminum, 5 parts of trinaphthalene, and 10 parts of 20% cyclohexane solution of titanium tetrachloride were added as a polymerization catalyst to carry out the ring-opening polymerization in cyclohexane. The obtained ring-opened polymer was hydrogenated with a nickel catalyst to obtain a polymer solution. The polymer solution was coagulated in isopropyl alcohol, and dried to obtain a powdery resin. The number average molecular weight (Mn), the weight-average molecular weight (Mw), the hydrogen additive rate, and the Tg of the resident were 40,000, 80000, 99.8% or more, and 139° C., respectively.

(2) Saturated Norbornene Resin-B

To a reactor purged with nitrogen, 100 parts of 8-methyl-8-methoxycarbonitriletetracyclo[4.4.0.12,5,17.10]-3-dodecene (specific monomer B), 150 parts of 5-(4-biphenyl-carbonyloxy)bicycle[2.2.1]hepto-2-ene (specific monomer A), 18 parts of 1-hexene (molecular weight regulator), and 750 parts of toluene were fed, and the mixture was heated to 60° C. Subsequently, to the solution in the reactor, 0.62 parts of toluene solution of triethylaluminum (1.5 mol/l), and 3.7 parts of toluene solution (concentration 0.05 mol/l) of tungsten hexachloride (t-butanol: methanol: tungsten=0.35 mol: 0.3 mol: 1 mol) modified by t-butanol and methanol, were added as a polymerization catalyst, the system was heated and stirred at 80° C. for 3 hours, thereby subjecting to the ring-opening polymerization reaction to obtain the ring-opened polymer solution. The polymerization inversion rate in the polymerization reaction was 97%, and the intrinsic viscosity (ηinh) when the obtained ring-opened polymer is measured in chloroform of 30° C. was 0.65 dl/g. 4,000 parts of thus obtained ring-opening polymerization solution was fed to an autoclave, to the ring-opened polymer solution, 0.48 parts of RuHCl(CO)[P($C_6H_5$)$_3$]$_3$ was added, the solution was heated and stirred for 3 hours, under the conditions of a hydrogen gas pressure of 100 kg/cm$^2$, a reacting temperature of 165° C., to carry out a hydrogenated reaction. The obtained reacting solution (hydrogenated polymer solution) was cooled, and then the hydrogen gas was discharged. The reacting solution was poured onto a large amount of methanol, and the aggregate was separated and recovered, and dried, to obtain a hydrogenated polymer (specific cyclic polyolefin resin). For thus obtained hydrogenated polymer, the hydrogen additive rate of olefin unsaturated bond was measured using a $^1$H-NMR at 400 MHz, the obtained value was 99.9%. The number average molecular weight (Mn) and the weight average molecular weight (Mw) in terms of polystyrene were measured according to a GPC method (solvent: tetrahydrofuran). As the results, the number average molecular weight (Mn), the weight-average molecular weight (Mw), and the molecular weight distribution (Mw/Mn) were 39,000, 126, 000, and 3.23, respectively. The Tg thereof was 110° C.

(3) Saturated Norbornene Resin-C

A saturated norbornene compound (Tg: 127° C.) described in the Example 2 in Japanese Unexamined Patent Application Publication No. 2005-330465 was employed. The number average molecular weight and the weight average molecular weight of the resin, were 23,000 and 48,000, respectively. The molecular weight distribution (Mw/Mn) was 2.09. The Tg thereof was 127° C.

(4) Saturated Norbornene Resin-D

A saturated norbornene compound (Tg: 181° C.) described in the Example 1 in PCT Japanese Translation Patent Publication No. 8-507800 was employed. The number average molecular weight and the weight average molecular weight of the resin, were 28,000 and 60,000, respectively. The molecular weight distribution (Mw/Mn) was 2.14. The Tg thereof was 130° C.

(5) Saturated Norbornene Resin-E

APL6015T manufactured by Mitsui Chemicals, Inc. (Tg: 145° C.) was employed. The number average molecular weight and the weight average molecular weight of the resin, were 25,000 and 53,000, respectively. The molecular weight distribution (Mw/Mn) was 2.12. The Tg thereof was 145° C.

(6) Saturated Norbornene Resin-F

TOPAS 6013 manufactured by Polyplastics, Co., Ltd. (Tg: 130° C.) was employed. The number average molecular weight and the weight average molecular weight of the resin, were 20,000 and 41,000, respectively. The molecular weight distribution (Mw/Mn) was 2.05. The Tg thereof was 130° C.

(7) Saturated Norbornene Resin-G

A saturated norbornene compound (Tg: 140° C.) described in the Example 1 in Japanese Patent No. 3693803 was employed. The number average molecular weight and the weight average molecular weight of the resin, were 21,500 and 45,000, respectively. The molecular weight distribution (Mw/Mn) was 2.09. The Tg thereof was 140° C.

2. Film Forming

The norbornene compounds-A to G having the diameter of 3 mm and the length of 5 mm were formed as a pellet of a round shape, dried by a vacuum drier of 110° C. so that a water content is 0.1% or less, and then put into a hopper set to (Tg−10)° C.

The melt temperature was controlled to be a melt viscosity of 1000 Pa·S, a melting process was performed at the same temperature over 5 minutes using a single-axis kneading machine, and then subjected to a flow casting to a casting dram from a T-die which is set a temperature 10° C. higher than a melt temperature to (Tg−5)° C., and the resultant was solidified, to obtain a film. At this time, the touch roll film formation was carried out under the conditions described in the Table 2. The solidified melt was peeled off, and taken up. The both edges of the film (each 3% of total width) were subjected trimmed just before the take-up, then the both edges of film were subjected to a thickening process (knurling) to give a 10 mm width and a 50 μm height. In each level, 3000 m of the film was taken up by a width of 1.5m at 30 m/minutes.

3. Stretching

The saturated norbornene film obtained by the melt film forming was subjected to a longitudinal stretching, a transverse stretching, and a relaxation treatment under the conditions described in the Table 2 as same in the Example 1.

The retention solvent for all the films formed and stretched in the above manner was 0%. Further, thermal expansion coefficient distribution light-shrinkage distribution, Re, Rth, orientation angle distribution, elasticity modulus distribution, and luminescent spots were measured, and the results are shown in Table 2.

TABLE 2

| | evaluation of stretched film | Tg ° C. | line pressure of touch roller kg/cm | LD LD/TD (L/W) | stretching ratio (%) | chuck condition Lo/Wo | chuck temperature (° C.) | stretching ratio (%) | temperature of heat treatment before TD stretching (° C.) | TD stretching temperature $T^1$ (° C.) | temperature of heat treatment before TD stretching (° C.) | ratio of transporting speed $V^1/V^2$ |
|---|---|---|---|---|---|---|---|---|---|---|---|---|
| Example 101 | A | 139 | 3 | 0.05 | 10 | 8 | 80 | 80 | $T^1 + 15$ | $Tg + 15$ | $T^1 - 15$ | 1.005 |
| Comparative Example 101 | A | 139 | 3 | 0.05 | 10 | 2 | 80 | 80 | $T^1 + 15$ | $Tg + 15$ | $T^1 - 15$ | 1.005 |
| Example 106 | A | 139 | 3 | 0.05 | 10 | 4 | 80 | 80 | $T^1 + 15$ | $Tg + 15$ | $T^1 - 15$ | 1.005 |
| Example 107 | A | 139 | 3 | 0.05 | 10 | 48 | 80 | 80 | $T^1 + 15$ | $Tg + 15$ | $T^1 - 15$ | 1.005 |
| Comparative Example 102 | A | 139 | 3 | 0.05 | 10 | 52 | 80 | 80 | $T^1 + 15$ | $Tg + 15$ | $T^1 - 15$ | 1.005 |
| Example 103 | A | 139 | 3 | 0.05 | 10 | 12 | 40 | 60 | $T^1 + 10$ | $Tg + 10$ | $T^1 - 10$ | 1.01 |
| Example 104 | A | 139 | 3 | 0.05 | 10 | 12 | 65 | 60 | $T^1 + 10$ | $Tg + 10$ | $T^1 - 10$ | 1.01 |
| Example 105 | A | 139 | 3 | 0.05 | 10 | 12 | 190 | 60 | $T^1 + 10$ | $Tg + 10$ | $T^1 - 10$ | 1.01 |
| Example 106 | A | 139 | 3 | 0.05 | 10 | 12 | 210 | 60 | $T^1 + 10$ | $Tg + 10$ | $T^1 - 10$ | 1.01 |
| Example 107 | A | 139 | 3 | 0.05 | 10 | 6 | 120 | 150 | $T^1 + 30$ | $Tg + 15$ | $T^1 - 5$ | 0.99 |
| Example 108 | A | 139 | 3 | 0.05 | 10 | 6 | 120 | 150 | $T^1 + 30$ | $Tg + 15$ | $T^1 - 5$ | 1.003 |
| Example 109 | A | 139 | 3 | 0.05 | 10 | 6 | 120 | 150 | $T^1 + 30$ | $Tg + 15$ | $T^1 - 5$ | 1.09 |
| Example 110 | A | 139 | 3 | 0.05 | 10 | 6 | 120 | 150 | $T^1 + 30$ | $Tg + 15$ | $T^1 - 5$ | 1.11 |
| Example 111 | B | 110 | 5 | 0.1 | 5 | 10 | 100 | 180 | $T^1 - 5$ | $Tg + 25$ | $T^1 - 25$ | 1.05 |
| Example 112 | B | 110 | 5 | 0.1 | 5 | 10 | 100 | 180 | $T^1 + 5$ | $Tg + 25$ | $T^1 - 25$ | 1.05 |
| Example 113 | B | 110 | 5 | 0.1 | 5 | 10 | 100 | 180 | $T^1 + 45$ | $Tg + 25$ | $T^1 - 25$ | 1.05 |
| Example 114 | B | 110 | 5 | 0.1 | 5 | 10 | 100 | 180 | $T^1 + 55$ | $Tg + 25$ | $T^1 - 25$ | 1.05 |
| Example 115 | C | 127 | 10 | 0.2 | 10 | 15 | 150 | 90 | $T^1 + 25$ | $Tg - 10$ | $T^1 - 55$ | 1.02 |
| Example 116 | C | 127 | 10 | 0.2 | 10 | 15 | 150 | 90 | $T^1 + 25$ | $Tg - 10$ | $T^1 - 45$ | 1.02 |
| Example 117 | C | 127 | 10 | 0.2 | 10 | 15 | 150 | 90 | $T^1 + 25$ | $Tg - 10$ | $T^1 - 5$ | 1.02 |
| Example 118 | C | 127 | 10 | 0.2 | 10 | 15 | 150 | 90 | $T^1 + 25$ | $Tg - 10$ | $T^1$ | 1.02 |
| Example 119 | D | 181 | 15 | 0.04 | 90 | 20 | 90 | 5 | $T^1 + 10$ | $Tg + 10$ | $T^1 - 30$ | 1.03 |
| Example 120 | D | 181 | 15 | 0.04 | 90 | 20 | 90 | 5 | $T^1 + 10$ | $Tg + 10$ | $T^1 - 30$ | 1.03 |
| Example 121 | D | 181 | 15 | 0.04 | 90 | 20 | 90 | 5 | $T^1 + 10$ | $Tg + 10$ | $T^1 - 30$ | 1.03 |
| Example 122 | D | 181 | 15 | 0.04 | 90 | 20 | 90 | 5 | $T^1 + 10$ | $Tg + 10$ | $T^1 - 30$ | 1.03 |
| Example 123 | E | 145 | 20 | 0.05 | 15 | 5 | 70 | 80 | $T^1 + 15$ | $Tg + 20$ | $T^1 - 5$ | 1.02 |
| Example 124 | E | 145 | 20 | 0.05 | 15 | 5 | 70 | 80 | $T^1 + 15$ | $Tg + 20$ | $T^1 - 5$ | 1.02 |
| Example 125 | E | 145 | 20 | 0.05 | 15 | 5 | 70 | 80 | $T^1 + 15$ | $Tg + 20$ | $T^1 - 5$ | 1.02 |
| Example 126 | E | 145 | 20 | 0.05 | 15 | 5 | 70 | 80 | $T^1 + 15$ | $Tg + 20$ | $T^1 - 5$ | 1.02 |
| Example 127 | F | 130 | 6 | 0.02 | 8 | 25 | 120 | 100 | $T^1 + 20$ | $Tg + 30$ | $T^1 - 25$ | 1.04 |
| Example 128 | F | 130 | 6 | 0.28 | 8 | 25 | 120 | 100 | $T^1 + 20$ | $Tg + 30$ | $T^1 - 25$ | 1.04 |
| Example 129 | F | 130 | 6 | 0.32 | 8 | 25 | 120 | 100 | $T^1 + 20$ | $Tg + 30$ | $T^1 - 25$ | 1.04 |
| Example 130 | G | 140 | — | 0.06 | 10 | 30 | 90 | 100 | $T^1 + 25$ | $Tg + 5$ | $T^1 - 25$ | 1.06 |
| Example 131 | G | 140 | 1 | 0.06 | 10 | 30 | 90 | 100 | $T^1 + 25$ | $Tg + 5$ | $T^1 - 25$ | 1.06 |
| Example 132 | G | 140 | 90 | 0.06 | 10 | 30 | 90 | 100 | $T^1 + 25$ | $Tg + 5$ | $T^1 - 25$ | 1.06 |
| Example 133 | G | 140 | 110 | 0.06 | 10 | 30 | 90 | 100 | $T^1 + 25$ | $Tg + 5$ | $T^1 - 25$ | 1.06 |
| Example 134 | F | 130 | 6 | 1.9 | 80 | 25 | 120 | 5 | $T^1 + 20$ | $Tg + 30$ | $T^1 - 25$ | 1.04 |
| Example 135 | F | 130 | 6 | 2.1 | 80 | 25 | 120 | 5 | $T^1 + 20$ | $Tg + 30$ | $T^1 - 25$ | 1.04 |
| Example 136 | F | 130 | 6 | 10 | 80 | 25 | 120 | 5 | $T^1 + 20$ | $Tg + 30$ | $T^1 - 25$ | 1.04 |
| Example 137 | F | 130 | 6 | 25 | 80 | 25 | 120 | 5 | $T^1 + 20$ | $Tg + 30$ | $T^1 - 25$ | 1.04 |
| Example 138 | F | 130 | 6 | 48 | 80 | 25 | 120 | 5 | $T^1 + 20$ | $Tg + 30$ | $T^1 - 25$ | 1.04 |
| Example 139 | F | 130 | 6 | 52 | 80 | 25 | 120 | 5 | $T^1 + 20$ | $Tg + 30$ | $T^1 - 25$ | 1.04 |

TABLE 2-continued

| | stretching relaxing | | evaluation of stretched film | | | | | | | | |
|---|---|---|---|---|---|---|---|---|---|---|---|
| | sum of relaxing rate (%) | relaxing temperature (° C.) | thermal expansion distribution (%) | optical elasticity (%) | Orientation angle distribution (°) | Re (nm) | Rth (nm) | elasticity modulus (kN/mm$^2$) | luminescent spot (kM/cm$^2$) | thickness (μm) | display unevenness (%) |
| Example 101 | 5 | Tg | 0 | 0 | 0 ± 0 | 80 | 300 | 2.2 | 0 | 80 | 0 |
| Comparative Example 101 | 5 | Tg | 18 | 20 | 0 ± 7 | 80 | 300 | 2.2 | 0 | 80 | 70 |
| Example 106 | 5 | Tg | 8 | 7 | 0 ± 3 | 80 | 300 | 2.2 | 0 | 80 | 11 |
| Example 107 | 5 | Tg | 8 | 7 | 0 ± 3 | 80 | 300 | 2.2 | 0 | 80 | 10 |
| Comparative Example 102 | 5 | Tg | 18 | 22 | 0 ± 7 | 80 | 300 | 2.2 | 0 | 80 | 65 |
| Example 103 | 4 | Tg + 10 | 8 | 8 | 0 ± 5 | 60 | 250 | 2.1 | 0 | 100 | 14 |
| Example 104 | 4 | Tg + 10 | 2 | 2 | 0 ± 2 | 60 | 250 | 2.1 | 0 | 100 | 5 |
| Example 105 | 4 | Tg + 10 | 2 | 2 | 0 ± 2 | 60 | 250 | 2.1 | 0 | 100 | 5 |
| Example 106 | 4 | Tg + 10 | 8 | 9 | 0 ± 4 | 60 | 250 | 2.1 | 0 | 100 | 12 |
| Example 107 | 6 | Tg + 20 | 7 | 8 | 0 ± 5 | 110 | 350 | 2.3 | 0 | 110 | 16 |
| Example 108 | 6 | Tg + 20 | 2 | 2 | 0 ± 2 | 110 | 350 | 2.2 | 0 | 110 | 5 |
| Example 109 | 6 | Tg + 20 | 2 | 2 | 0 ± 2 | 110 | 350 | 2.2 | 0 | 110 | 5 |
| Example 110 | 6 | Tg + 20 | 7 | 7 | 0 ± 5 | 110 | 350 | 2.1 | 0 | 110 | 11 |
| Example 111 | 8 | Tg − 10 | 6 | 6 | 0 ± 5 | 180 | 200 | 1.8 | 0 | 60 | 8 |
| Example 112 | 8 | Tg − 10 | 3 | 3 | 0 ± 3 | 180 | 195 | 1.8 | 0 | 60 | 4 |
| Example 113 | 8 | Tg − 10 | 3 | 4 | 0 ± 3 | 180 | 195 | 1.8 | 0 | 60 | 4 |
| Example 114 | 8 | Tg − 10 | 6 | 7 | 0 ± 5 | 180 | 190 | 1.8 | 0 | 60 | 7 |
| Example 115 | 10 | Tg + 10 | 6 | 6 | 0 ± 5 | 35 | 200 | 2.5 | 0 | 150 | 7 |
| Example 116 | 10 | Tg + 10 | 3 | 3 | 0 ± 3 | 35 | 200 | 2.5 | 0 | 150 | 3 |
| Example 117 | 10 | Tg + 10 | 2 | 3 | 0 ± 3 | 30 | 200 | 2.5 | 0 | 150 | 3 |
| Example 118 | 10 | Tg + 10 | 6 | 7 | 0 ± 5 | 35 | 210 | 2.5 | 0 | 150 | 7 |
| Example 119 | 0 | Tg + 5 | 7 | 7 | 90 ± 4 | 80 | 90 | 2.2 | 0 | 100 | 7 |
| Example 120 | 2 | Tg + 5 | 3 | 2 | 90 ± 2 | 70 | 75 | 2.2 | 0 | 100 | 4 |
| Example 121 | 18 | Tg + 5 | 2 | 2 | 90 ± 2 | 65 | 75 | 2.1 | 0 | 100 | 3 |
| Example 122 | 22 | Tg + 5 | 5 | 5 | 90 ± 4 | 65 | 65 | 2 | 0 | 100 | 6 |
| Example 123 | 10 | Tg − 35 | 6 | 7 | 0 ± 4 | 80 | 250 | 2.3 | 0 | 50 | 7 |
| Example 124 | 10 | Tg − 25 | 3 | 4 | 0 ± 2 | 80 | 240 | 2.3 | 0 | 50 | 4 |
| Example 125 | 10 | Tg + 25 | 3 | 3 | 0 ± 2 | 70 | 250 | 2.2 | 0 | 50 | 3 |
| Example 126 | 10 | Tg + 35 | 6 | 7 | 0 ± 4 | 85 | 240 | 2.1 | 0 | 50 | 5 |
| Example 127 | 15 | Tg − 5 | 1 | 1 | 0 ± 0 | 80 | 290 | 2.1 | 0 | 90 | 3 |
| Example 128 | 15 | Tg − 5 | 3 | 3 | 0 ± 2 | 80 | 285 | 2 | 0 | 90 | 4 |
| Example 129 | 15 | Tg − 5 | 5 | 6 | 0 ± 3 | 80 | 285 | 1.9 | 0 | 90 | 7 |
| Example 130 | 3 | Tg | 7 | 8 | 0 ± 5 | 90 | 300 | 1.8 | 0 | 70 | 12 |
| Example 131 | 3 | Tg | 2 | 2 | 0 ± 1 | 90 | 320 | 2 | 0 | 70 | 3 |
| Example 132 | 3 | Tg | 2 | 2 | 0 ± 2 | 100 | 330 | 2.2 | 0 | 70 | 6 |
| Example 133 | 3 | Tg | 6 | 5 | 0 ± 4 | 105 | 310 | 2.4 | 0 | 70 | 8 |
| Example 134 | 15 | Tg − 5 | 6 | 6 | 0 ± 3 | 290 | 240 | 2.1 | 0 | 60 | 5 |
| Example 135 | 15 | Tg − 5 | 2 | 2 | 0 ± 2 | 330 | 170 | 2.2 | 0 | 60 | 2 |
| Example 136 | 15 | Tg − 5 | 0 | 0 | 0 ± 0 | 380 | 170 | 2.1 | 0 | 60 | 0 |
| Example 137 | 15 | Tg − 5 | 0 | 0 | 0 ± 0 | 380 | 180 | 2.2 | 0 | 60 | 0 |
| Example 138 | 15 | Tg − 5 | 2 | 3 | 0 ± 2 | 380 | 190 | 2 | 0 | 60 | 3 |
| Example 139 | 15 | Tg − 5 | 6 | 6 | 0 ± 3 | 420 | 190 | 2.2 | 0 | 60 | 7 |

In the Table 2, Example 130 is not used the touch roller.

4. Production of Polarizing Plate (4-1) Surface Treatment

In any level, a crona treatment was performed to a surface of the film so that a contact angle with water on the surface is 60°.

(4-2) Production of Polarizing Layer

According to Example 1 in JP-A No. 2001-141926, the film was stretched in a lengthwise direction by applying a difference in peripheral speed between two pairs of nip rollers, thereby preparing a polarizing layer having thickness of 20 μm.

(4-3) Lamination

The following polarizing plate was produced in the same manner in Example-A.

Polarizing Plate A: Stretched saturated norbornene/polarizing layer/Fuji TAC (4-4) Evaluation Thus obtained polarizing plate was mounted on a VA-type liquid crystal display device in the same manner as in the Example-A, an irregularity in black display (light leakage) when the polarizing plate is set in a condition of 10° C., which is moved down from 30° C., was measured, and the results are shown in Table 2. The films obtained according to the invention had excellent properties.

5. Production of Optical

An optical compensation film was produced in the same manner as in Example-A. The norbornene films obtained according to the invention had excellent properties.

6. Production of Low Reflecting Film

A low reflecting film was produced in the same manner as in Example-A. The norbornene films obtained according to the invention had an excellent optical property.

7. Production of Liquid Crystal Display Element

A liquid crystal display element was produced in the same manner as in Example-A. From the norbornene films obtained according to the invention, an excellent liquid crystal display element was obtained.

By incorporating a retardation film in which a transparent thermoplastic film is stretched, an excellent stretched transparent thermoplastic film of not causing color unevenness at a high temperature.

The present disclosure relates to the subject matter contained in Japanese Patent Application No. 110479/2006 filed on Apr. 13, 2006 and Japanese Patent Application No. 103297/2007 filed on Apr. 10, 2007, which are expressly incorporated herein by reference in theirs entirety.

JP-A Nos. JP-A No. 2007-2027, JP-A No. 2001-194522, JP-A No. 2001-151901, JP-A No. 2001-166144, JP-A No. 2003-344655, JP-A No. 2003-248117, JP-A No. 2003-66230, JP-A No. S60-168708, JP-A No. S62-252406, JP-A No. S62-252407, JP-A No. H2-133413, JP-A No. S63-145324, JP-A No. S63-264626, JP-A No. H1-240517, JP-A No. S57-8815, JP-A No. H7-145213, JP-A No. 2001-114836, JP-A No. H10-168201, JP-A No. 2002-86554 and JP-A No. 2007-2027 are expressly incorporated herein by reference in theirs entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method of producing a transparent thermoplastic film comprising transversely stretching a film by 1% to 200%, wherein a ratio (Lc/Wc) of a clutch length (Lc) of a chuck to a clutch depth (Wc) of the chuck in the transverse stretching zone is in the range of 3 to 50,
    wherein the transparent thermoplastic film has in-plane retardation (Re) in the range of from 20 to 400 nm, a thermal expansion distribution of 10% or less, and an optical elasticity modulus distribution of 10% or less in a square having one side of 30 cm.

2. The method of producing a transparent thermoplastic film according to claim 1, wherein a temperature of the chuck at the time of clutching is in the range of from 60° C. to 200° C.

3. The method of producing a transparent thermoplastic film according to claim 1, wherein a ratio ($V^1/V^2$) of a chuck transporting speed ($V^1$) in the transverse stretching zone to a taking-up speed ($V^2$) after the transverse stretching is in the range of from 1.001 to 1.1.

4. The method of producing a transparent thermoplastic film according to claim 1, comprising heat-treating the firm after the transverse stretching at a temperature in the range of ($T^1 -50$)° C. to ($T^1 -2$)° C., in which $T^1$ represents the transverse stretching temperature.

5. The method of producing a transparent thermoplastic film according to claim 1, wherein the film is heat-treated at a temperature in the range of from ($T^1 +2$)° C. to ($T^1 +50$)° C. before the transverse stretching, in which $T^1$ represents the transverse stretching temperature.

6. The method of producing a transparent thermoplastic film according to claim 1, comprising longitudinally stretching the film by 1 to 100%, in which the ratio of length/width (L/W) is in the range of above 0.01 to below 0.3 or above 2 to 50 or less.

7. The method of producing a transparent thermoplastic film according to claim 1, wherein the film at least one of after the transverse stretching and after other stretching is relaxed to give the total measure of relaxation in a length direction and a width direction of 1 to 20%, within the temperature range of (Tg −30)° C. to (Tg +30)° C., in which Tg is a glass translation temperature of the transparent thermoplastic film.

8. The method of producing a transparent thermoplastic film according to claim 1, wherein the film is melt-formed by using a touch roll.

9. A transparent thermoplastic film having in-plane retardation (Re) in the range of from 20 to 400 nm, a thermal expansion distribution of 10% or less and an optical elasticity modulus distribution of 10% or less in a square having one side of 30 cm, wherein the film is transversely stretched by 1% to 200% within a ratio (Lc/Wc) of a clutch length (Lc) of a chuck to a clutch depth (Wc) of the chuck in a transverse stretching zone of the range of from 3 to 50.

10. The transparent thermoplastic film according to claim 9, in which an orientation angle distribution over the entire film-forming width area is in the range of from 0 °±5° or 90 °±5 °.

11. The transparent thermoplastic film according to claim 9, in which retardation (Rth) in the thickness direction is in the range of from 50 to 400 nm.

12. The transparent thermoplastic film according to claim 9, comprising cellulose acylate satisfying the following formulae $$2.0 \leq A+B < 3.0$$

$$0.1 \leq B < 3$$

wherein A is a substitution degree of an acetate group and B is a total substitution degree of a propionate group, a butyrate group and a pentanoyl group.

13. The transparent thermoplastic film according to claim 9, which contains cellulose acylate satisfying the following formulae (T-1) and (T-2):

$$2.5 \leq A+C \leq 3.0 \text{ and} \qquad \text{Formula (T-1)}$$

$$0.1 \leq C < 2. \qquad \text{Formula (T-2)}$$

wherein, A indicates a substitution degree of an acetate group and C indicates a substituted or unsubstituted aromatic acyl group.

14. The transparent thermoplastic film according to claim 9, which contains a saturated norbornene resin.

15. The transparent thermoplastic film according to claim 9, wherein elasticity modulus is 2.9 kN/mm$^2$ or less.

16. The transparent thermoplastic film according to claim 9, wherein the number of luminescent spots having at least one side of 10 μm or more is 25/cm$^2$ or less, as observed when the transparent thermoplastic film is placed between two polarization plates disposed in a crossed Nicol state.

17. The transparent thermoplastic film according to claim 9, wherein a remaining solvent is 0.5% by mass or more.

\* \* \* \* \*